United States Patent [19]
Yoshida et al.

[11] Patent Number: 5,854,881
[45] Date of Patent: Dec. 29, 1998

[54] COORDINATE DETECTION DEVICE CAPABLE OF DETECTING COORDINATES USING DISPLAY PANEL PROVIDED SPECIALLY FOR DISPLAY

[75] Inventors: Yasuhiro Yoshida; Kengo Takahama, both of Nara; Takao Tagawa, Kashihara, all of Japan

[73] Assignee: Sharp Kabushiki Kaisha, Osaka, Japan

[21] Appl. No.: 444,894

[22] Filed: May 19, 1995

[30] Foreign Application Priority Data

May 31, 1994 [JP] Japan .................................. 6-118764
Mar. 22, 1995 [JP] Japan .................................. 7-062643

[51] Int. Cl.$^6$ ...................................................... G09G 3/36
[52] U.S. Cl. .......................... 345/104; 345/174; 345/179; 178/18.07; 178/19.03
[58] Field of Search ..................................... 345/173–183, 345/104; 178/18, 19, 18.01, 18.04, 18.05, 18.06, 18.07, 18.1, 19.01, 19.03

[56] References Cited

U.S. PATENT DOCUMENTS

| | | | |
|---|---|---|---|
| 4,492,819 | 1/1985 | Rodgers et al. | 178/18 |
| 4,631,356 | 12/1986 | Taguchi et al. | 345/104 |
| 4,845,684 | 7/1989 | Garwin et al. | 178/18 |
| 4,999,461 | 3/1991 | Murakami et al. | 178/19 |
| 5,166,668 | 11/1992 | Aoyagi | 345/180 |
| 5,483,262 | 1/1996 | Izutani | 345/179 |
| 5,541,371 | 7/1996 | Wang et al. | 345/174 |

FOREIGN PATENT DOCUMENTS

| | | |
|---|---|---|
| 0 565 852 A1 | 10/1993 | European Pat. Off. . |
| 0 571 226 A1 | 11/1993 | European Pat. Off. . |
| 54-24539 | 2/1979 | Japan . |
| 57-52089 | 3/1982 | Japan . |
| 57-176450 | 10/1982 | Japan . |
| 57-182238 | 11/1982 | Japan . |
| 59-24473 | 6/1984 | Japan . |
| 60-7289 | 2/1985 | Japan . |
| 61-262835 | 11/1986 | Japan . |
| 61-286918 | 12/1986 | Japan . |
| 3-296127 | 12/1991 | Japan . |
| 5-53726 | 3/1993 | Japan . |

OTHER PUBLICATIONS

Okano et al. "Liquid crystals=applications", *Tofuukan*, 7th issue, 1992, pp. 98–105.

*Primary Examiner*—Lun-Yi Lao
*Attorney, Agent, or Firm*—David G. Conlin; William J. Daley, Jr.

[57] ABSTRACT

Provided is a coordinate detection device capable of preventing the increase of development cost and the reduction of yield and dispensing with additional investment for the existing equipment. There are provided an LCD panel having electrodes and electrodes, a magnetic field generator which outputs an AC magnetic field from a tip end of its electrode, a differential amplifier, switching circuits which sequentially select electrodes of the LCD panel and connect the electrodes to the differential amplifier, and a coordinate detection circuit which detects the coordinates of a position in which the magnetic field generator is located based on a timing at which the electrodes are selected and an output of the differential amplifier. A coordinate detection function can be achieved by means of the LCD panel having the same structure as that of the LCD panel provided specially for image display. Furthermore, there is no need to form a closed loop in the electrodes of the LCD panel, which obviates the need of providing any board opposite to four sides of the LCD panel.

12 Claims, 48 Drawing Sheets

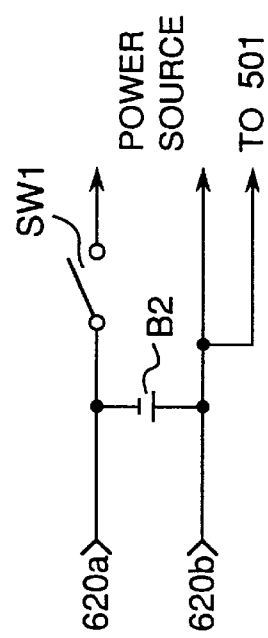
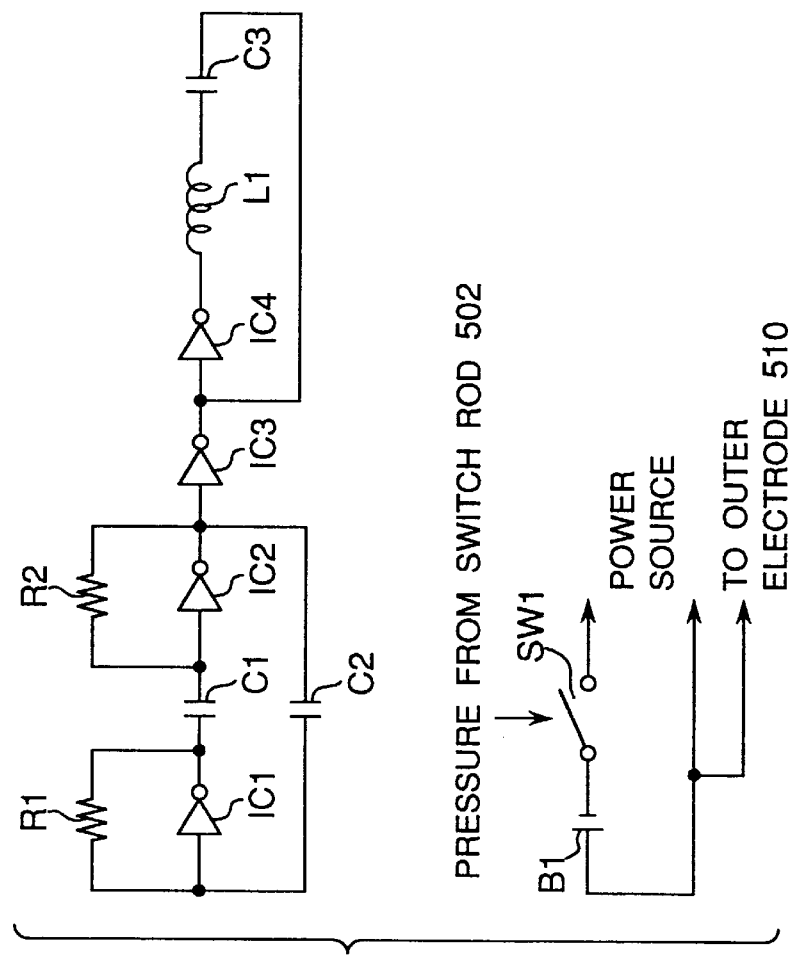

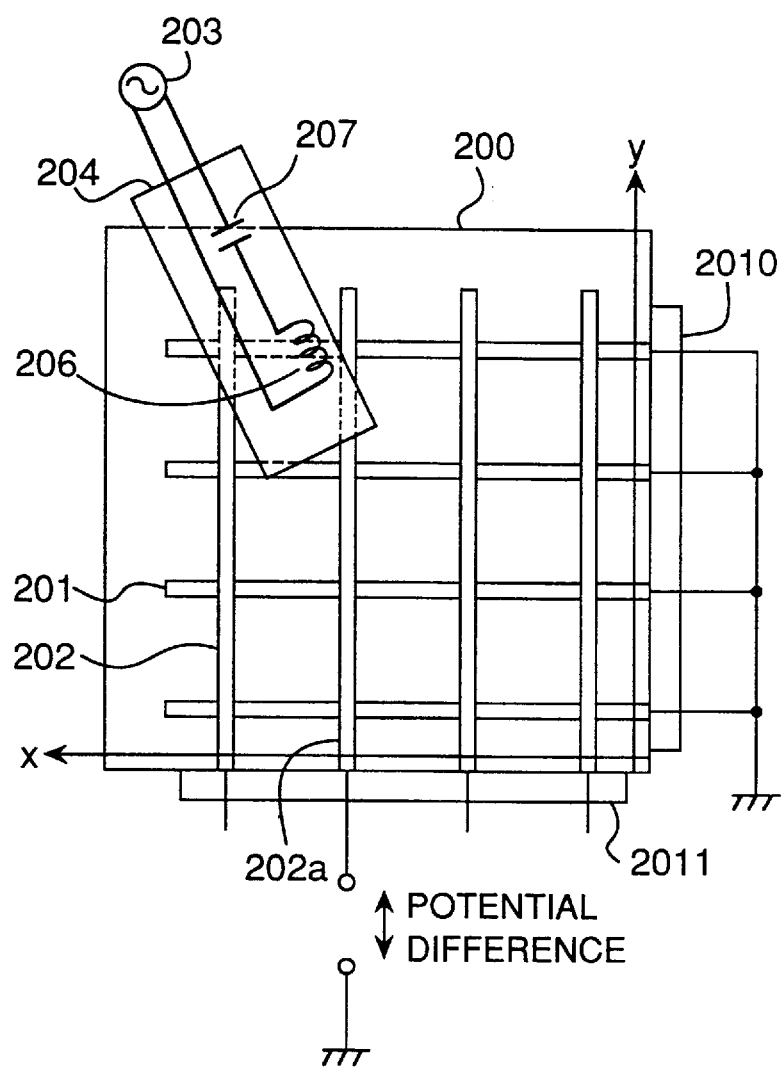

Input of envelope detector 186

Signal envelope
Carrier of magnetic field generator 208

Input of comparator 180

Output of comparator 180

Comparison reference voltage

Output of T-filp-flop 181

Output of delay circuit 182
(Input of NAND gate 183)

Delay time of delay circuit 182

Output of NAND gate 183

(The axis of abscissas : Time
The axis of ordinates : Voltage)

OUTPUT OF DIFFERENTIAL
AMPLIFIER 242
(INPUT OF ENVELOPE
DETECTOR 248b)

INPUT OF COMPARATOR
248

OUTPUT OF COMPARATOR
248

$$\begin{bmatrix} \text{THE AXIS OF ABSCISSAS : TIME} \\ \text{THE AXIS OF ORDINATES : VOLTAGE} \end{bmatrix}$$

SEGMENT ELECTRODE SIDE

Input of envelope detectors 191 and 192

Signal envelope

Carrier of magnetic field generator 208

Output of detector 192

Output of detector 191

Input of binarizing circuit 194

Comparison reference voltage

Output of binarizing circuit 194

$$\left\{\begin{array}{l}\text{The axis of abscissas: Time}\\ \text{The axis of ordinates: Voltage}\end{array}\right\}$$

Output of amplifier 179

Signal envelope
Carrier of magnetic field generator 208

Output of delay circuit 220

Delay time of delay circuit 220

Output of subtracter 221

Output of detector 222 (Input of binarizing circuit 223)

Comparison reference voltage

Output of binarizing circuit 223

( The axis of abscissas : Time )
( The axis of ordinates : Amplitude )

INPUT VOLTAGE OF
PHASE COMPARATOR 231

OUTPUT CURRENT OF
REFERENCE COORDINATE
EXTRACTION COIL 230

OUTPUT VOLTAGE OF
PHASE COMPARATOR 231

OUTPUT VOLTAGE OF
PULSE CIRCUIT 232

$$\begin{bmatrix} \text{THE AXIS OF ABSCISSAS : TIME} \\ \text{THE AXIS OF ORDINATES : AMPLITUDE} \end{bmatrix}$$

$Y_p$ $Y_{p+1}$ $Y_{p+2}$

IMAGE SIGNAL LINE

I/O SWITCHING CONTROL TERMINAL

OUTPUT1,2,3

5,854,881

COORDINATE DETECTION DEVICE CAPABLE OF DETECTING COORDINATES USING DISPLAY PANEL PROVIDED SPECIALLY FOR DISPLAY

BACKGROUND OF THE INVENTION

1. Field of the Invention

The present invention relates to a coordinate detection device, and relates to a coordinate input function-integrated liquid crystal display (LCD) device for use as a man-machine interface provided by using, for example, an LCD panel having an electrode structure arranged in an x-y matrix form and making the LCD panel itself concurrently have a coordinate input function. In more detail, the present invention relates to a coordinate detection device which can be provided by using a conventionally used LCD panel as it is without making alterations. In particular, the present invention relates to a coordinate detection device which can concurrently use electrodes of an LCD panel as a part of a structure for using a coordinate input method with generation of a magnetic field. Further, the present invention relates to a coordinate detection means which effects a magnetic field generated from a magnetic field generating means provided separately from the LCD panel on the electrodes of the LCD panel and detects an induction voltage generated at the electrodes, thereby allowing the coordinates of the magnetic field generating means to be detected.

2. Description of the Prior Art

Man-machine interfaces in word processors and personal computers have achieved remarkable developments in recent years. In particular, there has been proposed a coordinate input function-integrated LCD device which uses a coordinate pointing device having an electronic structure as a pen and uses an LCD panel as a writing sheet, thereby allowing a letter or figure to be directly written on the display panel (refer to, for example, Japanese Patent Laid-Open Publication No. HEI 5-53726 as a first prior art).

The first prior art is a display-integrated type tablet device as shown in FIG. 48. As shown in FIG. 48, a switching circuit 907 is switched to a coordinate detection control circuit 906 side in a coordinate detection period under the control of a control circuit 9010 so as to select the control circuit 906. Then, based on each signal from the detection control circuit 906, a segment electrode drive circuit 903 generates a segment electrode operation signal to sequentially scan segment electrodes X of an LCD panel 901. Subsequently, a common electrode drive circuit 902 generates a common electrode scanning signal to sequentially scan common electrodes Y. An x-coordinate detection circuit 908 and a y-coordinate detection circuit 909 detect respectively an x-coordinate value and a y-coordinate value at a tip end of an electronic pen 9011 based on an induction voltage induced at the tip end of the electronic pen 9011. Meanwhile, in an image display period, the switching circuit 907 is switched to a display control circuit 904 side so as to select the display control circuit 904. Consequently, an image is displayed on the LCD panel 901.

Thus, according to the first prior art, a display-integrated type tablet device can be constructed.

In other words, according to the above-mentioned first prior art, a scanning voltage is applied to the LCD panel in the coordinate detection period so that the scanning voltage detects a voltage induced at the electronic pen to decide the coordinates of the electronic pen, and in the image display period, image display can be performed on utterly the same principle of operation as that of the conventional LCD panel.

The above-mentioned arrangement enables incorporation of a coordinate input function by means of the electronic pen without making alterations in the conventional LCD panel.

Next, a second prior art (refer to Japanese Patent Laid-Open Publication No. SHO 54-24539) will be described. The second prior art is, as shown in FIG. 49, exemplary of an LCD panel for use in a coordinate input function-integrated LCD device. In FIG. 49, a reference numeral 31 denotes an LCD panel 31. The LCD panel 31 has a glass substrate 32 and a glass substrate 35. On an inner surface of one glass substrate 32 are formed thick electrodes 33 for image display use and thin electrodes 34 for input coordinate detection use arranged alternately in an x-axis direction. On an inner surface of the other glass substrate 35 are formed thick electrodes 36 for image display use and thin electrodes 37 for input coordinate confirmation use are arranged alternately in a y-axis direction perpendicular to the direction of the thick electrodes 33 and the thin electrodes 34. A liquid crystal material is sealedly filled in a space between the two glass substrates 32 and 35. Connectors 38 and 39 are attached to the glass substrate 32, while connectors 40 and 41 are attached to the glass substrate 35. The glass substrates 32 and 35 are connected to external circuits by way of the connectors 38, 39, 40 and 41.

The second prior art is to concurrently perform coordinate input and image display by means of one LCD panel. The second prior art has two operation modes of an image display mode and an image input mode.

It can be considered that the second prior art operates in the image display mode by means of the thick electrodes 33 and 36 which are perpendicular to each other according to a principle of operation of a well-known dot matrix LCD. Now that liquid crystal display devices are widely used, it seems unnecessary to provide any special explanation for the image display.

Meanwhile, the second prior art operates in the coordinate input mode by forming, for example, three loops 42, 43 and 44 in the x-direction in a manner as shown in FIG. 50 by means of the thin electrodes 34 and 37 formed on the LCD panel 31 and the connectors 38, 39, 40 and 41. By forming the loops 42, 43, and 44, x-coordinate values on the LCD panel 31 can be classified into $2^3$ areas, i.e., eight areas.

When a magnetic field generator 45 including a coil 48 driven by an AC power source 47 is placed in a position denoted by a mark A in FIG. 50, a magnetic field generated by the magnetic field generator 45 penetrates the loop 42, resulting in generating an induction current through the loop 42. Meanwhile, the above-mentioned magnetic field scarcely penetrates the other loops 43 and 44, resulting in generating almost no induction current through the other loops 43 and 44.

When the magnetic field generator 45 is placed in a position denoted by a mark B, a magnetic field generated by the magnetic field generator 45 penetrates the loops 43 and 44, resulting in generating an induction current through the loops 43 and 44. Meanwhile, the above-mentioned magnetic field scarcely penetrates the other loop 42, resulting in generating almost no induction current through the other loop 42.

Therefore, by connecting a specified amplifier 51 to each of the loops 42, 43 and 44, consistently observing the magnitude of an output current by means of a comparator 52, and binarizing the magnitude of the output current from each loop by comparison with a threshold value to convert an I/O output obtained from each loop into a binary number, it can be decided which area of the aforementioned eight areas the magnetic field generator 45 is located in. For instance, the position denoted by the mark A is represented by 100, while the position denoted by the mark B is represented by 011, and therefore a table representing relationships between output values and positions is preferably used.

Position detection in the y-axis direction can be performed utterly in the same manner as in the above-mentioned position detection in the x-axis direction. Thus, by deciding two positions in the x-y-axes directions, the coordinates of the magnetic field generator 45 on the LCD panel can be detected.

As described above, in the second prior art, using the technique of forming a plurality of coils (loops), consistently observing the magnitude of the induction current induced in each coil (loop) from the magnetic field generator 45, and specifying the position of the magnetic field generator, one LCD panel 31 can be concurrently used for coordinate input and image display.

As an improved device of the first and second prior arts, there is a third prior art ("coordinate input function-integrated LCD device" disclosed in Japanese Patent Laid-Open Publication No. SHO 61-286918). The coordinate input function-integrated liquid crystal display device of the third prior art includes, as shown in FIG. 51, an LCD panel wherein electrodes X and Y are arranged in an x-y matrix form as a coordinate input display panel. FIG. 51 shows only eight electrodes X of the x-axis, and partially shows electrodes Y of the y-axis.

As shown in FIG. 51, the third prior art includes bi-directional switching elements 13a and 13b. The switching elements 13 are used for the purpose of forming a loop-shaped coil with the electrodes on the device when the LCD panel is used as an input device. Control lines of the switching elements 13a and *b* are all connected to an I/O switching control line 18.

The third prior art further includes switching elements 14 for use in a case where the LCD panel is used as an image display device. An image signal is supplied to the switching elements 14 by means of an image signal control circuit 15, while a specific electric potential is applied to drain electrodes of all the switching elements 14 via a resistor 16.

Differential amplifiers 19 amplify a weak induction current generated in the coil on the loop to a signal level which can be easily handled when the LCD panel is used as an input device.

The switching elements 13a, the switching elements 14, and the image signal control circuit 15 are connected as an integrated circuit 20a to each electrode from an upper side of the panel, while the differential amplifiers 19 and the switching element 13b are connected as an integrated circuit 20b to each electrode from a lower side of the panel.

The third prior art also includes a structure of the electrodes of the y-axis similar to that of the electrodes of the x-axis.

Next, an operation of the coordinate input function-integrated LCD device of the third prior art will be described with reference to FIG. 51. First, in an image display operation, the I/O switching control line 18 is turned off, while the switching elements 13a and 13b are all turned off. Consequently, x-axis electrodes X1, X2, X3 and Xm are all put in independent states. Then, an image signal is supplied to the gate electrodes of the switching element 14 by the control circuit 15, and an electric potential is given to an electrode connected to the switching element which is turned on by the image signal.

In synchronization with the above-mentioned operation, y-axis electrodes Y1, Y2, Y3 and Ym are controlled so that any one of them is put in a conductive or "on" state. In the above-mentioned stage, the LCD panel performs an image display operation on the same principle of operation as that of the generic dot matrix type LCD device.

Next, in an input operation, the I/O switching control line 18 is turned on, and the switching elements 13a and 13b are all turned on. Consequently, the x-axis electrodes X1, X2, X3 and Xm form loop electrodes 10 arranged in a manner as shown in FIG. 52. Further, all the image signals from the image signal control circuit 15 are outputted in a non-conductive or "off" state, and the switching elements 14 are all turned off.

A principle of a coordinate detection operation of the third prior art is as shown in FIG. 52. In FIG. 52, a reference numeral denotes a cursor coil 11 and a reference numeral 12 denotes an AC signal source. In the present case, when the cursor coil 11 is driven by the AC signal source 12, an induction current flows through the electrode 10 connected in a loop form by an AC magnetic field exerted from the cursor coil.

By detecting the induction current, it can be detected which of the electrodes of the x-axis the cursor coil is located most nearly. A principle similar to the principle of detection is also disclosed in the aforementioned second prior art (Japanese Patent Laid-Open Publication No. SHO 54-24539).

Furthermore, in the third prior art, it is proposed to time-sharingly use the input and the output so as to make the LCD panel have the above-mentioned structure inclusive of a peripheral circuit, thereby making it a device to be used in an integrated body. FIG. 53 shows an exemplified timing chart of the above-mentioned structure.

In the above-mentioned example, a y-axis electrode Yp is turned on for image display. Then, while an adjacent electrode Yp+1 is turned on, an I/O switching control terminal is turned on, and the switching elements 14 are all turned off by the control circuit 15, thereby allowing an input operation to be performed to obtain position data. Subsequently, the y-axis electrode Yp+1 is turned on to enter into an image display operation. Thus the image display operation and the input operation are repeated alternately time-sharingly.

As described above, the third prior art has a peripheral circuit which can perform a control operation so as to short-circuit the ends of the electrodes for image display of the LCD panel when the panel is used as an input device, thereby allowing the electrodes to be connected in an appropriate loop form. When the panel is used as an input device, the peripheral circuit is operated to form a plurality of electrode loops, and an induction current generated in each loop when a magnetic field generated from magnetic field generating means separately provided for each loop is effected is consistently observed so as to obtain the coordinates of the magnetic field generating means.

What is common to the third prior art and the second prior art is the scheme of using one LCD panel concurrently for coordinate input and image display as well as the principle of coordinate detection itself for dividing in position the panel by means of a plurality of loop-shaped coils, consistently observing at each coil an induction current generated when a magnetic field generator is effected on the coils, and representing the coordinates of the magnetic field generator by a string of binary numbers. A further common factor is a variety of problems (described hereinafter) which commonly occur due to use of the common principle of detection. (Because there are many such common factors, the third prior art has received a final rejection for the reason that the third prior art can be achieved without any specific difficulty by applying the second prior art to a sixth prior art described hereinafter.)

As shown in the third prior art, the coordinate input technique itself for detecting the coordinate position of the magnetic field generator by detecting an induction current flowing through a loop when a magnetic field generated from the magnetic field generating means is effected on a plurality of electrode lines connected in loop forms is a well-known technique.

The third prior art differs from the second prior art if compared in that no special electrode for coordinate detection is required to be formed on the LCD panel in the third prior art and in that a special peripheral circuit is required for concurrent use of the electrodes for image display as a coordinate detection electrode in the third prior art.

As a device in which a display panel itself has concurrently a coordinate input function by using the electrodes of the display panel having an electrode structure arranged in an x-y matrix form as a part of constituent elements of a coordinate detection method with generation of a magnetic field (i.e., a device in which one display panel is used, and the panel has concurrently two functions of image display and coordinate input), there is a fourth prior art ("display function-integrated coordinate input device" disclosed in Japanese Patent Publication No. SHO 59-24473) as follows.

In the fourth prior art, a current is formed through electrodes of a plasma display panel having an x-y matrix form electrode structure as if a closed loop were formed so as to generate a magnetic field. By taking advantage of a phenomenon that the phase of the magnetic field changes depending on a position, the change is detected by magnetic detection means so as to obtain the coordinates of the magnetic detection means.

In other words, the fourth prior art has a peripheral circuit capable of performing a control operation so that the electrodes of the plasma display panel can be connected in a loop form when the panel is used as a coordinate input device (through no detailed description therefor is provided in the above-mentioned official gazette). When the panel is used as an input device, the above-mentioned peripheral circuit is operated to form a loop with the electrodes, flow a current through the loop to generate a magnetic field, and detect the magnetic field by separate magnetic field detection means so as to obtain the coordinates of the magnetic field detection means.

Conversely, it can be easily imagined that, when the panel is used as an image display device, the loop will be opened and the peripheral circuit will be controlled so as to form a display circuit corresponding to the system of the employed display panel. It is to be noted that the above-mentioned matter is not disclosed in the official gazette.

There is also a fifth prior art ("coordinate reading device" disclosed in Japanese Patent Publication No. SHO 60-7289) as a prior art describing in detail the principle of detection for performing magnetic field detection by taking advantage of the phenomenon that the phase of the magnetic field changes depending on a position.

Furthermore, as a prior art related to the fourth prior art, there are a sixth prior art ("display function-integrated coordinate input device" disclosed in Japanese Patent Laid-Open Publication No. SHO 57-176450) and a seventh prior art ("coordinate input method" disclosed in Japanese Patent Laid-Open Publication No. SHO 57-182238).

In the present case, each of the fourth prior art through the seventh prior art has magnetic field detection means, whereas each of the second prior art and the third prior art has magnetic field generating means. The fourth through seventh prior arts differ from the second and third prior arts in the above-mentioned point. However, the second through seventh prior arts agrees with each other in the point that a display panel having an electrode structure arranged in an x-y matrix form and a special peripheral circuit for connecting the electrodes of the panel in a loop form and concurrently using the electrodes as a part of the constituent elements of the coordinate detection method with generation of a magnetic field, thereby making the display panel itself concurrently have a coordinate input function. In other words, the second prior art through the seventh prior art do not specifically differ from each other in that a loop is constituted by the electrodes only in a coordinate input stage with incorporation of a special peripheral circuit to one display panel so as to concurrently achieve the two functions of image display and coordinate input. (In fact, the sixth prior art is cited in the document of notification of the final rejection of the third prior art.)

Several other prior arts similar to the aforementioned fourth prior art through the seventh prior art are found. Such prior arts are, for example, an eighth prior art ("image terminal device" disclosed in Japanese Patent Laid-Open Publication No. SHO 61-262835) and a ninth prior art ("tablet function-integrated flat display" disclosed in Japanese Patent I,aid-Open Publication No. HEI 3-296127.

In each of the eighth and ninth prior arts, when the panel is used as an input device, a peripheral circuit is controlled to connect in a loop form electrodes of an LCD panel having an x-y matrix form electrode structure, a control is effected to flow a current sequentially through specified loops so that the position of a magnetic field generated from the loop is changed according to time, and then a magnitude of the magnetic field corresponding to each position is detected by magnetic field detection means so as to obtain the coordinates of the magnetic field detection means from the time when the magnetic field is detected.

The above-mentioned prior arts differ from the inventions of the second prior art and the fourth prior art in terms of principle of detection, whereas they do not specifically differ from each other in terms of structure. In other words, each of the eighth and ninth prior arts has an appropriate change-over switch for concurrently using one display panel for coordinate detection and image display, and ends of the electrodes for image display on the display panel are short-circuited in the coordinate detection stage so as to form a loop for generating or detecting a magnetic field.

The aforementioned first prior art and second prior art are common in the point that the coordinate detection is performed by means of an LCD panel and an electronic pen. However, they differ from each other in that the former utilizes signal transmission from the LCD panel to the electronic pen whereas the latter utilizes signal transmission from the electronic pen to the LCD panel.

The aforementioned first prior art uses the LCD panel as a signal generator, and detects a signal induced at the electronic pen to detect the coordinates of the electronic pen on the LCD panel. Therefore, in the first prior art, it is indispensable to transmit an output signal induced at the electronic pen from the electronic pen to a signal processor. The above-mentioned matter is a serious obstacle in an attempt at compactly forming the electronic pen. The above is because the electronic pen is required to be provided with a wired or wireless signal transmission means in order to transmit the signal from the electronic pen to the signal processor. For instance, when the signal is transmitted by wire, an appropriate lead wire for signal transmission is necessary. It is apparent that the lead wire is a serious obstacle in use. When a wireless transmission is performed, there is also an advantage that no lead wire is necessary, however, a wireless transmitter for the signal must be incorporated for the above-mentioned purpose. In such a case, for example, when the electronic pen is entirely operated on a battery, it is apparent that a power consumption of the wireless transmitter is a weighty factor in regard to the operating life of the battery, thus being accompanied by a problem that a significant reduction of the operating life of the battery may be incurred. There is also a problem that it is difficult to mount a necessary wireless transmitter circuit into a small space inside the electronic pen.

The above-mentioned problems also take place similarly in the fourth prior art through the ninth prior art.

In contrast to the above, in the second prior art, since a magnetic signal generated by the electronic pen is processed by the LCD panel, there is required no connection cable for transmitting the signal detected by the electronic pen.

However, in the second prior art, it is required to form a loop by short-circuiting the ends of the adjoining electrodes of the LCD panel in the input stage in order to achieve an input function and a display function by means of a single LCD panel, and it is required to open the aforementioned loop in the image display stage. Therefore, an LCD panel control circuit owned by a display/coordinate input function integrated device as in the second prior art has a problem that a switching element having a specific bi-directionality which is not necessary in an LCD panel control circuit owned by an LCD device for performing only image display must be additionally incorporated.

It has been a long time since the industry relevant to the liquid crystal techniques is called an equipment industry. In other words, the liquid crystal techniques belong to an industry having a close relation to a manufacturing equipment. Thus, it tends to be considered that incorporation of a new element as described above can be put into practice very easily by concurrently fabricating such an element. However, the reason why a great amount of semiconductor elements have been conventionally able to be concurrently fabricated is because circuit requirements to the semiconductor elements have been equal to each other, and therefore the required characteristics are consistent. Conversely, it can be said that an expansive equipment can be effectively operated since such a great amount of semiconductor elements having consistent characteristics are concurrently fabricated.

In contrast to the above, the switching element to be newly incorporated, if it is to be incorporated through concurrent fabrication, not only requires circuit requirements significantly different from those of the semiconductor elements which have been conventionally incorporated through concurrent fabrication but also has characteristics quite different from those of the semiconductor elements. To incorporate such a specific semiconductor element newly into an LCD panel increases the amount of development processes of the LCD panel, and this directly connects to reduction of yield and significant cost increase.

Furthermore, according to the technique of the third prior art, it has been required to concurrently connect integrated circuits comprised of a switching element and a control circuit, as represented by the integrated circuits 20a and 20b in FIG. 51, to the LCD panel from the four sides of the panel. (Although the integrated circuits are connected to the LCD panel vertically from two sides in FIG. 51 because only a structure related to the x-axis electrodes is shown. However, since a similar structure is required for the y-axis electrodes, consequently it is required to concurrently connect integrated circuits to the electrodes in four directions, i.e., from the upper, lower, right, and left sides of the panel.) Therefore, an LCD panel for use in such a display/ coordinate input function integrated device is required to be provided with tab connection terminals at the four sides.

In contrast to the above, a generally used LCD panel which performs only image display has a structure in which tab connection terminals are wired from two or three sides of the panel. Therefore, in the aforementioned second prior art, such a generally used LCD panel which performs only image display cannot be applied as it is to the display/ coordinate input function integrated device without making alterations.

It is of course possible to develop specially for the display/coordinate input function integrated device an LCD panel which can newly lead tab connection terminals in four directions from the four sides thereof and can be directly applied to the second prior art. However, for the above-mentioned purpose, a huge amount of investment for an equipment is of course required, which is a serious problem in developing the industry.

Collectively speaking with regard to the second and third prior arts, since the above-mentioned second prior art requires addition of a coordinate input function to a display panel, it is required to newly develop an LCD panel specially for a display/coordinate input function integrated device by making alterations in the LCD panel itself. Furthermore, in the second and third prior arts, since the tab connection terminals wired from the LCD panel are connected to a printed circuit board mounted with an integrated circuit 20, it is required to lead tab connection terminals in four directions from the four sides of the LCD panel. Therefore, in the LCD panel to be used in the third prior art, an occupation area of a printed circuit board included in the LCD panel, or so-called a peripheral edge portion of the LCD panel is dimensionally increased more than in the conventional LCD panel which performs only image display while allowing tab connection terminals to be wired from only two or three sides. The above-mentioned arrangement results in a problem that the display/coordinate input function integrated device as a product including the LCD panel is dimensionally increased.

Furthermore, collectively speaking with regard to all the aforementioned prior arts, the techniques which have been conventionally proposed are all such techniques that require development of a new panel specially for a display/ coordinate input function integrated device by making alterations in a display panel itself in order to incorporate a coordinate input function to the display panel.

Assuming that a panel specially for such a display/ coordinate input function integrated device can be developed, there is a limitation in using the front and rear surfaces of the panel as disclosed in the official gazette of the ninth prior art, resulting in a problem that the front and rear surfaces of the panel cannot be freely used in a product development stage.

In addition, each tab wired from the panel is connected to a printed circuit board or the like mounted with the integrated circuit 20 and the like. Therefore, in a panel provided specially for the display/coordinate input function integrated device where tabs are wired in four directions, the occupation area of each printed circuit board, or so-called the peripheral edge portion is dimensionally increased in comparison with the conventional LCD panel which performs only image display allowing tab connection terminals to be wired in only two or three directions. The above-mentioned arrangement results in a problem that a product assembled with incorporation of the LCD panel dimensionally increases.

Furthermore, in the fourth prior art through ninth prior art, signal transmission to a signal processor for processing a signal outputted from a magnetic field detector is indispensable for the reasons as described above. The above-mentioned fact also causes a problem in terms of signal transmission.

Eventually, it can be considered that the techniques which have been conventionally proposed are all hardly implemented or wasteful in terms of both LCD panel manufacturing cost and application forms of final products.

SUMMARY OF THE INVENTION

The object of the present invention is therefore to provide a coordinate detection device capable of solving the aforementioned problems of the prior arts.

That is, the object of the present invention is to provide a coordinate detection device which obviates the need of newly incorporating into an LCD panel any switching element which has a specific bi-directionality and is capable of switching, and obviates the need of providing a tab connection terminal at four sides of the LCD panel.

That is, the object of the present invention is to provide a coordinate detection device capable of being applied to a device integrated with both an image display function and a coordinate input function without making alterations in an LCD panel which has been conventionally used specially for image display, preventing the increase of development cost and the reduction of yield, and dispensing with investment for equipment which may cause cost increase, thereby totally contributing to development of the industry.

The object of the present invention is to provide a coordinate detection device capable of achieving a coordinate input function-integrated display device solving the aforementioned problems of the prior arts. That is, the object of the present invention is to provide a coordinate detection device which can prevent the problems attributed to the necessity of newly incorporating a switching element which has a specific bi-directionality capable of short-circuiting electrodes provided in the vicinity of an LCD panel at end portions of the electrodes and is capable of switching as well as the problem attributed to the necessity of providing a tab at four sides of the panel, those functions being required in the prior arts. Furthermore, the object of the present invention is to provide a coordinate detection device capable of being applied as it is to a panel of a display/coordinate input function integrated device without making alterations in the LCD panel which has been conventionally used specially for image display, while preventing the increase of development cost and the reduction of yield, and dispensing with unnecessary investment for equipment, thereby totally contributing to development of the industry.

In order to achieve the aforementioned object, there is provided a coordinate detection device comprising: a panel which is provided for coordinate detection and includes a first electrode and a second electrode extending in a direction crossing a direction in which the first electrode extends; a coordinate pointing device which includes an alternating current oscillator and a coil and outputs from its tip end portion an alternating current magnetic field generated by the alternating current oscillator and the coil; an amplifier; switching means for sequentially changing connection of the electrodes of the panel so as to sequentially select the electrodes and electrically connect each selected electrode to the amplifier; and coordinate detection means for detecting coordinates based on a timing at which the electrodes are selected and an output of the amplifier.

In the coordinate detection device having the above-mentioned structure, the AC generator of the coordinate pointing device outputs an AC magnetic field from its tip end. When the outputted AC magnetic field effects on the first and second electrodes of the panel, a voltage corresponding to the amplitude of the AC magnetic field is generated at the first and second electrodes.

Meanwhile, the switching means sequentially switches the connections of the first and second electrodes of the panel so as to connect the selected electrode to the amplifier. Therefore, when the first and second electrodes at which the voltage is induced are each connected to the amplifier, the amplifier amplifies the induction voltage and outputs the resulting signal.

The voltage outputted from the amplifier is inputted to the coordinate detection means. Then, the coordinate detection means detects the coordinates of the coordinate pointing device on the panel based on the timing at which the first and second electrodes are each selected and the output of the amplifier.

Therefore, according to the present invention, the coordinates of the coordinate pointing device can be detected without necessitating a signal line between the coordinate pointing device and the panel. Furthermore, the coordinates of the coordinate pointing device can be detected according to the voltage induced at the first and second electrodes by a magnetic field generated from the coordinate pointing device. Therefore, the first and second electrodes are not required to form a closed loop. Therefore, an LCD panel provided specially for image display can be used as the above-mentioned panel without making alterations. Furthermore, according to the embodiment of the present invention, the first and second electrodes are not required to form a closed loop, and therefore a coordinate detection function can be given to the LCD panel provided specially for image display without providing an electric circuit opposite to the four sides of the LCD panel provided specially for image display. The above-mentioned fact means that the coordinate detection function can be given to the image display device without increasing the size of the image display device having the LCD panel provided specially for image display, and also means that an image display device having a coordinate detection function can be manufactured without making great alterations in the existing manufacturing equipment for the image display device.

Therefore, according to the present invention, there can be provided a coordinate detection device capable of preventing the increase of development cost and the reduction of yield, and dispensing with investment for equipment which may cause cost increase, thereby totally contributing to development of the industry.

Furthermore, according to an embodiment, a material having an electro-optical effect is sealedly filled in a space between two substrates, and the first and second electrodes are arranged on the substrates while making the first and second electrodes concurrently serve as electrodes for image display.

With the above-mentioned arrangement, a display panel for coordinate detection use which can concurrently have a coordinate detection function and an image display function can be provided.

Furthermore, according to an embodiment, the coil of the coordinate pointing device is wound around a core made of a material having a specified magnetic permeability.

Therefore, an output of the AC magnetic field can be concentrated on the core. Therefore, the coordinate pointing ability of the coordinate pointing device can be improved.

Furthermore, according to an embodiment, the core has its fore end portion protruding in a rod-like form.

With the above-mentioned arrangement, a magnetic field can be outputted in a direction in which the fore end portion of the core is directed. Therefore, the coordinate pointing ability can be improved.

Furthermore, according to an embodiment, the coil of the coordinate pointing device is shielded by an electrostatic shield plate.

Furthermore, according to an embodiment, the coordinate pointing device has a battery storing section for storing therein a battery which serves as a power source for the AC oscillator.

Therefore, by storing the battery in the battery storing section, there is no need to supply an electric power to the coordinate pointing device from outside the coordinate pointing device. Therefore, the coordinate pointing device is required to be connected to nothing. The above-mentioned arrangement allows a complete codeless coordinate pointing device to be achieved.

In an embodiment, the coordinate pointing device comprises a battery storing section for storing therein a secondary battery which serves as a power source for the alternating current oscillator and a changing terminal to be electrically connected to the secondary battery when the secondary battery is stored in the battery storing section, and wherein a casing to which the panel is mounted is provided with a storing portion for storing the coordinate pointing device, and a power supply terminal which can supply an electric power to the charging terminal while being electrically connected to the charging terminal of the coordinate pointing device when the coordinate pointing device is stored in the storing portion.

According to the above-mentioned embodiment, when the coordinate pointing device is stored in the storing portion provided at the casing to which the panel is mounted, the charging terminal owned by the coordinate pointing device and the power supply terminal of the casing are electrically connected to each other. Therefore, in the above-mentioned time, the secondary battery stored in the battery storing section of the coordinate pointing device is charged. Therefore, the operating life of the battery which is the power source of the coordinate pointing device can be remarkably increased.

According to an embodiment, the amplifier is implemented by a differential amplifier, and a signal from the electrodes of the panel is amplified in the differential amplifier.

The above-mentioned arrangement has an advantage that external noises which have entered evenly into two inputs of the differential amplifier can be effectively removed.

Furthermore, according to an embodiment, a resonance circuit which resonates with the AC magnetic field generated by the AC oscillator is connected across the output terminal and the inverted input terminal of the differential amplifier.

Therefore, the differential amplifier can selectively amplify the AC magnetic field with a great gain. Therefore, an improved coordinate detection sensitivity can be achieved.

According to an embodiment, the switching means selects at least one pair of adjoining electrodes and connects the selected electrodes to the differential amplifier, and shifts the selected electrode one by one in the direction in which the electrodes are arranged.

Therefore, by shifting the selected electrode, the coordinate pointing device is, so to speak, searched to allow the position coordinates of the coordinate pointing device located in the area where the electrodes are arranged to be securely detected.

Furthermore, according to an embodiment, the switching means selects a pair of adjoining electrodes of the panel, and shifts the selected electrodes one by one in the direction in which the electrodes are arranged.

Therefore, the selection of electrodes can be achieved in a manner simpler than that of the above-mentioned embodiment, thereby allowing the structure of the switching means to be simplified.

In an embodiment, the switching means has a first terminal to be connected in parallel with two or more adjoining electrodes and a second terminal to be connected in parallel with two or more electrodes adjacent to the electrodes connected to the first terminal, and shifts connection of the electrodes to the first terminal and connection of the electrodes to the second terminal one by one in a direction in which the electrodes are arranged.

According to the above-mentioned embodiment, the switching means has the first terminal connected in parallel with two or more adjoining electrodes and the second terminal connected in parallel with two or more electrodes adjacent to the electrodes connected to the first terminal. Therefore, by electrically connecting the first terminal and the second terminal to the differential amplifier, four or more electrodes which are receiving the AC magnetic field outputted from the electrodes of the coordinate pointing device can be connected to the differential amplifier. Therefore, an improved detection sensitivity can be achieved in comparison with the case where only two electrodes of the panel are connected to the differential amplifier.

An embodiment further comprises envelope extraction means for receiving an output from the differential amplifier and extracting an envelope of the output; peak detection means for receiving an output from the envelope extraction means and detecting a peak portion of the output; time counting means for specifying a peak portion detection time at which the peak detection means detects the peak portion; and position coordinate specifying means for specifying coordinates of a position of the coordinate pointing device on the panel based on the peak portion detection time specified by the time counting means and a timing at which the electrodes are selected.

According to the above-mentioned embodiment, the envelope of the output from the differential amplifier is extracted by the envelope extraction means, and a peak portion of the single-humped output from the envelope extraction means is detected. Then, based on the time at which the peak portion is detected and the timing at which the switching means selects the electrodes of the panel, the coordinates representing the position of the coordinate pointing device are specified. Thus, according to the above-mentioned embodiment, a characteristic single-humped signal is outputted from the envelope extraction means, and by detecting the peak portion of the single-humped envelope waveform, coordinate detection can be achieved. Furthermore, in order to specify the coordinates, a signal obtained by removing unnecessary signal components therefrom and being subjected to envelope detection is used, and therefore the detection of the peak portion can be easily achieved.

Furthermore, according to an embodiment, a synchronous detector is provided as the envelope extraction means. The synchronous detector can extract the envelope of the signal without distortion more correctly than the envelope detector, and therefore an improved coordinate detection accuracy can be achieved.

In an embodiment, the coordinate detection means comprises: a first envelope detector which has a relatively great time constant and operates to receive an output from the amplifier and detect an envelope of the output; a second envelope detector which has a relatively small time constant and operates to receive an output from the amplifier and detect an envelope of the output; bottom detection means which subjects a double-humped output from the first envelope detector and a double-humped output from the second envelope detector to a subtraction process so as to detect a bottom portion of the double-humped output outputted from the second envelope detector; time counting means for specifying a bottom portion detection time at which the bottom detection means detects the bottom portion; and position coordinate specifying means for specifying coordinates of a position of the coordinate pointing device on the panel based on the bottom portion detection time specified by the time counting means and a timing at which the electrodes are selected.

According to the above-mentioned embodiment, the coordinate detection means includes a first envelope detector which has a relatively great time constant and operates to receive the output from the amplifier and detect the envelope of the output as well as a second envelope detector which has a relatively small time constant and operates to receive the output from the amplifier and detect the envelope of the output. By subjecting the double-humped output from the first envelope detector and the double-humped output from the second envelope detector to a subtraction process, the bottom portion of the double-humped output outputted from the second envelope detector is detected.

The output of the first envelope detector having a great time constant becomes a double-humped signal where the bottom portion is shallowed, while the output of the second envelope detector having a small time constant becomes a double-humped signal where the bottom portion is not shallowed. Therefore, by subjecting the output from the first envelope detector and the output from the second envelope detector to a subtraction process, a signal having a peak at the bottom portion can be obtained. With the above-mentioned signal, the bottom portion can be detected.

In an embodiment, coordinate detection means comprises: an envelope detector which receives an output from the differential amplifier and detects an envelope of the output; peak detection means which receives an output from the envelope detector, binarizes the output, and detects a peak portion of the output according to the binarized signal; time counting means for specifying a peak portion detection time at which the peak detection means detects the peak portion; and position coordinate specifying means for specifying coordinates of a position of the coordinate pointing device on the panel based on the bottom portion detection time specified by the time counting means and a timing at which the electrodes are selected.

According to the above-mentioned embodiment, the peak detection means detects the peak portion of the single-humped output according to the output obtained by binarizing the single-humped output from the envelope detector. By the above-mentioned binarizing operation, an output in which a difference between the peak portion and non-peak portion of the single-humped output is ascertained can be obtained. Therefore, the peak portion can be easily detected by means of the output, and through detection of the peak portion, a coordinate detection operation can be performed.

In an embodiment, the coordinate detection means comprises: a delay circuit which receives a double-humped output of the amplifier and delays the output by a specified time; a subtracter which subjects the output of the amplifier and an obtained delayed output to a subtraction process, bottom detection means which binarizes a signal outputted from the subtracter, and detects a bottom portion of the double-humped output according to an obtained binarized signal; time counting means for specifying a bottom portion detection time at which the bottom detection means detects the bottom portion; and position coordinate specifying means for specifying coordinates of a position of the coordinate pointing device on the panel based on the bottom portion detection time specified by the time counting means and a timing at which the electrodes are selected.

According to the above-mentioned embodiment, the coordinate detection means includes the delay circuit which receives the output from the amplifier and delays the output by a specified time, the subtracter which subjects the output of the differential amplifier and the delayed output to a subtraction process, and the bottom detection means which binarizes the signal outputted from the subtracter and detects the bottom portion of the double-humped output according to the binarized signal. According to the present embodiment, a preceding peak of the double-humped signal outputted from the differential amplifier and a succeeding peak of the delayed double-humped signal are added together. With the above-mentioned operation, a signal which has three peaks comprised of a highest peak and two low peaks located besides the highest peak obtained through the addition is outputted from the subtracter. Then, by binarizing the signal having the three peaks, a difference between the highest peak portion and the low peak portions is ascertained. The highest peak portion is delayed by the above-mentioned delay time from the bottom portion of the double-humped output which is not delayed. Therefore, the bottom portion can be easily detected according to the binarized signal of which highest peak portion is ascertained, and a coordinate detection operation can be performed through the detection of the bottom portion.

According to an embodiment, there is provided a coordinate detection device comprising: a flat display panel in which a material having an electro-optical effect characteristic is sealedly filled in a space between two substrates, and a plurality of x-axis electrodes and a plurality of y-axis electrodes which are intersecting each other on the substrates; x-axis drive circuit and y-axis drive circuit which are provided for image display use and electrically drive the x-axis electrodes and the y-axis electrodes of the flat display panel respectively; a coordinate pointing device including alternating current magnetic field generating means having therein an alternating current power source and an electrode connected to an output terminal of the alternating current magnetic field generating means; a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, peak detection means which obtains a signal which is supplied from the coordinate pointing device to the electrodes by shifting the selected electrodes as a single-humped signal from the differential amplifier and detects a peak portion of the single-humped signal, and position coordinate specifying means for specifying coordinates based on a time at which the peak portion detecting means detects the peak portion and a timing at which the electrodes are selected; and a display-coordinate detection changeover circuit which time-sharingly complementarily operates the x-axis drive circuit, the y-axis drive circuit, and the coordinate detection circuit.

According to the above-mentioned embodiment, the material having an electro-optical effect characteristic is sealedly filled in the space between the two substrates. The flat display panel including the plural number of x-axis electrodes and the plural number of y-axis electrodes which are intersecting each other on the substrates can be time-sharingly changed over so as to be used for either image display or coordinate detection by means of the image display-coordinate detection changeover circuit. When the flat display panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by a magnetic field generated from the coordinate pointing device which is provided separately with a function of generating an AC magnetic field is detected by the coordinate detection circuit which utilizes a change in potential of the signal, thereby allowing the coordinates of the coordinate pointing device to be detected.

According to an embodiment, there is provided a coordinate detection device comprising: a flat display panel in which a material having an electro-optical effect characteristic is sealedly filled in a space between two substrates, and a plurality of x-axis electrodes and a plurality of y-axis electrodes which are intersecting each other on the substrates; x-axis drive circuit and y-axis drive circuit which are provided for image display use and electrically drive the x-axis electrodes and the y-axis electrodes of the flat display panel respectively; a coordinate pointing device including alternating current magnetic field generating means having therein an alternating current power source and an electrode connected to an output terminal of the alternating current magnetic field generating means; a coordinate detection circuit including an amplifier, a connection switching circuit which selects an x-axis electrode and a y-axis electrode, connects the selected electrodes to the amplifier, and shifts the selected electrodes one by one in a direction in which the selected electrodes are arranged, bottom detection means which obtains a signal which is supplied from the coordinate pointing device to the electrodes by shifting the selected electrodes as a double-humped signal from the amplifier and detects a bottom portion of the double-humped signal by obtaining a phase inversion point of the double-humped signal through calculation of an input signal and an output signal of a delay circuit and detecting the phase inversion point of the double-humped signal, and position coordinate specifying means for specifying coordinates based on a time at which the bottom portion detecting means detects the bottom portion and a timing at which the electrodes are selected; and a display-coordinate detection changeover circuit which time-sharingly complementarily operates the x-axis drive circuit, the y-axis drive circuit, and the coordinate detection circuit.

According to the above-mentioned embodiment, the material having an electro-optical effect characteristic is sealedly filled in the space between the two substrates. The flat display panel including the plural number of x-axis electrodes and the plural number of y-axis electrodes which are intersecting each other on the substrates can be time-sharingly changed over so as to be used for either image display or coordinate detection by means of the image display-coordinate detection changeover circuit. When the panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by a magnetic field generated from the coordinate pointing device which is provided separately with a function of generating a magnetic field is detected by the coordinate detection circuit which utilizes a change in phase of the signal, thereby allowing the coordinates of the coordinate pointing device to be detected.

In a coordinate detection device of an embodiment, a band-pass filter or a high-pass filter for selectively allowing only a signal at and around the frequency of the AC magnetic field to pass is connected to an input terminal of the coordinate detection circuit.

Therefore, the coordinate detection circuit can consistently detect a stabilized voltage from the x-axis electrodes and the y-axis electrodes without being influenced by noises.

In a coordinate detection device of an embodiment, an electrode which is provided at the tip end of the coordinate pointing device provided with a function of generating an AC magnetic field is a coaxial electrode comprised of a center electrode and a peripheral electrode.

Therefore, not depending on which circumferential direction the coordinate pointing device is directed in use, a stabilized voltage can be consistently induced at the x-axis electrodes and the y-axis electrodes.

In a coordinate detection device of an embodiment, the x-axis drive circuit and the y-axis drive circuit for image display use, the coordinate detection circuit, and the display-coordinate detection changeover circuit are arranged along two or three sides of the periphery of the display panel.

According to the present embodiment, a coordinate detection function can be incorporated to the image display device without increasing the size of the display device having an LCD panel provided specially for image display, and a display device having a coordinate detection function can be manufactured without making great alterations in the existing manufacturing equipment for the image display device. Therefore, according to the present embodiment, there can be provided a coordinate detection device capable of preventing the increase of development cost and the reduction of yield, and dispensing with investment for equipment which may cause cost increase, thereby totally contributing to development of the industry.

As described above, according to the present invention, a signal which is generated by a magnetic field generated from the coil of the coordinate pointing device at the electrodes of the panel coupled electro-magnetically with the coordinate pointing device is detected. Therefore, according to the present invention, coordinate detection can be achieved even through the ends of the electrodes of the panel are opened.

The inventor and others have proved through experiments described as follows that a voltage can be induced at the electrodes of an LCD panel by effecting a magnetic field on the electrodes utilizing the electrostatic coupling between the electrodes even through the ends of the electrodes of the panel are opened, and coordinate detection can be achieved.

In contrast to the above, there has been conventionally utilized an electromagnetic coupling in order to dispense with a connection cable, and therefore it has been required to form a loop-shaped circuit composed of panel electrodes of which ends are surely short-circuited. The above is because of a consideration that, in order to detect an induction current based on an inductive electromotive force induced by an effect of a magnetic field, a loop-shaped closed circuit must be formed by surely short-circuiting the ends of the circuit to be subjected to detection. In other words, there has been a consideration that no induction current flows through the electrodes of which ends are opened, and therefore achievement of coordinate detection by means of electrodes of which ends are opened is impossible.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4A is an electric circuit diagram of the electronic pen;

FIG. 4B is a circuit diagram of a power source for another electronic pen provided with a charging mechanism;

FIG. 7 is an explanatory view of a fundamental first experiment relevant to the first embodiment performed by the inventor and others;

DETAILED DESCRIPTION OF THE PREFERRED EMBODIMENTS

The present invention will be described in detail based on several embodiments thereof with reference to the accompanying drawings.

First embodiment

Figure 1:
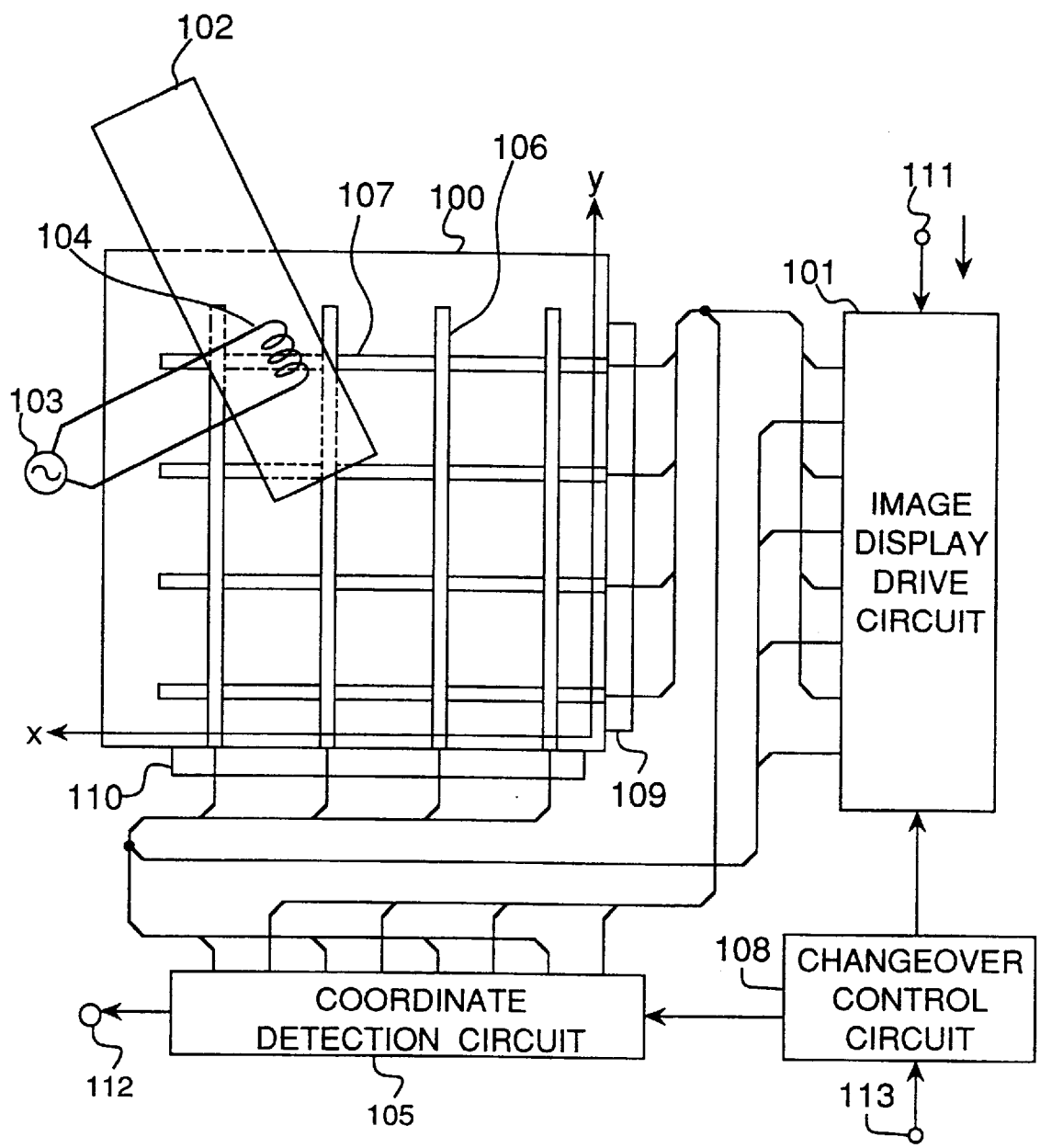
FIG. 1 is an explanatory view of a basic structure of a coordinate detection device according to a first embodiment of the present invention.

First, FIG. 1 shows a dot matrix type duty ratio drive LCD panel as a coordinate detection device according to a first embodiment of the present invention. In the first embodiment, an STN LCD panel 100 is used, however, an active matrix type LCD panel having a TFT can be also used.

FIG. 1 shows a basic structure of the first embodiment. For simplicity of explanation, there are shown four pixels in the x-axis direction by four pixels in the y-axis direction. That is, in the first embodiment, a duty ratio drive LCD panel 100 having a total of 16 pixels used concurrently for image display and coordinate input. Of course, a generic LCD panel which has more pixels and availed on the market can be used in utterly the same manner as described above.

As described hereinafter, the LCD panel 100 to be used can be of course implemented by an LCD panel having the same structure as that of the LCD panel provided specially for image display (this point is one of remarkable features of the present invention).

The first embodiment includes an image display drive circuit 101. The image display drive circuit 101 is an additional circuit that makes it possible for the LCD panel 100 to display an image. It is to be noted that the image display drive circuit 101 has a varied structure when the LCD panel 100 is a TFT type in contrast to the case where the LCD panel 100 is a duty ratio drive LCD panel.

In the first embodiment, the image display drive circuit 101 drives the LCD panel 100 to make the LCD panel 100 display an image of contents that an operator desires. The above-mentioned function is an image display function.

The first embodiment includes a magnetic field generator 102. The magnetic field generator 102 is provided with an AC signal source 103 and a coil 104 connected to the AC signal source 103, and the coil 104 generates an AC magnetic field. In the first embodiment, a coordinate detection function is a function of detecting the coordinates of the magnetic field generator 102 on the LCD panel 100. In detail, as shown in FIG. 1, when an x-axis is defined in a horizontal direction and a y-axis is defined in a vertical direction in an image display section i.e. portion of the LCD panel 100, to detect which position of coordinates (x,y) the magnetic field generator 102 is located in is the coordinate detection function.

In order to achieve the coordinate detection function, the first embodiment has a coordinate detection circuit 105. The coordinate detection circuit 105 has a function such that, when a magnetic field outputted from the magnetic field generator 102 effects on a segment electrode 106 and a common electrode 107 on the LCD panel 100, it detects an induction voltage or current generated at the segment electrode 106 and the common electrode 107 so as to detect the coordinates of the position in which the magnetic field generator 102 is located.

The first embodiment further includes a function changeover control circuit 108. The function changeover control circuit 108 controls the image display drive circuit 101 and the coordinate detection circuit 105 so that the functions of the LCD panel 100 are used by time-sharingly changing over between the coordinate input function and the image display function.

The LCD panel 100 is connected to the image display drive circuit 101 and the coordinate detection circuit 105 via a connector 109 and a connector 110. To the image display drive circuit 101 is externally supplied an image signal to be displayed via a drive terminal 111. From the coordinate detection circuit 105 is outputted outwardly a coordinate signal through a coordinate output terminal 112. To the function changeover control circuit 108 is supplied a function changeover signal through a terminal 113.

Though not shown, an electric power, a clock signal, and so forth for operating the system are supplied to the first embodiment.

The first embodiment has a basic structure as shown in FIG. 1. The first embodiment achieves both the image display function and the coordinate detection function by using a conventional LCD panel provided specially for image display and newly incorporating a coordinate input function to the LCD panel.

In the first embodiment, the image display function utilized the conventional technique without making alterations. The image display function is achieved by the LCD panel 100 and the image display drive circuit 101 shown in FIG. 1. The image display drive circuit 101 takes a variety of forms according to the type or system of the LCD panel 100. For instance, when a duty ratio drive LCD panel is used, the image display drive circuit 101 is provided with a common electrode drive circuit (not shown) and a segment electrode drive circuit (not shown). An operation of the image display drive circuit 101 when it is driven by the image display drive circuit 101 is utterly the same as that of the LCD panel used popularly, and therefore no description is provided therefor herein, and a description will be provided at need hereinafter.

Meanwhile, the coordinate input function of the first embodiment includes a feature of the present invention. The first embodiment includes the magnetic field generator 102 and the coordinate detection circuit 105 to achieve the coordinate input function. A magnetic field generated from the magnetic field generator 102 effects on the LCD panel 100 to cause an electrical change (voltage or current) in the segment electrode 106 and the common electrode 107. Then, the electrical change generated in the segment electrode 106 and the common electrode 107 is detected by the coordinate detection circuit 105. Upon detecting the coordinate position in which the magnetic field generator 102 is located, the coordinate detection circuit 105 outputs a signal representing the coordinate position from the coordinate output terminal 112. The coordinate position signal outputted from the coordinate output terminal 112 can be used for a variety of purposes such as display of the above-mentioned position on the LCD panel 100.

The first embodiment can be provided with a coordinate input function by incorporating the coordinate detection circuit 105 and the magnetic field generator 102 into a conventional LCD panel 100 without making alterations in the panel. The coordinate detection circuit 105 and the image display drive circuit 101 are provided with a function changeover switch (not shown, but described in detail hereinafter). Then, the function changeover control circuit 108 controls the operation of the function changeover switch to set a changeover timing. The function changeover control circuit 108 controls the coordinate detection circuit 105 and the image display drive circuit 101 so that the LCD panel 100 time-sharingly executes the coordinate input function and the image display function.

Thus, a basic principle of the first embodiment, i.e., a basic principle of the present invention is as follows. By means of the LCD panel 100 and the magnetic field generator 102, a magnetic field generated from the coil 104 of the magnetic field generator 102 is effected on the LCD panel 100, and an electrical change (voltage or current) generated at the time in the segment electrode 106 and the common electrode 107 of the LCD panel 100 is detected by the coordinate detection circuit 105. Meanwhile, a necessary image is displayed on the LCD panel 100 by the image display drive circuit 101, and furthermore the image display and the coordinate input are time-sharingly alternately performed under the control of the function changeover control circuit 108.

Figure 2:
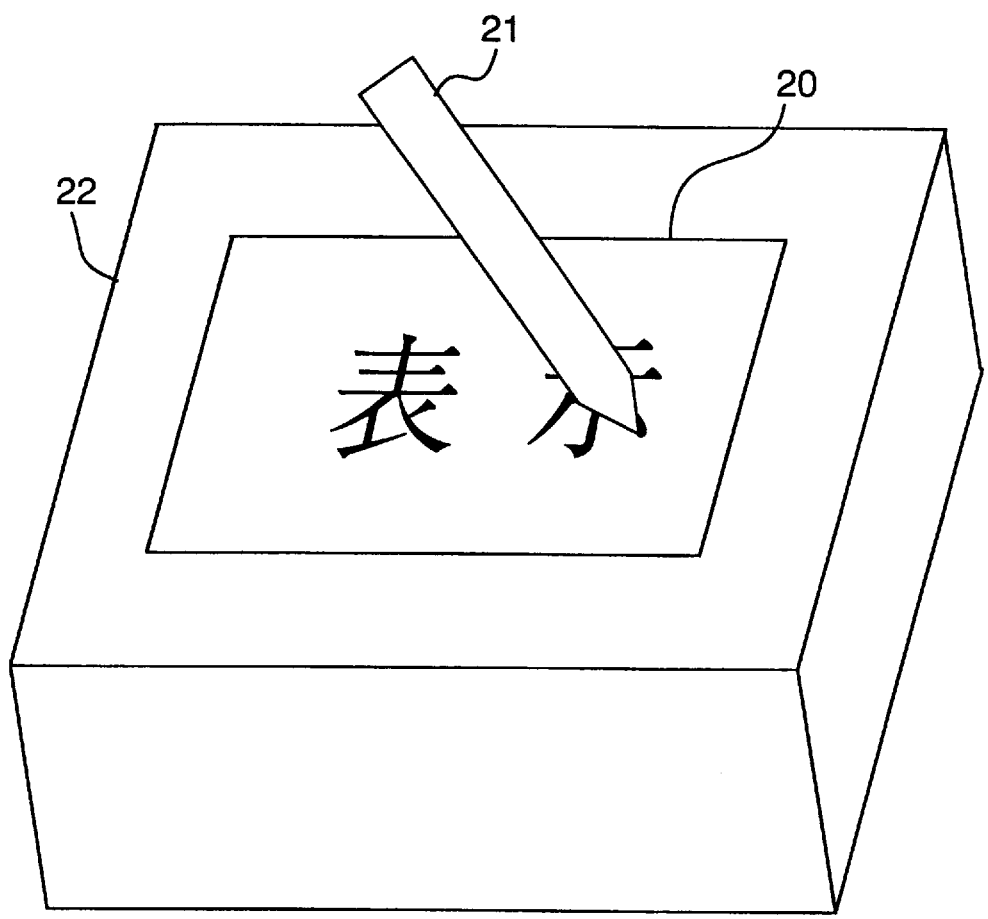
FIG. 2 is an explanatory view of an operation related to the first embodiment.

According to the first embodiment, a basic application example as shown in FIG. 2 can be achieved. The application example has a display panel 20 including the LCD panel 100, the other circuits of the first embodiment, a casing 22 having therein a power supply and so forth, and an electronic pen 21 having therein the magnetic field generator 102. The present application example is operated in a manner as follows. When an operator holds in his or her hand the electronic pen 21 having therein the magnetic field generator 102 as if the pen were a writing pen and put the electronic pen 21 close to the display panel 20 including the LCD panel 100 which serves as an image display panel, an AC magnetic field is outputted from the magnetic field generator 102 to effect the AC magnetic field on the segment electrode 106 and the common electrode 107 of the LCD panel 100. By detecting a voltage generated at the segment electrode 106 and the common electrode 107 by means of the coordinate detection circuit 105, the coordinates of the coil 104 provided at the tip end of the magnetic field generator 102 can be detected (specified) on the LCD panel 100. Then, the detected coordinates can be displayed on the display panel 20 including the LCD panel 100. For instance, an appropriate mark or a trace of movement of the electronic pen 21 having therein the magnetic field generator 102 can be displayed on the display panel 20. Therefore, for instance, the operator who is holding the electronic pen 21 in his or her hand writes Chinese characters of "Hyoji" meaning display on the display panel 20, the characters of "Hyoji" can be displayed on the panel.

In a second application example, the magnetic field generator 102 shown in FIG. 1 is incorporated in a pen-shaped electronic pen 21. The electronic pen 21 is of course codeless having no connection cord for connection with the display panel 20, and therefore the electronic pen 21 is completely independent of the display panel 20. According to the second application example, when the operator traces the surface of the display panel 20 with the electronic pen 21, the coordinates at the tip end of the electronic pen 21 can be detected. Then, by lighting the above-mentioned coordinates on the display panel 20, the trace of the tip end of the electronic pen 21 can be displayed on the display panel 20. In other words, an image can be written on the display panel 20 as if it were written on a paper sheet.

Figure 3:
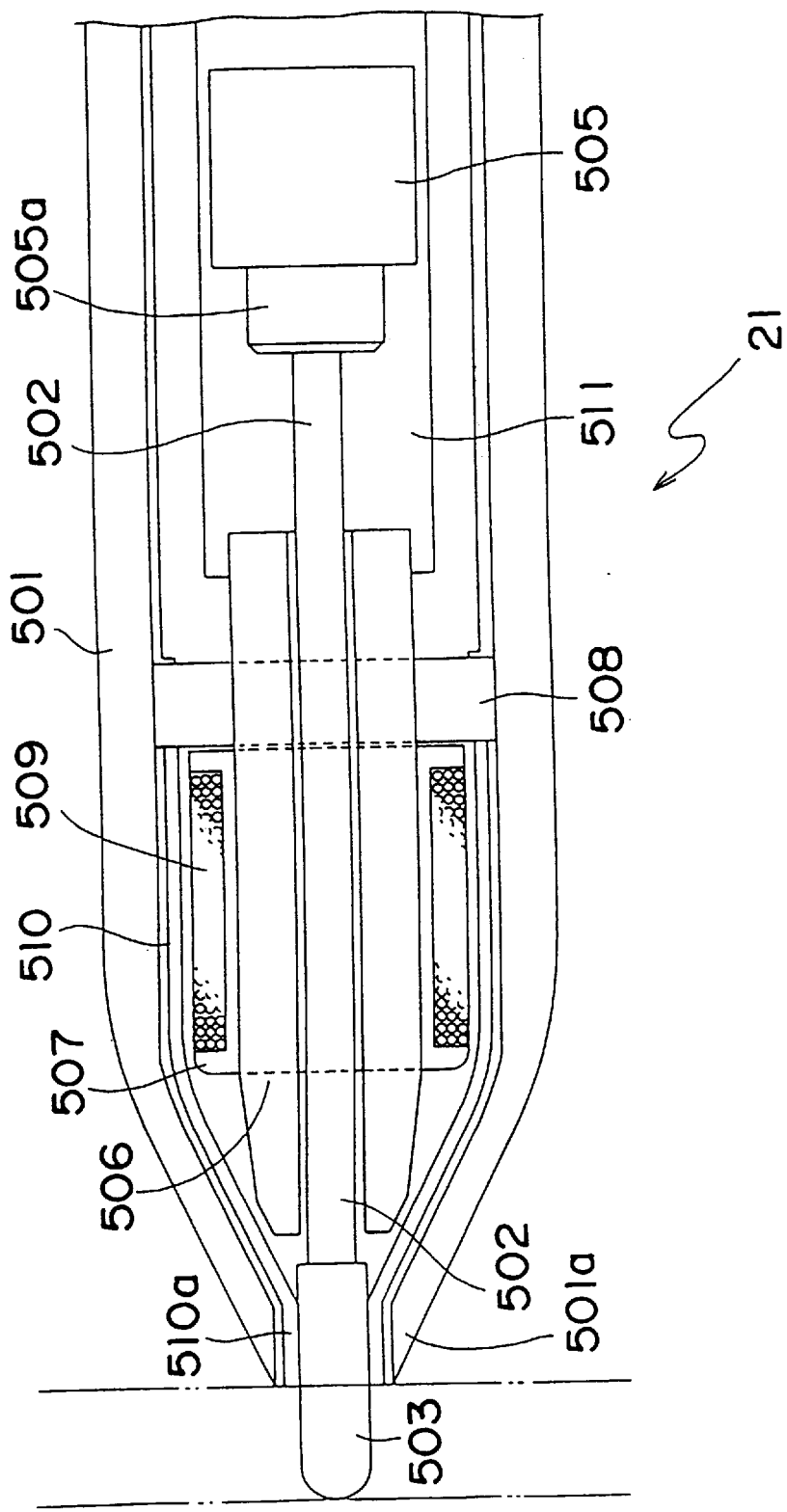
FIG. 3 is an explanatory view of a basic structure of an electronic pen (magnetic field generator) of the first embodiment.

A structure of the electronic pen 21 will be described in more detail below. As shown in FIG. 3, the electronic pen 21 includes an outermost casing 501 having a cylindrical fore end portion, a switch rod 502 which serves as an inner electrode arranged in an appropriate center portion of the casing 501, a cap-shaped cover 503 which covers the tip end of the switch rod 502, and an outer electrode 510. The outer electrode 510 has a cylindrical configuration along an inner peripheral surface of the casing 501, and a hind end portion thereof is fixed to a support member 508 fixed to the inner peripheral surface. A tip end portion 510a of the outer electrode 510 is put in contact with an outer peripheral surface of the cover 503, and the cover 503 can freely slide in the tip end portion 510a of the outer electrode 510.

The cover 503 is protruding from an opening 501a at the tip end of the casing 501. Meanwhile, a hind end of the switch rod 502 is connected to a movable portion 505a of an operation switch 505. The operation switch 505 is fixed to an electric circuit board 511 screwed to a boss (not shown) formed on the inner peripheral surface of the casing 501. A contact point of the operation switch 505 operates when the switch rod 502 axially presses the movable portion 505a. When the movable portion 505a is not pressed, the operation switch 505 repels the switch rod 502 in a direction in which the switch rod 502 protrudes by an operation of a spring incorporated in the switch so as to hold the switch rod 502 in a specified position.

A ferrite core 506 which has a tapered cylindrical fore end portion and serves as a core, a bobbin 507 provided around the ferrite core 506 and a coil 509 comprised of an enameled wire wound around the bobbin 507 are provided around an appropriate axial center of the switch rod 502. An outer diameter of the ferrite core 506 and an inner diameter of the bobbin 507 are approximately equal to each other, and the bobbin 507 is fixed to the ferrite core 506. The ferrite core 506 and the bobbin 507 are fixed inside the casing 501 by means of the support member 508 adjacent to the bobbin 507. The casing 501 has therein a battery (not shown) which serves as a power source.

FIG. 4A shows an electric circuit of the electronic pen 21. As shown in FIG. 4A, integrated circuits IC1 and IC2, resistors R1 and R2, and capacitors C1 and C2 provided for the electric circuit are constituting a well-known oscillator circuit. An oscillation frequency is determined by a combination of the resistors R1 and R2 and the capacitors C1 and C2. The electric circuit further includes buffer amplifiers IC3 and IC4. The electric circuit further includes a serial resonance circuit comprised of an inductance L1 and a capacitor C3. The resonance circuit resonates at a frequency synchronized with the oscillation frequency of the oscillator circuit. The inductance L1 is implemented by the coil 509.

Further, an electric power is supplied from a battery B1 to the integrated circuits IC1 through IC4. The electric power of the battery B1 is supplied when a switch SW1 comprised of the operation switch 505 is turned on.

Parts constituting the above-mentioned electric circuit are all mounted on the electric circuit board 511 except for the coil L1 (i.e., the coil 509) and the battery B1. As shown in FIG. 4A, a terminal of the battery B1 is connected to the outer electrode 510 by way of a lead wire. Consequently, the outer electrode 510 operates as an electrostatic shield.

In the electronic pen 21 having the above-mentioned structure, when the switch SW1 is closed to supply an electric power to the electric circuit to start operating, the oscillator circuit oscillates to supply a signal to the serial resonance circuit comprised of the inductance L1 and the capacitor C3. Since the resonance frequency of the serial resonance circuit and the oscillation frequency of the oscillator circuit are coinciding with each other, there is generated a voltage Q times as high as an oscillation voltage supplied to the serial resonance circuit. It is to be noted that Q represents a Q-value of the coil 509. Assuming that the Q-value is 20 and the supply voltage is 5 Vp-p, there is generated a voltage of about 100 Vp-p across the capacitor C3 and the coil 509. Then the coil 509 generates an intense magnetic field by the voltage, and the magnetic field is radiated from the ferrite core 506. Since the ferrite core 506 has a greater magnetic permeability than that of air, the magnetic field generated from the coil 509 can be concentrated on the ferrite core 506. Therefore, a coordinate pointing ability of the electronic pen 21 can be improved. Furthermore, since the ferrite core 506 has its fore end portion protruding from the coil 509, a magnetic field can be outputted in a direction in which the fore end portion of the rod-shaped ferrite core 506 indicates, thereby allowing the coordinate pointing ability to be improved.

Since the operation switch 505 is so constructed that its contact point is closed when pressed by the switch rod 502, the switch rod 502 presses the operation switch 505 by its pressure force when the electronic pen 21 is pressed against the surface of the LCD panel 100. With the above-mentioned operation, an electric power is supplied to the integrated circuits IC1 through IC4 provided in the electronic pen 21. In other words, the electronic pen 21 operates only when the electronic pen 21 is pressed against the LCD panel 100, and does not operate in any other time to prevent the wasteful consumption of the electricity of the battery B1. The above-mentioned arrangement is effective for prolonging the operating life of the battery Bi. The above is because the battery Bi is implemented by a battery such as a disk-shaped button battery having a very small capacity so that the battery can be stored in the thin casing 501.

Figure 5:
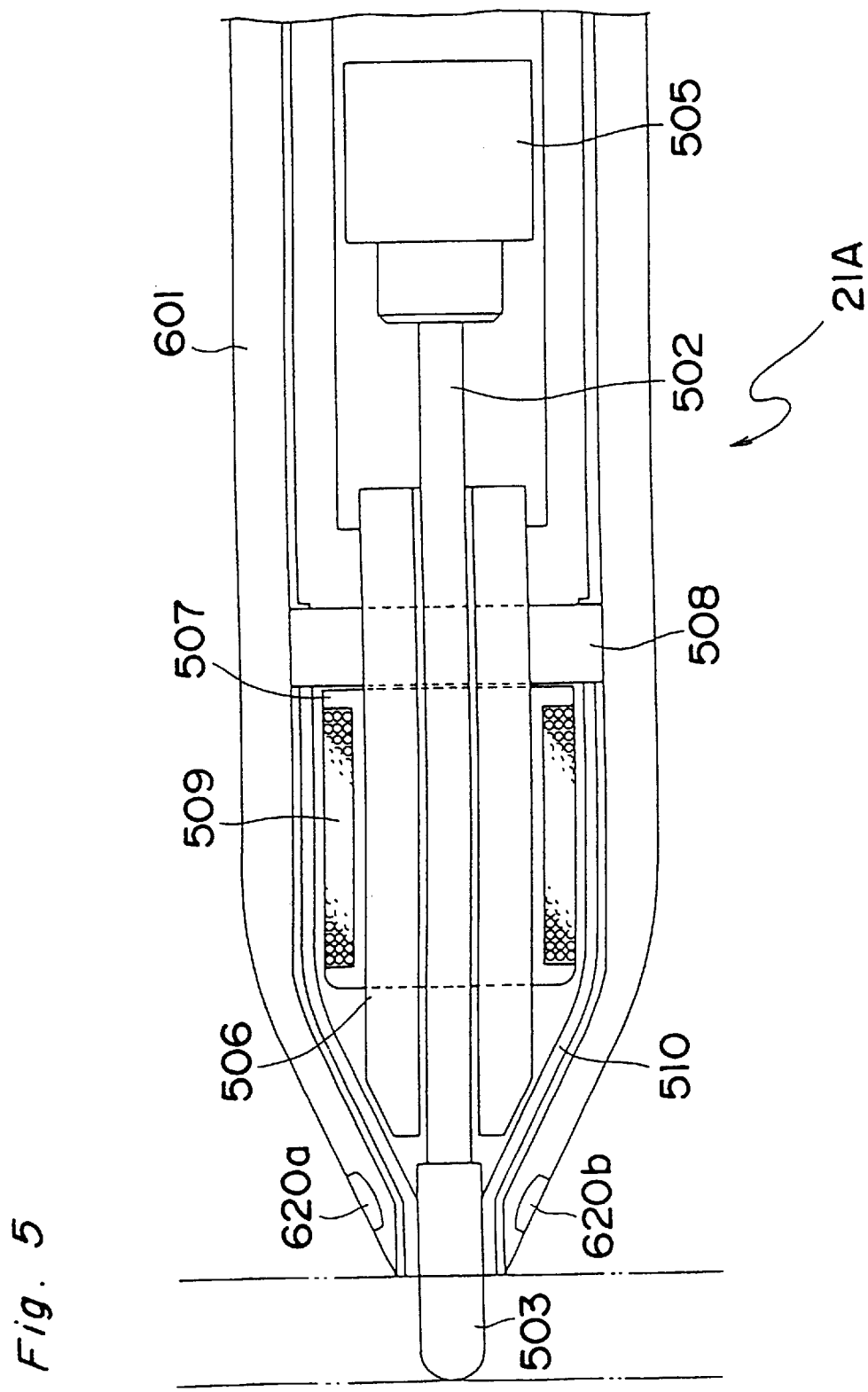
FIG. 5 is a view of a structure of the electronic pen provided with the charging mechanism.

Next, FIG. 5 shows a structure of an electronic pen 21A provided with a rechargeable battery in place of the battery B1 together with a charging mechanism for the battery. According to the electronic pen 21A, the operating life of the battery can be remarkably prolonged.

In the present case, a power supply circuit for the pen is as shown in FIG. 4B. A battery B2 is rechargeable and is implemented by a nickel-cadmium battery or the like.

Figure 6A:
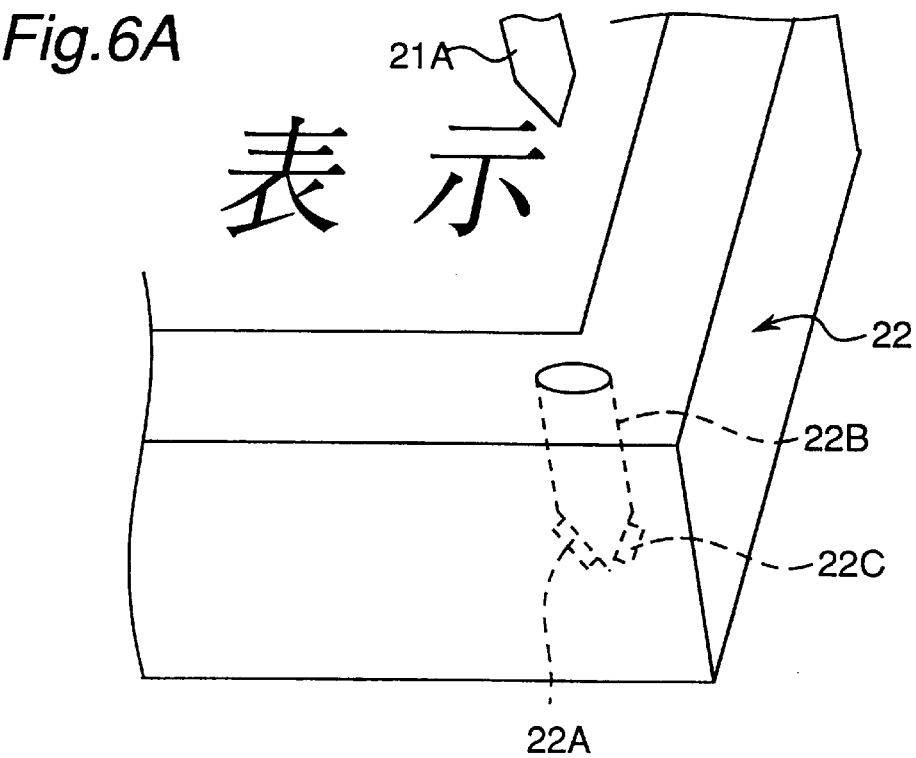
FIGS. 6A and 6B are perspective views for explaining an operation of storing the electronic pen provided with the charging mechanism in a storing portion and charging the electronic pen.
Figure 6B:
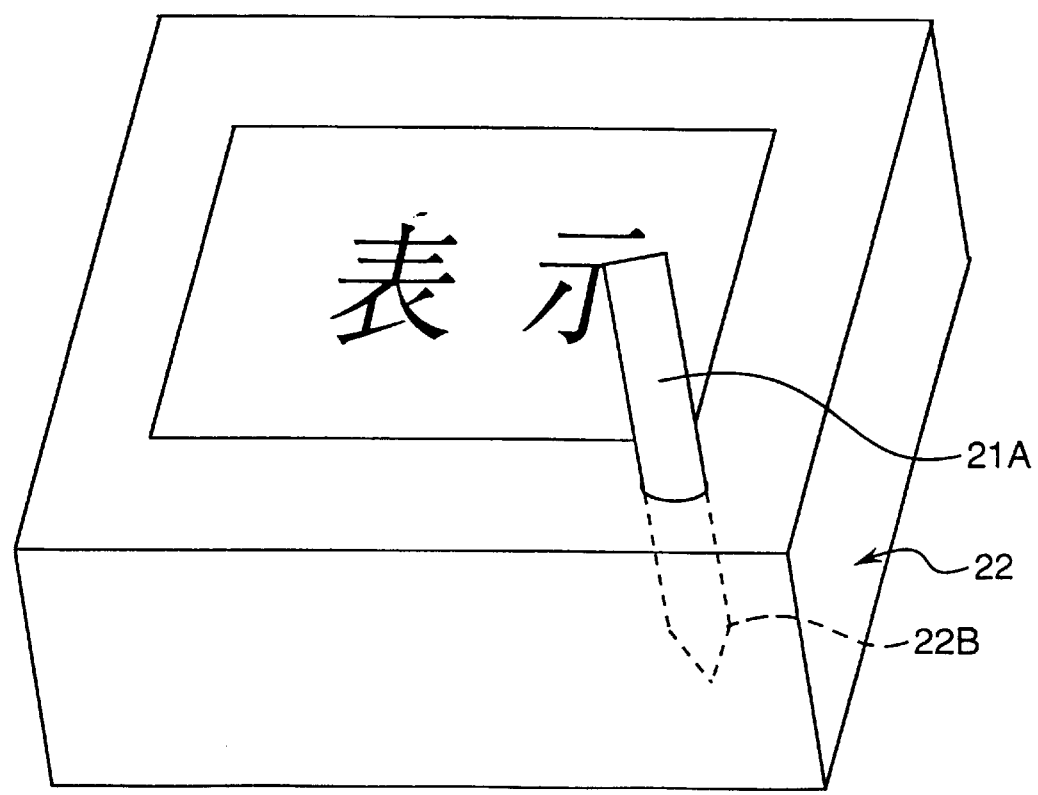

As shown in FIG. 5, the electronic pen 21A further includes charging power supply terminals 620a and 620b for charging the battery B2 at a tip end of a casing 601 constituting the fore end portion of the pen. On the other hand, as shown in FIG. 6A, terminals 22A and 22C for supplying electric power to the electronic pen 21A are provided in a pen storing portion 22B provided in a casing 22 of a word processor or the like. As shown in FIG. 6B, when the electronic pen 21A is not used, the electronic pen 21A is stored in the pen storing portion 22B to put the power supply terminals 620a and b in contact with the terminals 22A and 22C of the casing 22, thereby allowing the battery B2 of the electronic pen 21A to be automatically charged—via the power supply terminals 620a and b.

According to the electronic pen 21A, so long as the electronic pen 21A is stored in the above-mentioned specified pen storing portion 22B even when the coordinate detection device is kept unused, the battery B2 is regularly charged. Furthermore, even when the coordinate detection device is used, by storing the electronic pen 21A in the above-mentioned specified pen storing portion 22B while the electronic pen 21A is not used, the battery B2 can be charged. Since the electronic pen 21A operates only when an inner electrode 602 is pressed against the LCD panel 100 similarly to the electronic pen 21, the working power is very small. Furthermore, the electronic pen 21A can be charged while it is stored in the above-mentioned specified pen storing portion 22B, the quantity of used power can be restored to allow the operating life of the battery to be remarkably prolonged.

It is to be noted that a power source necessary for charging the battery is of course connected to the power supplying terminals 22A and 22C provided in the pen storing portion 22B of the casing 22 of word processor or the like. It is also acceptable to turn on and off the power source for the charging use by detecting a charge state of the battery from the terminals 22A and 22C.

The power consumption of the electronic pen 21 or 21A is about 2 mW. In contrast to the above, when a transmitter is provided in the pen, at least an oscillator and a modulator are necessary, and therefore the power consumption is about 10 mW.

Next, a principle of operation of detecting the coordinates of the coil 104 at the tip end of the magnetic field generator 102 in the first embodiment of the present invention shown in FIG. 1 will be described.

The principle of operation of coordinate detection in the first embodiment is basically as follows. A magnetic field generated from the coil 104 of the magnetic field generator 102 is effected on the segment electrode 106 and the common electrode 107 of the LCD panel 100 to electromagnetically couple the coil 104 of the magnetic field generator 102 with the segment electrode 106 and the common electrode 107 of the LCD panel 100. Then an induction voltage (or induction current) generated at the segment electrode 106 and the common electrode 107 is detected.

Therefore, according to the first embodiment which does not necessitate a connection cord extending from the magnetic field generator 102 to the LCD panel 100, the magnetic field generator 102 can be easily handled in contrast to the first prior art which indispensably necessitates a connection cable between the pen and the panel. Furthermore, according to the first embodiment, there is no need to make alterations in the LCD panel itself in contrast to the second prior art which requires formation of loops in the LCD panel.

Thus, according to the first embodiment, the problems of the second prior art and the like which adopt a system taking advantage of a magnetic coupling in order to eliminate the connection cable from the electronic pen (the problem that a loop-shaped coil is required to be formed by short-circuiting the ends of the electrodes of the LCD panel in the coordinate detection stage) can be solved.

The first embodiment can detect the coordinates of the pen without necessitating neither the loop-shaped coil of which ends are short-circuited nor the connection cable. Therefore, a structure simpler than that of any prior art can be achieved, and the pen for coordinate input use can be easily handled.

Next, a fundamental experiment conducted by the inventor and others will be described with reference to FIG. 7. In FIG. 7, an LCD panel 200 is a dot matrix type duty ratio drive LCD panel using STN liquid crystals. A display section of the LCD panel 200 has a lateral dimension x longitudinal dimension of 230 mm×140 mm. For simplicity, there are shown only four common electrodes 201 and four segment electrodes 202 in FIG. 7, however, there are practically included laterally 640 pixels×longitudinally 480 pixels in the above-mentioned display section. A pixel pitch is about 360 $\mu$m, while a width of each electrode is about 330 $\mu$m. Further, transparent electrodes constituting the common electrodes 201 and the segment electrodes 202 has a thickness of about 1 $\mu$m.

Two glass plates (not shown) owned by the LCD panel 200 are arranged as separated apart from each other by a gap of about 7 $\mu$m, and a liquid crystal material is interposed between the two glass plates.

The common electrodes 201 and the segment electrodes 202 are connected to peripheral circuits via a connector 2010 and a connector 2011 provided on the glass plates constituting the LCD panel 200.

One end of the common electrodes 201 (extending laterally) owned by the LCD panel 200 is collectively connected to a ground. Meanwhile, one end of the segment electrodes 202 (extending longitudinally) is entirely opened.

An AC power source 203 provided in a magnetic field generator MG has its output terminal connected to a serial resonance circuit 204 constituted by a coil 206 and a capacitor 207.

A generation frequency of the AC power source 203 was set at 65 kHz. Meanwhile, a resonance frequency of the serial resonance circuit 204 was also set at 65 kHz. In the present case, a voltage across both terminals of the coil 206 was 100 Vp-p.

When the serial resonance circuit 204 was put close to the LCD panel 200, an intense electro-magnetic coupling took place between the coil 206 of the magnetic field generator MG and a segment electrode 202a of the LCD panel 200.

When the coil 206 of the serial resonance circuit 204 is put close to the LCD panel 200, a potential difference took place between the segment electrode 202a to which the coil 206 is put close among the segment electrodes 202 and the ground. The potential difference was a sort of alternating current and its frequency coincided with the frequency of the AC power source 203.

A positional relation between the coil 206 and the LCD panel was such that the core of the coil 206 was perpendicular to the LCD panel 200.

Figure 8:
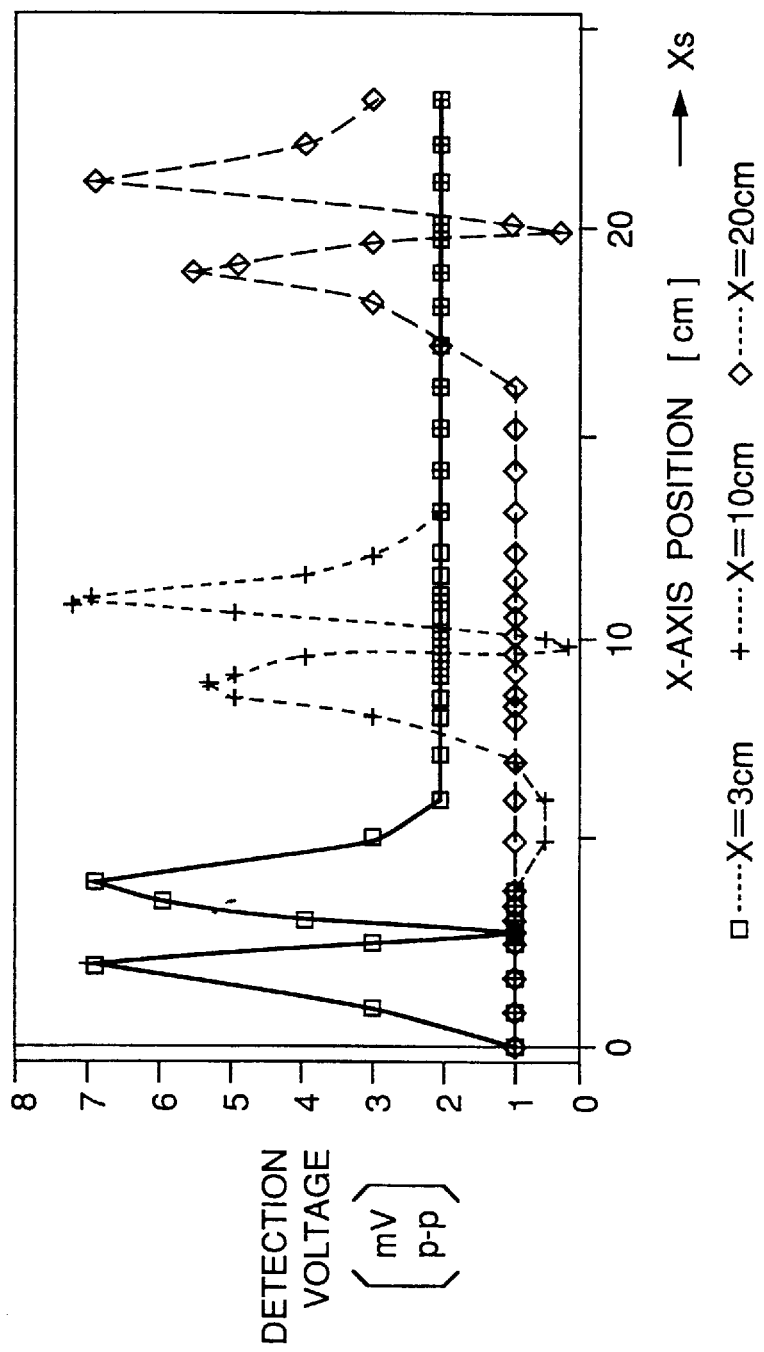
FIG. 8 is a graph showing a result of the fundamental experiment.

With an x-axis and a y-axis set in a manner as shown in FIG. 7 and the coil 206 placed at each of coordinates of (x,y)=(3,5)[cm], (x,y)=(10,5)[cm], and (x,y)=(20,5)[cm], it was actually measured how much degree of potential difference was generated across the segment electrode 202 located in a position of xs=0 to 16 cm and the ground. A result of the measurement is shown in FIG. 8. The axis of ordinates of FIG. 8 represents a measured AC potential difference. The frequency of the measured alternating current coincided with the frequency of the AC power source 203.

Referring to FIG. 8, a detected potential difference between the ground and the segment electrode 202 takes its minimum value at the segment electrode 202a located just below the coil 206 of the serial resonance circuit 204, and it is apparent that the potential difference varies around the minimum point. Furthermore, the variation of the potential difference at and around the x-coordinate position at which the minimum point is located exhibits a very steep change, and reduction of the potential difference becomes gradual according as the measurement point is apart from the minimum point. The above-mentioned tendency can be observed at the three points (x=3 cm, 10 cm, 20 cm) at which the coil 206 of the serial resonance circuit 204 is located, meaning that substantially same tendency is observed regardless of the x-coordinate position.

Though not shown in FIG. 8, the detected AC potential difference exhibited a phase difference of 180° between both sides of the minimum point (occasionally referred to as a "bottom" hereinafter for simplicity) between bilateral peaks (each being occasionally referred to as a "peak" hereinafter) which are located on the right and left sides of the minimum point.

Since the detected potential difference depends on the position of the serial resonance circuit 204, the potential difference can be considered to be, so to speak, a signal representing the position of the serial resonance circuit 204. Consequently, by detecting the bottom position Xs [cm] of the double-humped signal while observing, for example, a variation of amplitude or a variation of phase, the x-coordinate value of the position in which the serial resonance circuit 204 is located can be ascertained.

Thus the reason why the voltage can be detected has been described.

Figure 9:
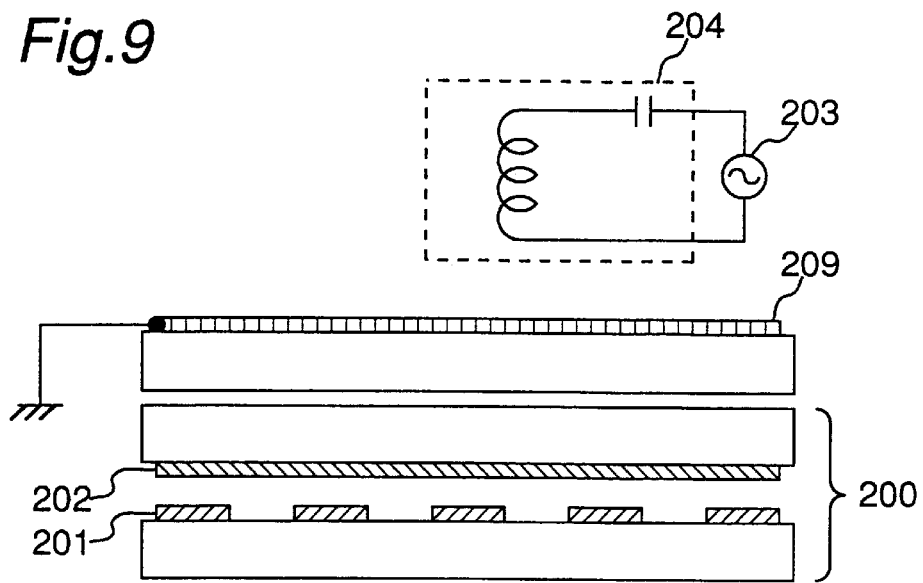
FIG. 9 is an explanatory view of a second experiment performed by the inventor and others.

First, a voltage having the same frequency as that of the AC power source 203 can be detected in the present fundamental experiment, which is presumably ascribed to a voltage induced as the result of a coupling between the LCD panel 200 and the serial resonance circuit 204. In regard to the above coupling, capacitive coupling and inductive coupling can be considered. In order to examine which of them is taking effect on coupling, a transparent electrode 209 deposited on a glass plate is inserted in between the serial resonance circuit 204 and the LCD panel 200 and connected to the ground in a manner as shown in FIG. 9. When the transparent electrode 209 connected to the ground is inserted in between the serial resonance circuit 204 and the LCD panel 200, the capacitive coupling is interrupted. Meanwhile, inductive coupling suffers a loss due to an eddy current generated in the transparent electrode 209. However, the used transparent electrode has an electric resistance of about 1 k$\Omega$/square, the eddy-current loss is considered to be relatively small. Therefore, if an output is obtained after the insertion of the transparent electrode, it can be considered that an inductive coupling is generated.

Consequently, a result similar to that of FIG. 8 was obtained, so that generation of an inductive coupling was confirmed.

Further, the experiment of FIG. 7 was also performed by reversing the LCD panel 200. When the LCD panel 200 is inverted, a spatial relation between the common electrode 201 and the segment electrode 202 is inverted. For instance, if the common electrode 201 connected to the ground is located below the segment electrode 202 before the LCD panel 200 is inverted, the grounded common electrode 201 is located above the segment electrode 202 by inverting the panel 200. In other words, the grounded common electrode 201 is arranged on the serial resonance circuit 204 side, and therefore the serial resonance circuit 204 is to be coupled with the segment electrode 202 via the grounded common electrode 201. In the present case, the grounded common electrode 201 operates as an electrostatic shield with respect to the segment electrode 202. Therefore, if the coupling is electrostatic, presumably almost no signal is detected. However, the experiment result was utterly the same as that of FIG. 8. Therefore, the coupling between the serial resonance circuit 204 and the segment electrode 202 is considered to be at least not electrostatic but inductive.

In the above-mentioned case, a magnetic field causing an inductive coupling is considered to be generated from the coil 206 of the serial resonance circuit 204.

In order to detect a signal according to such a system in a manner similar to every one of the conventional coordinate detection methods utilizing a magnetic field, a loop is required to be formed in the electrodes of the LCD panel 200. When a loop is formed in the electrodes of the LCD panel 200 in an appropriate form, it is apparent that an electromotive force is generated at the LCD panel 200 by electromagnetic induction from the serial resonance circuit 204 to flow a current through the loop.

However, according to the experiment of the present embodiment, there is adopted neither interposition of a switch nor formation of a loop by connecting a real wire or another means in contrast to the conventional techniques. Nevertheless, a voltage was detected at the electrodes of the LCD panel 200. Therefore, the LCD panel 200 was examined as a two-dimensional model.

In the LCD panel 200, the segment electrode 202 and the common electrode 201 are perpendicular to each other, and a gap between the segment electrode 202 and the common electrode 201 is very small on the order of several micrometers. Therefore, the segment electrode 202 and the common electrode 201 have an infinitesimal electrostatic capacitance at every intersection of the segment electrode 202 and the common electrode 201. Furthermore, the segment electrode 202 and the common electrode 201 are formed of a transparent conductive film and have an electric resistance. By taking the LCD panel 200 used in the experiment of FIG. 7 as an example and assuming that an electrode area is 330 $\mu m^2$, an electrode interval is 7 $\mu m$, and a dielectric constant of the liquid crystal material is 5, the infinitesimal electrostatic capacitance C formed at every intersection of the electrodes 202 and 201 is calculated on trial as follows:

$$C=((330\times10^{-6})^2/7\times10^{-6})\times5\times8.855\times10^{-12}[F]=0.7\times10^{-12}[F]=0.7[pF]$$

It is well known that the dielectric constant of the liquid crystal material varies greatly depending on the state of the liquid crystals. For instance, the dielectric constant of the liquid crystal material possibly varies by about two to three times depending on when the material exhibits a white color or when it exhibits a black color. However, according to experimental data, the infinitesimal electrostatic capacitance C can be considered to be about 1 pF per pixel in average.

Figure 10:
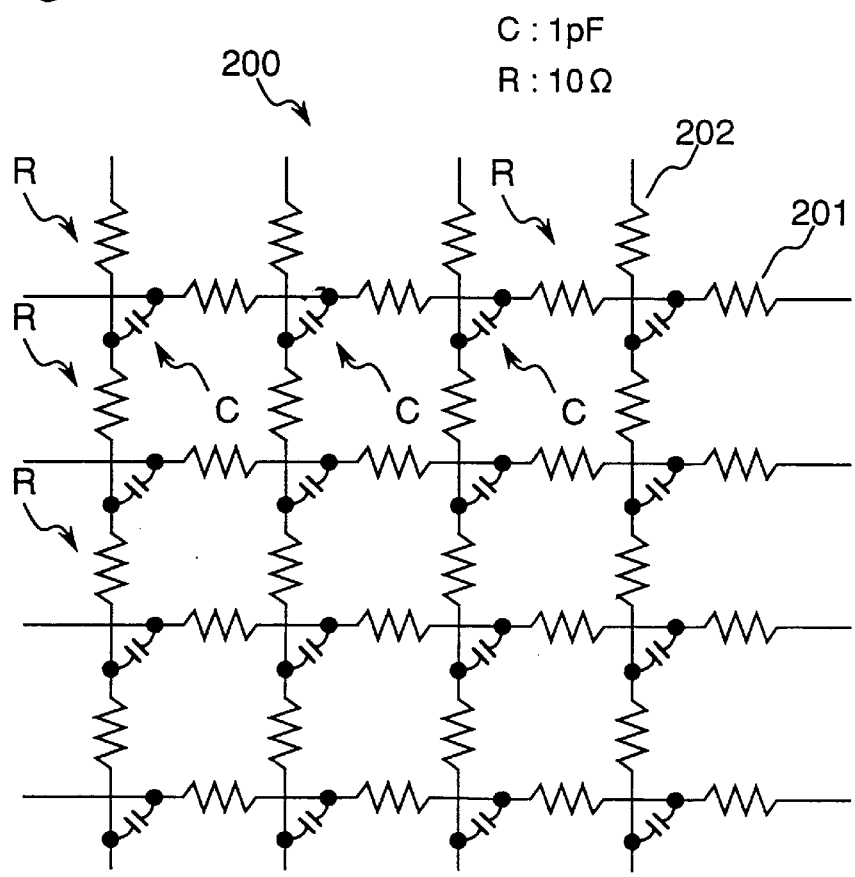
FIG. 10 is an electric equivalent circuit diagram for explaining an infinitesimal electrostatic capacity C existing across electrodes of an LCD panel 200.

An electric resistance of a transparent film used for the electrodes of the LCD panel is about 10 ($\Omega$/pixel). Therefore, an electric model of the LCD panel 200 can be considered to be generally a model as shown in FIG. 10. In FIG. 10, a model of the LCD panel is expressed by a resistance R of 10 ($\Omega$/pixel) representing an electrode wire and a capacitor having an infinitesimal capacitance C of 1 (pF/pixel) located at each intersection of the segment electrode 202 and the common electrode 201.

Figure 11:
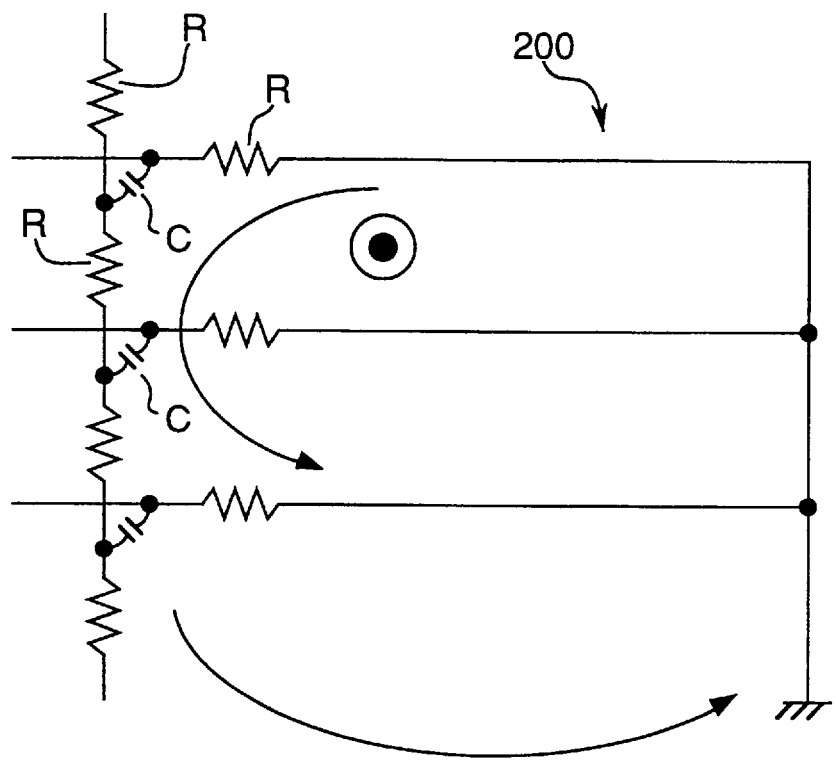
FIG. 11 is an equivalent circuit diagram showing how an electromotive force is generated by a magnetic field penetrating the LCD panel 200.

In the above place, the capacitor C of 1 pF has an impedance of about 1.5 M$\Omega$ with respect to an alternating current at a frequency of, for example, 100 kHz. Therefore, a capacitor formed by connecting one hundred elements of the capacitor C has an impedance of 15 k$\Omega$. An actual LCD panel has a huge amount of pixels composed of laterally 640 pixels by longitudinally 480 pixels (i.e., 640×480 pixels), where each one of the pixels corresponds to a capacitor of 1 pF. Therefore, an impedance of about 1 k$\Omega$ or 10 k$\Omega$ can be easily obtained. In regard to the above, though there is no direct current closed loop in the LCD panel 200 as shown in FIG. 10, the above-mentioned great amount of infinitesimal capacitances C and resistances R constitute an impedance which can be ignored with respect to an alternating current at a frequency of about 100 kHz. Consequently, it can be considered that an alternating current closed loop which can be regarded substantially as a closed loop with respect to an alternating current is formed in the electrodes of the LCD panel, and a voltage induced in the closed loop can be detected. The above-mentioned state is shown in FIG. 11. In FIG. 11, a circle having a black dot in its center represents a state in which a magnetic field exerted from the serial resonance circuit 204 is penetrating an electric circuit constituted by the resistance R and the capacitor C, while a direction in which the magnetic field is penetrating the electric circuit is directed from the rear surface side to the front surface side of the sheet on which the electric circuit is illustrated. Further, in FIG. 11, each arrow indicates a direction in which an electromotive force induced in the electric circuit by the magnetic field flows a current.

Figure 12:
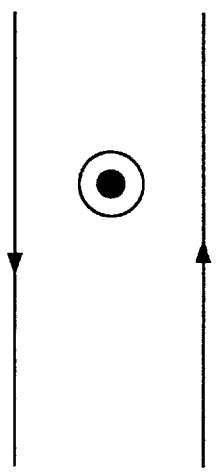
FIG. 12 is a schematic view of an electro-magnetic arrangement of a magnetic field from a serial resonance circuit 204 and segment electrodes.

The reason why the phase of the detection voltage is inverted on the right and left sides of the minimum point of the detection voltage shown in FIG. 8 is presumably that a direction in which the magnetic field exerted from the serial resonance circuit 204 intersects the segment electrodes 202 differs between the right and left sides of the serial resonance circuit 204 as shown in FIG. 12. The direction in which the magnetic field induces an electromotive force in the segment electrode 202 conforms to the right-handed screw rule, and therefore the detection voltage is inverted in phase between the right and left sides of the serial resonance circuit 204.

In the above-mentioned experiment, the potential difference between the segment electrodes 202 and the ground is detected with the common electrodes 201 all connected to the ground. However, a potential difference can be also detected from the common electrodes relative to the ground with the segment electrodes all connected to the ground. Though a result is not mentioned herein, a result S similar to that of FIG. 8 is obtained.

In the experiment of FIG. 7, a double-humped signal having peaks with respect to the serial resonance circuit 204 is detected, and the bottom represents the x-coordinate value of a position in which the serial resonance circuit 204 is located. Also, it is found from FIG. 9 that the coupling between the pen and the LCD panel 200 is an electromagnetic induction coupling. When the LCD panel shown in FIG. 7 is inverted with respect to front and rear surfaces thereof, a result similar to that of FIG. 8 is obtained, either.

Therefore, by performing on the common electrode side a detection operation similar to that performed on the segment electrode side so as to obtain a y-coordinate value, the coordinates (x,y) of the serial resonance circuit 204 can be specified. (In this case, the segment electrodes operate as a shield between the pen and the common electrodes, because the segment electrodes are connected to the ground. However, it is confirmed to perform a detection operation without any trouble even in the above case, by the experiments of reversing the LCD panel 200 and FIG. 9, and so on.)

As described above, according to the above-mentioned experiment, it is discovered that a signal depending on the position of the serial resonance circuit 204 can be detected on the side of the LCD panel without forming any loop by purposely connecting the ends of the electrodes. Furthermore, it is discovered that the position of the serial resonance circuit 204 on the LCD panel can be specified without connecting the ends of the electrodes of the LCD panel by utilizing the above-mentioned fact. In other words, the principle discovered from the above-mentioned experiment can be applied to the coordinate detection device.

Figure 13:
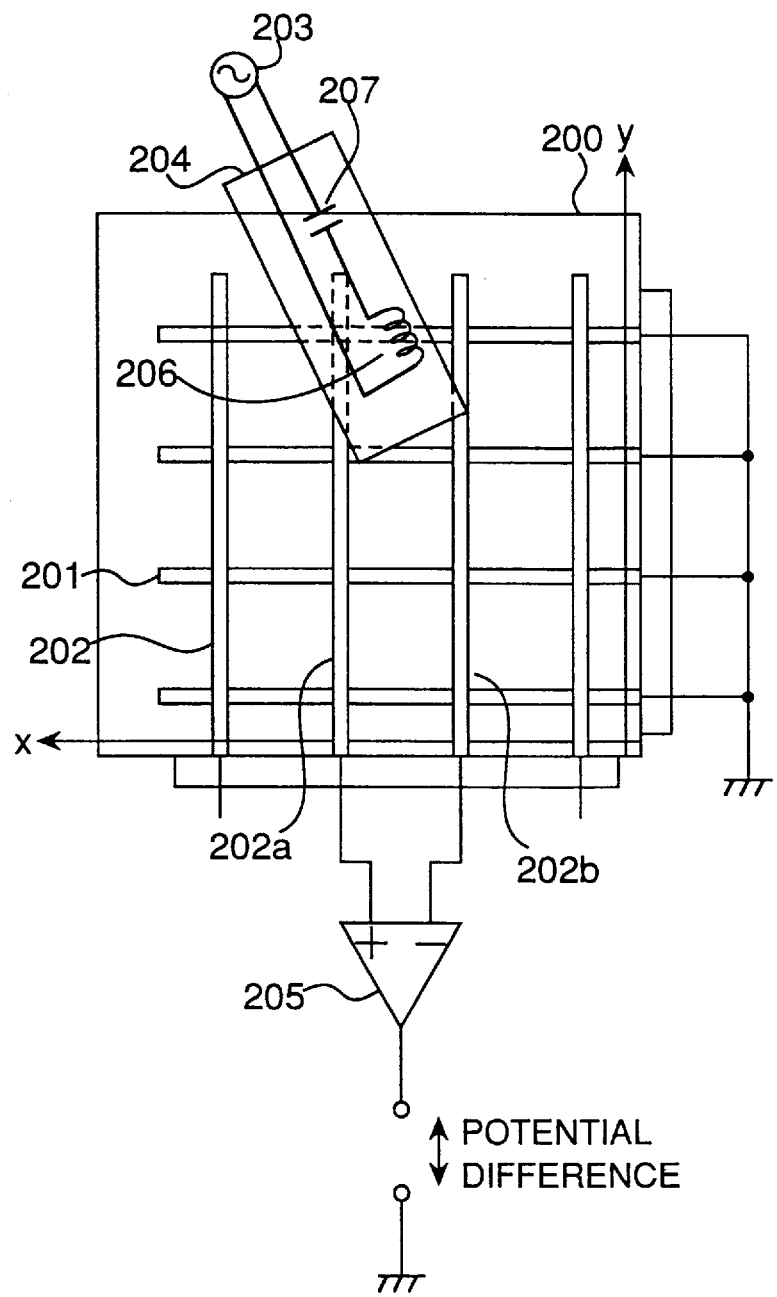
FIG. 13 is an explanatory view of a third experiment performed by the inventor and others.

Based on the above-mentioned experiment, the inventor and others further performed an experiment as shown in FIG. 13.

Similar to the experiment of FIG. 7, with the common electrodes 201 all connected to the ground, a pair of two segment electrodes 202 were connected to each of a positive input and a negative input of a differential amplifier 205. An LCD panel 200 similar to that used in the experiment of FIG. 7 was used (for simplicity, only eight electrodes are shown). Under the above-mentioned condition, when a serial resonance circuit 204 driven by an AC power source 203 is put close to a segment electrode 202*a* connected to the differential amplifier 205 in the same manner as in the experiment of FIG. 7, it was measured what sort of potential difference was detected.

Figure 14A:
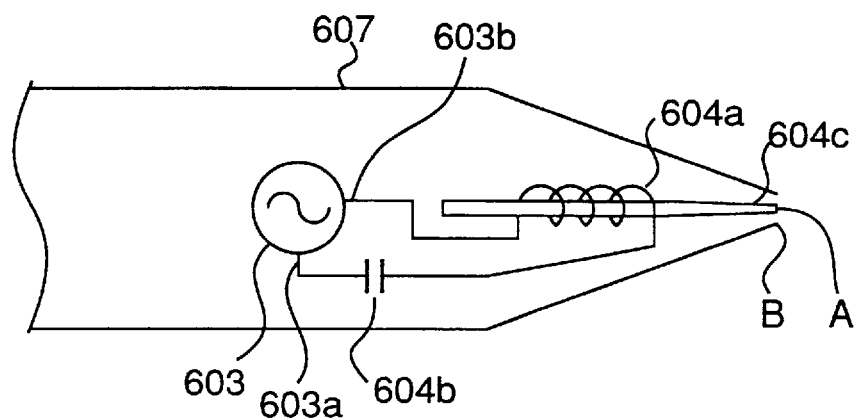
FIG. 14A is an explanatory view of a structure of a magnetic field generator to be used in the third experiment.

FIG. 14A shows a structure of a magnetic field generator 607 used in the experiment. The magnetic field generator 607 has therein an AC power source 603. The AC power source 603 has its both output terminals 603*a* and 603*b* connected to a capacitor 604*b* and a coil 604*a*. The capacitor 604*b* and the coil 604*a* constitute a serial resonance circuit. The coil 604*a* has a ferrite core 604*c* inserted in a center portion thereof. A frequency of an alternating current generated by the AC power source 603 is 100 kHz, while a resonance frequency of the serial resonance circuit constituted by the capacitor 604*b* and the coil 604*a* is also 100 kHz. Due to the AC voltage generated by the AC power source 603, an AC voltage of 100 Vp-p was applied across both terminals of the coil 604*a*.

A structure of the magnetic field generator 607 will be described in detail below. As shown in FIG. 14A, the magnetic field generator 607 has the coil 604*a* connected across both the terminals 603*a*, 603*b* of the AC power source 603 and the ferrite core 604*c* placed in the center portion of the coil. The coil 604*a* and the ferrite core 604*c* are main components of the magnetic field generator 607.

Figure 14B:
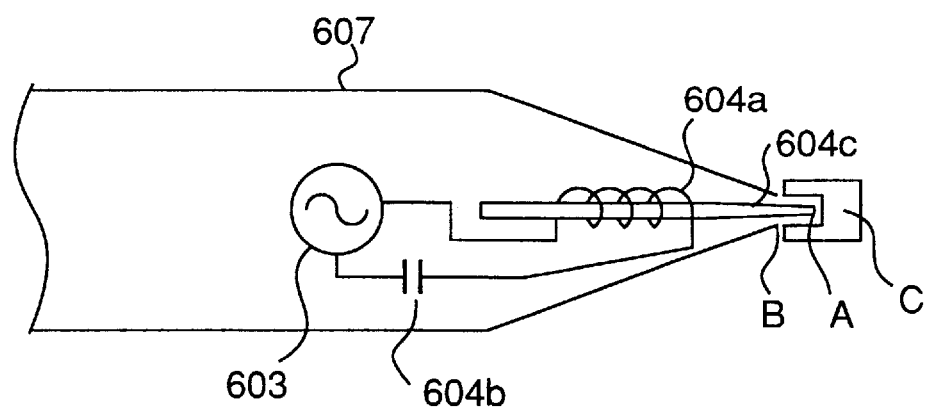
FIG. 14B shows a view of a structure of a modification of the magnetic field generator shown in FIG. 14A.

The ferrite core 604*c* has a tapered configuration as shown in FIG. 14A where the ferrite core 604*c* reaches a tip end portion B of the main body of the magnetic field generator 607. It is to be noted that a tip end portion A of the ferrite core 604*c* may penetrate the fore end portion of the main body to protrude therefrom. In the present case, a cover C may be provided for the purpose of protecting the tip end portion A. Although no support member for supporting the coil 604*a* and so forth is illustrated in FIGS. 14A and 14B, the coil 604*a*, the ferrite core 604*c*, and the capacitor 604*b* are fixed to the main body of the magnetic field generator 607. The AC power source 603 includes a switch, a battery, and so forth though not shown in FIGS. 14A and 14B.

The reason why the coil 604*a* and the ferrite core 604*c* placed in the center portion thereof are arranged in an approximate center position of the pen constituted by the magnetic field generator 607 will be described below. A basic operation of the present embodiment of the present invention is to specify the position of the magnetic field generator 607 by detecting an electrical change given from the magnetic field generator 607 to the electrodes 201 and 202 of the LCD panel 200 by detection means provided in the LCD panel 200. The basic operation is based on an electro-magnetic coupling between the magnetic field generator 607 and the electrodes 201 and 202 of the LCD panel 200. The magnetic field generator 607 is generally stored in a casing having a cylindrical pen-like exterior configuration as shown in FIG. 2. Such a magnetic field generator having a cylindrical exterior configuration tends to roll. The above-mentioned fact conversely produces an advantageous effect of allowing the magnetic field generator to be easily handled from the standpoint of the operator because it can be handled similarly to an ordinary writing pen. In another aspect, an electromagnetic coupling between the magnetic field generator and the electrodes of the LCD panel, which is the principle of operation of the embodiment of the present invention, is adopted as a basis, and therefore it is indispensable to make the pen have a structure in which the electro-magnetic coupling does not change with respect to the rolling of the pen. Therefore, the magnetic field generator 607 has its ferrite core 604*c* arranged in an approximate center position thereof as shown in FIGS. 14A and 14B. In other words, the coil 604*a* and the ferrite core 604*c* arranged in the center portion thereof are arranged in the approximate center position of the pen. Thus, in the embodiment of the present invention, the magnetic field generator has a coaxial electrode configuration. Therefore, not depending on the direction and angle of the pen-shaped object in which the magnetic field generator is incorporated, the magnetic field generator can be coupled with the electrodes of the LCD panel with a constant electro-magnetic coupling force. Therefore, an electrical effect given from the magnetic field generator to the electrodes of the LCD panel does not change regardless of a change of the direction and angle of the pen-shaped object.

A dimension of the tip end portion A constituted by the coil 604*a* and the ferrite core 604*c* shown in FIG. 14A and 14B is determined according to the electrode dimensions of the LCD panel to be used, depending on how many electrodes, for determining an electrode pitch, of the LCD panel are connected to the differential amplifier, and other factors. For instance, when the electrode pitch of a generic LCD panel is 100 $\mu$m to 300 $\mu$m and adjoining two electrodes of the LCD panel are connected to two input terminals of the differential amplifier, a diameter of the tip end portion A of the ferrite core 604*c* is set to 100 $\mu$m approximately equal to the electrode pitch of the LCD panel. When two or three electrodes are existing between the two electrodes of the LCD panels connected to the differential amplifier, the diameter of the tip end portion A of the ferrite core 604*c* is preferably set to about 1 mm.

Then, the tip end portion B of the magnetic field generator 607 is required to be properly processed to have a configuration such that the above-mentioned setting can be achieved. For instance, the tip end portion B is preferably processed to have a sharp tapered tip end configuration.

Figure 15:
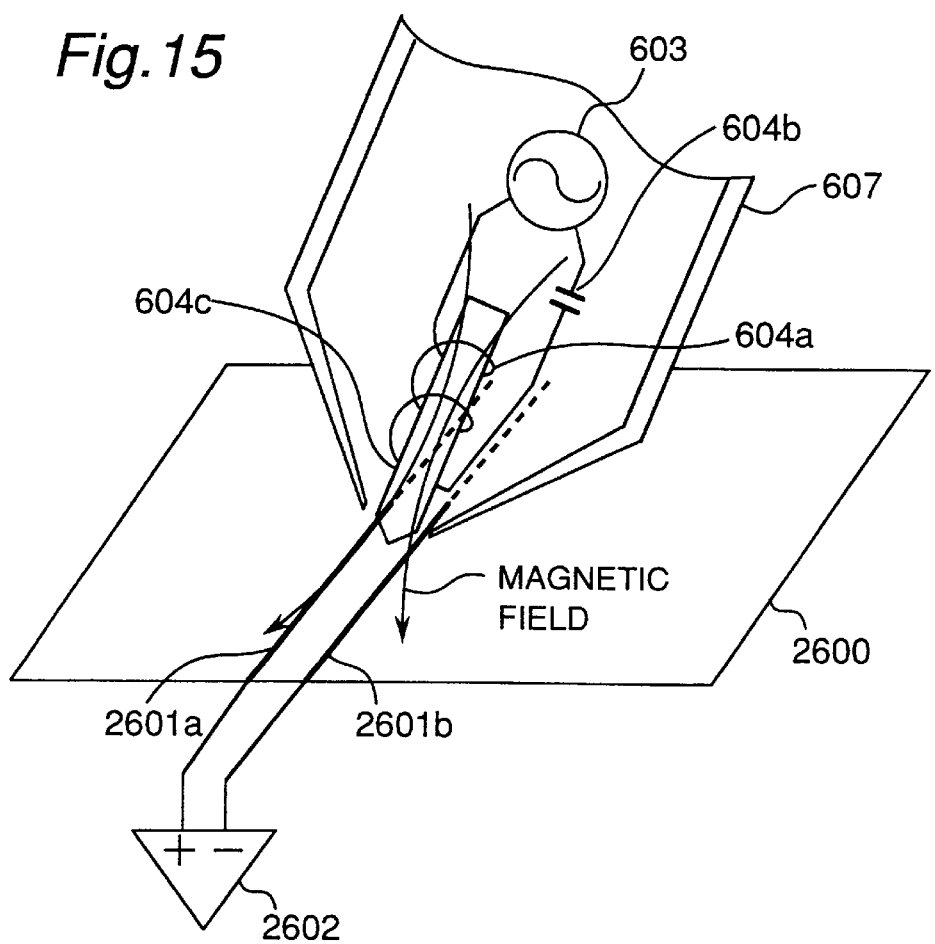
FIG. 15 is a schematic view of a magnetic coupling state between the magnetic field generator and the LCD panel.

In the case of the magnetic field generator 607 having the above-mentioned structure, in a manner as shown in FIG. 15, when electrodes 2601a and 2601b provided in an LCD panel 2600 are connected to a differential amplifier 2602, a magnetic field radiated from the tip end of the ferrite core 604c of the magnetic field generator 607 can be placed in a position just above the electrodes 2601a and 2601b of the LCD panel 2600. In the above case, as shown in FIG. 15, the magnetic field effects most intensely on the electrodes 2601a and 2601b.

In the above-mentioned case, an output can be taken out of the differential amplifier 2602 most efficiently.

Figure 16:
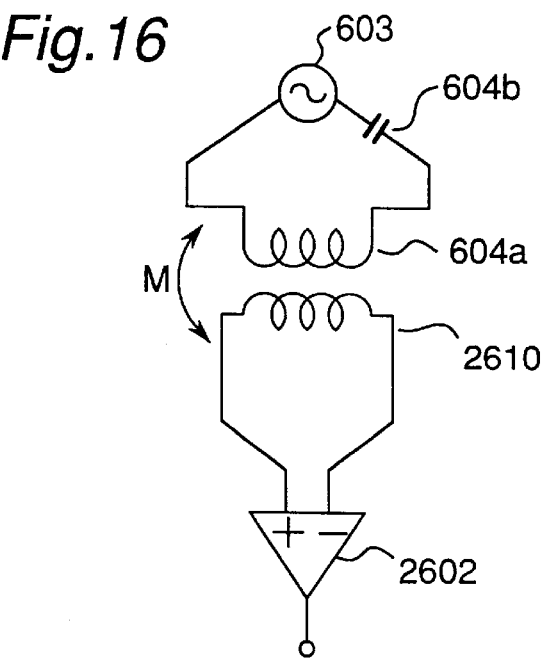
FIG. 16 is an electric equivalent circuit diagram including a magnetic coupling M between the magnetic field generator and a differential amplifier.

An electric equivalent circuit corresponding to the arrangement of FIG. 15 is shown in FIG. 16. As shown in FIG. 16, the AC power source 603 included in the magnetic field generator 607 is electro-magnetically coupled with the differential amplifier 2602 via the capacitor 604b, the coil 604a, and a coil 2610. Between the coil 604a and the coil 2610 is existing a magnetic coupling M via the magnetic field shown in FIG. 15.

Figure 17:
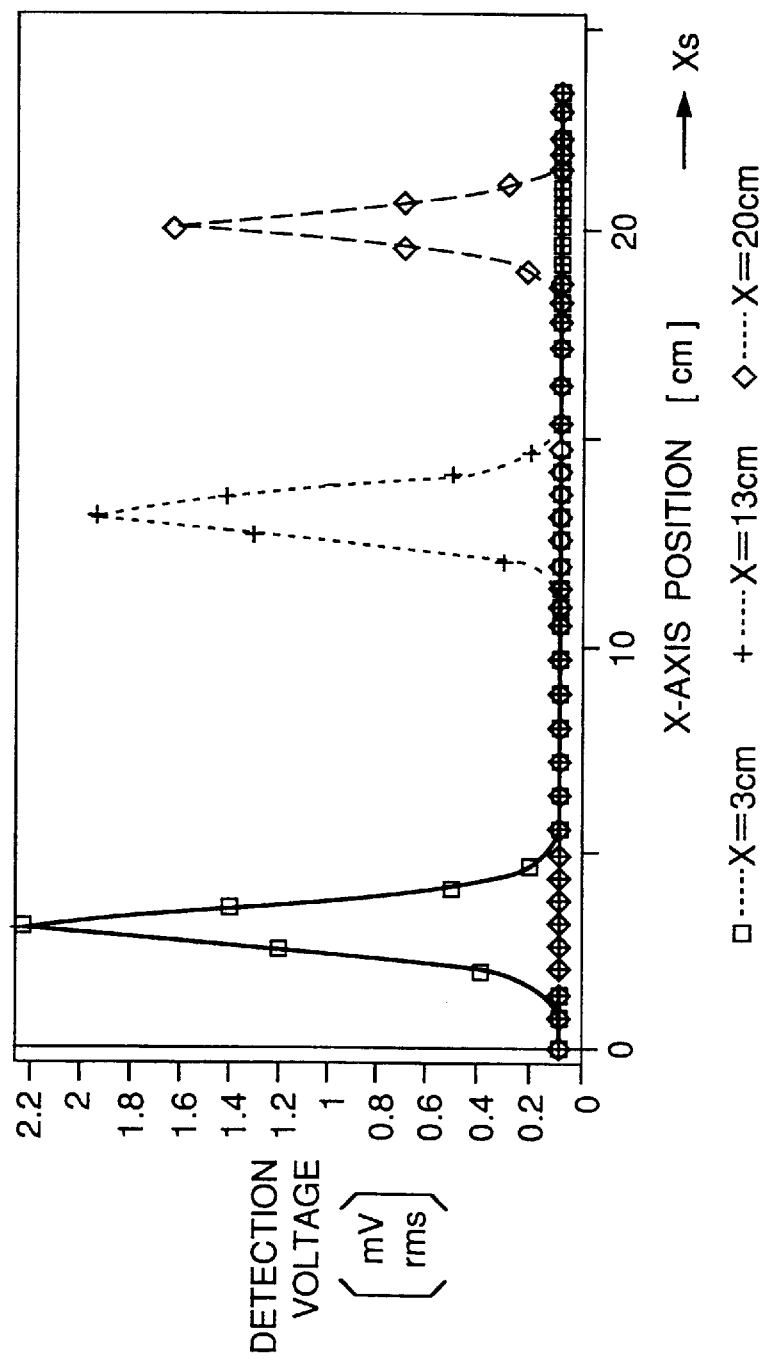
FIG. 17 is a graph showing a result of the third experiment.
Figure 18:
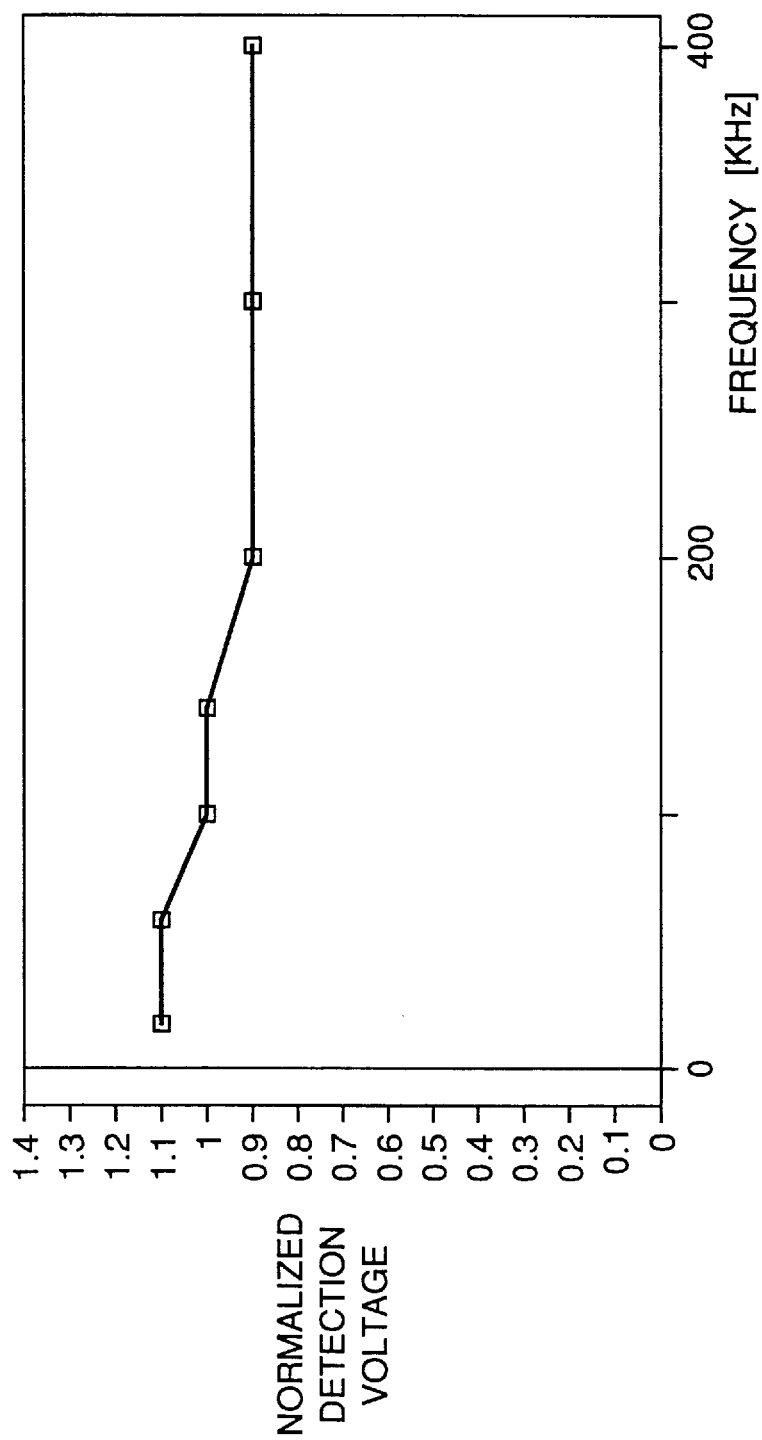
FIG. 18 is a graph showing a frequency characteristic of the experiment result.

Then, a result of experiment of FIG. 13 performed by means of the magnetic field generator 607 is shown in FIG. 17. FIG. 17 shows a potential difference measured at the frequency of the AC power source 603 similarly to the experiment shown in FIG. 8. FIG. 18 shows a frequency characteristic of a detection voltage obtained through normalization with a peak-to-peak value of the detection voltage set to 1 when the AC frequency is 100 kHz. According as the frequency is increased in order of 20 kHz, 60 kHz, 140 kHz, 200 kHz, 300 kHz, and 400 kHz, the detection voltage tends to decrease, however, it can be substantially ignored.

FIG. 17 shows an effective value of the potential difference measured at the frequency of the AC power source 203. It was discovered that a clear single-humped output was achieved in comparison with the result of the previous experiment. It was further discovered that the serial resonance circuit 204 was located at the peak of the single-humped output. As a result, according to the present experiment, it can be discovered that the x-coordinate value of the position in which the serial resonance circuit 204 is located is reflected more clearly on the obtained signal. It is to be noted that the same coordinate axes as those of FIG. 7 are established.

Further, similarly to the experiment shown in FIG. 7, the LCD panel 200 was reversed, and a glass plate on which a transparent electrode is deposited was inserted in between the serial resonance circuit 204 and the LCD panel 200. The above-mentioned experiment exhibited a result similarly to that of FIG. 17, consequently proving that the serial resonance circuit 204 and the LCD panel 200 were electro-magnetically coupled with each other.

In the above-mentioned experiment, an output voltage from the segment electrodes 202 was detected via the differential amplifier 205 with the common electrodes 201 all connected to the ground. However, conversely the output voltage was able to be detected from the common electrodes 201 with the segment electrodes 202 all connected to the ground. Therefore, an experiment result similar to the experiment result of FIG. 8 can be obtained with regard to the y-coordinate. Therefore, by similarly performing two times the detections from the segment electrode side (x-axis side) and from the common electrode side (y-axis side), a single-humped output can be obtained through each detection. The coordinates of the peak position of the single-humped output correspond to the coordinates of the position in which the serial resonance circuit 204 is located. Therefore, by deciding the coordinates of the peak position of the single-humped output, the coordinates (x,y) of the position of the serial resonance circuit 204 can be specified.

In the above-mentioned experiment, the serial resonance circuit 204 is used as a one corresponding to the magnetic field generator 102 shown in FIG. 1. However, a similar result can be of course obtained when a parallel resonance circuit is used. Furthermore, what is necessary is only the coil for obtaining a magnetic field, and the resonance circuit is not required to be used purposely. As a power source for driving the coil, a Peltier device or the like can be used instead of the AC power source. When, for instance, the switch 505 shown in FIG. 3 is replaced by a Peltier device, the switch rod 502 operates every time the electronic pen 21 is put in contact with the LCD panel 100 to press the Peltier device, and therefore a high voltage can be obtained from the Peltier device every time the pen is put in contact with the panel. Then, the high voltage is to be properly converted into a magnetic field by means of a coil and a capacitor. What is essential is the structure in which the magnetic field generator is capable of generating an AC magnetic field.

Although the segment electrodes are connected to the ground in the aforementioned three experiments, the segment electrodes may be connected to nothing as opened instead of being connected to the ground. However, taking into account influence of external noises, the segment electrodes are preferably connected to something having a reference potential. Further, a specified voltage may be of course superimposed on the segment electrodes via a capacitor or the like.

Based on the results of the above-mentioned three experiments, the inventor proposes the present invention by integrating the experiment results with the conventional techniques of the liquid crystal display devices which have been provided specially for image display.

Based on the above description, the first embodiment of the present invention will be described in more detail below. Since the image display function of the present invention is quite the same as those of the liquid crystal display techniques used conventionally, and therefore, a coordinate input function will be particularly described in detail.

The basic structure of the first embodiment is as shown in FIG. 1, and is related to all the embodiments. According to the present invention, the LCD panel 100 may have an electrode structure of a generic STN LCD panel, and the present invention can be also applied to an electrode structure of an STN LCD panel having an improved display capacity as in a second embodiment described hereinafter. Furthermore, the present invention can be also applied to an LCD panel having an electrode structure of a TFT panel as in a third embodiment described hereinafter.

Figure 19:
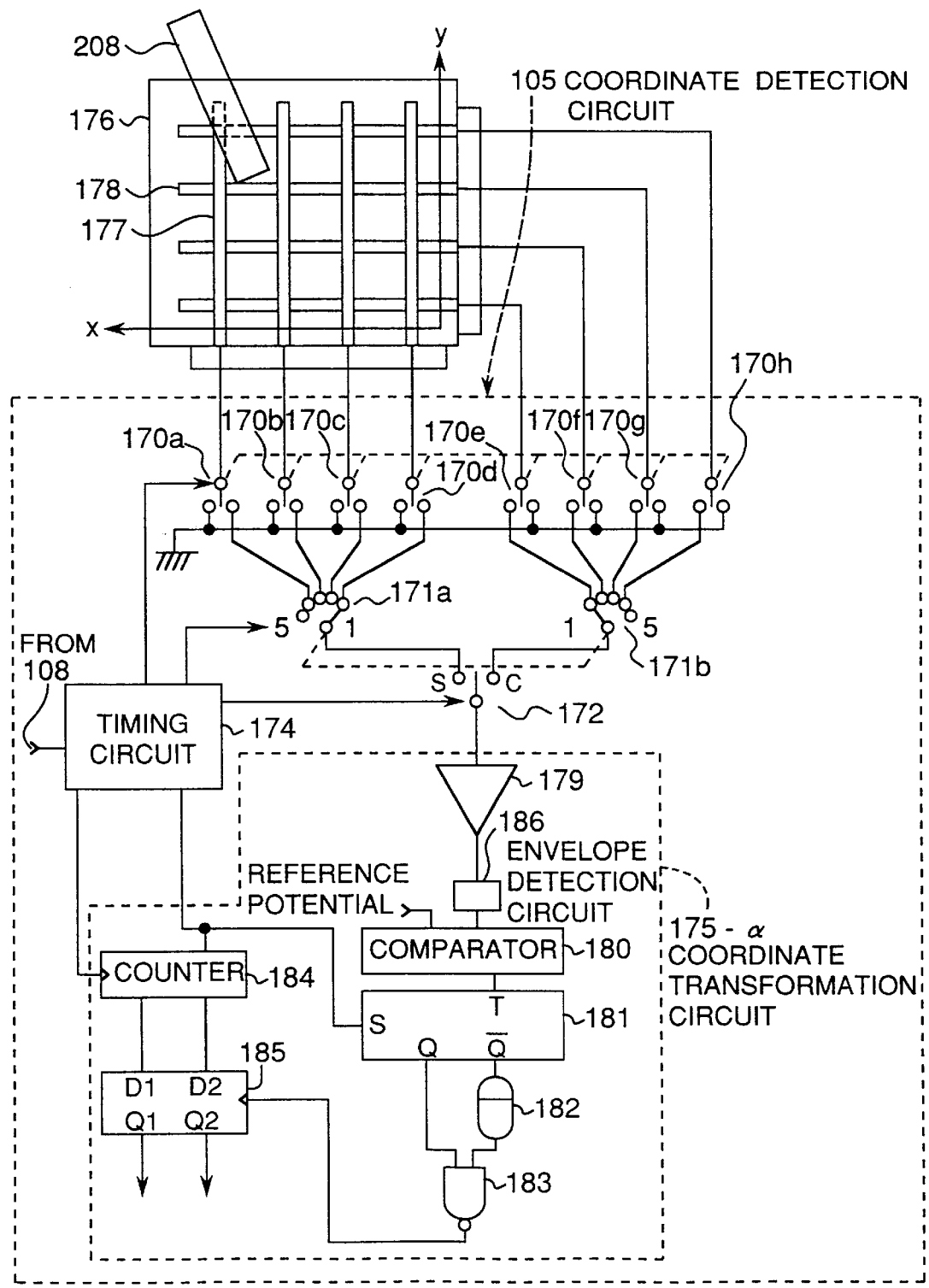
FIG. 19 is a view of a structure of a first embodiment of the present invention.

FIG. 19 shows in detail a structure of the coordinate detection circuit 105 provided in the aforementioned first embodiment. It is to be noted that the image display drive circuit 101 and the function changeover control circuit 108 shown in FIG. 1 are not shown in FIG. 19. The image display drive circuit 101 and the function changeover control circuit 108 will be described hereinafter.

Furthermore, the magnetic field generator 102 shown in FIG. 1 is denoted as a magnetic field generator 208 in FIG. 19. The magnetic field generator 208 is provided with the structure shown in FIG. 14 and/or FIGS. 3, 4 and 5 as described hereinbefore.

Furthermore, as shown in FIG. 19, the coordinate detection circuit 105 includes first switch circuits 170a, b, c, d, e, f, g and h, second switch circuits 171a and b, a third switch circuit 172, a coordinate transformation circuit 175-α, and a timing circuit 174.

The first, second and third switch circuits 170, 171 and 172 properly switch signals outputted respectively from segment electrodes 177 and common electrodes 178 of an LCD panel 176 so as to transmit the signals to the coordinate transformation circuit 175-α. In the present case, among the segment electrodes 177 and the common electrodes 178 owned by the LCD panel 176, the electrodes from which a signal is detected are limited to the electrodes 177 and 178 to which the magnetic field generator 208 is put closer and electrodes 177 and 178 around the electrodes. A principle of operation of detecting the signal from the electrodes 177 and 178 to which the magnetic field generator 208 is put closer is as described hereinbefore based on an experiment result.

A role of the coordinate transformation circuit 175-α is to detect a bottom portion of the double-humped output signal similar to that obtained in the experiment of FIG. 7 and thereby designate the position in which the magnetic field generator 208 is located.

As described above, the signal inputted from the first, second and third switch circuits 170, 171 and 172 controlled by the timing circuit 174 to the coordinate transformation circuit 175-α is converted into a signal in which the axis of abscissas of the experiment result of FIG. 8 is replaced by a time base. The signal transformation is performed by controlling the operations of the switch circuits 170, 171 and 172 by means of the timing circuit 174. In more detail, by switching the first, second and third switch circuits 170, 171, and 172 by means of the timing circuit 174 so as to scan, for example, the segment electrodes 177, an output similar to that of FIG. 8 can be obtained. Then, the axis of abscissas of the output can represent the scanning position of the electrodes 177 or 178 scanned on the LCD panel 176 as well as a time at which the electrodes 177 or 178 are sequentially scanned. Operations of the switch circuits 170 through 172 will be described in detail hereinafter.

Next, an operation of the first embodiment will be described with reference to FIG. 19. Meanwhile, signal waveforms inside the coordinate transformation circuit 175-α shown in FIG. 19 are shown in order according to a signal flow in FIGS. 20A, 20B, 20C, 20D, 20E and 20F.

A signal transmitted from the common electrodes 178 and the segment electrodes 177 of the LCD panel 176 to the coordinate transformation circuit 175-α via the first switch circuit 170, the second switch circuit 171 and the third switch circuit 172 is firstly inputted to an amplifier 179. In the amplifier 179, the signal is properly amplified to a level at which the signal can be easily handled. In the aforementioned experiment, the signal to be detected has a voltage of several millivolts. Therefore, by amplifying the transmitted signal by several hundred times to thousand times, the amplified signal has a voltage on the order of several volts to be easily handled.

As a result, an output obtained by amplifying a signal similar to that shown in FIG. 8 can be obtained from the amplifier 179 according to the position of the magnetic field generator 208.

In the present case, the first, second and third switch circuits 170, 171 and 172 are controlled by the timing circuit 174 in a manner as described above so as to select between the plural number of common electrodes 178 and the plural number of segment electrodes 177 and connect each selected electrode to the amplifier 179. In other words, the signal to be inputted to the amplifier 179 is a signal in which the axis of abscissas of the experiment result of FIG. 8 is replaced by a time base.

Figure 20A:
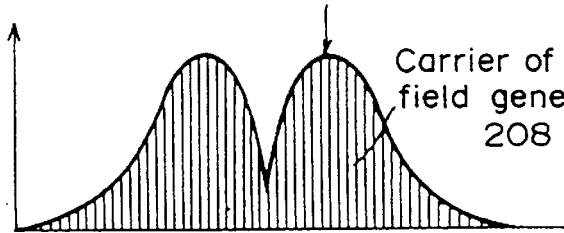
FIGS. 20A, 20B, 20C, 20D, 20E and 20F are charts of signal waveforms at several points of a coordinate transformation circuit of the first embodiment.
Figure 20B:
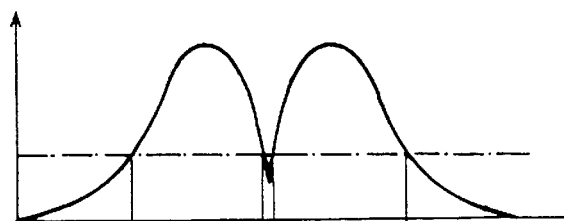
Figure 20C:
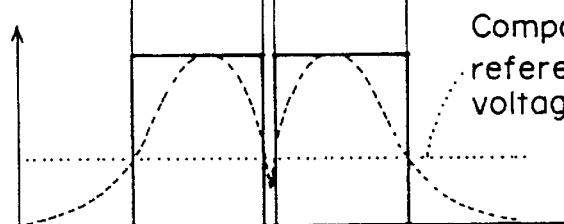

Then, the signal amplified in the amplifier 179 is inputted to an envelope detector 186. A waveform of the signal inputted to the envelope detector 186 is shown in FIG. 20A. Then, the envelope detector 186 outputs an envelope of an amplified signal. Then, the signal of which envelope is detected is inputted to a comparator 180 so as to be compared with a reference voltage (reference voltage for comparison) in the comparator 180 to be binarized. FIG. 20B shows a waveform of the signal inputted to the comparator 180 and the reference voltage (one-dot chain line), while FIG. 20C shows a waveform of the signal binarized by the comparator 180.

Figure 20D:
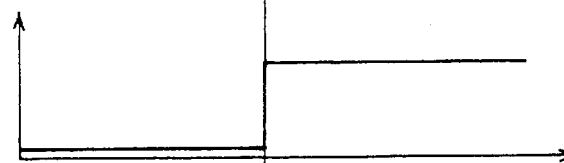

Then, an output binarized by the comparator 180 is inputted to a T-flip-flop 181. The T-flip-flop 181 is a type which operates using a trailing edge of a T-input as a clock and includes a set terminal S, and a Q output terminal thereof is set upon receiving a signal from the timing circuit 174 at the set terminal S. The T-flip-flop 181 forms a pulse having a leading edge at a bottom portion of the double-humped signal indicated by a dashed line in FIG. 20C at an inverted Q output terminal thereof. The pulse waveform is shown in FIG. 20D.

Figure 20E:
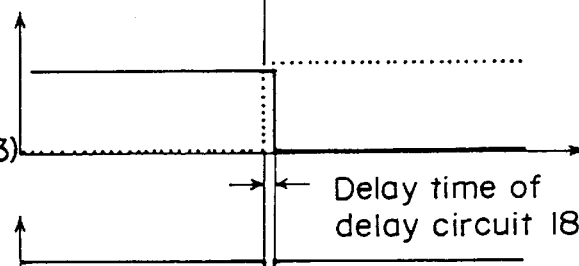
Figure 20F:
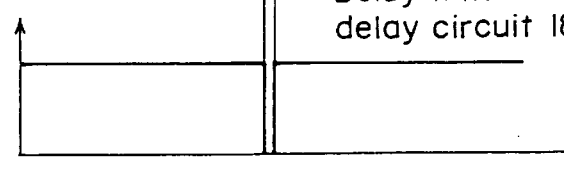

Then, a Q output pulse of the T-flip-flop 181 is processed in a delay circuit 182 to be delayed as shown in FIG. 20E, and further inputted to a NAND gate 183. With the above-mentioned operation, a pulse as shown in FIG. 20F which has a negative polarity and a duration corresponding to a delay time of the delay circuit 182 can be obtained as an output of the NAND gate 183. The pulse shown in FIG. 20F exists at the bottom portion of the double-humped output voltage of the input signal to the amplifier 179 as shown in FIG. 20A.

Meanwhile, a set signal which is outputted from the timing circuit 174 and then inputted to the set terminal S of the T-flip-flop 181 is simultaneously transmitted to a load terminal of a counter 184. Then, the counter 184 starts counting according to a specified clock using the set signal as a time reference. A count value of the counter 184 is inputted to a D terminal of a D-flip-flop 185. At the same time, the negative pulse from the NAND gate 183 is inputted to a clock terminal of the D-flip-flop 185. The D-flip-flop 185 holds data supplied from the counter 184 at a time when it receives the negative pulse from the NAND gate 183.

In the present case, operation timings of the switch circuits 170, 171 and 172 are controlled by the timing circuit 174, and the electrodes 177 and 178 are scanned sequentially one by one in the y-axis and x-axis directions with two adjoining ones of the electrodes set as a pair. Therefore, the data held in the D-flip-flop 185 represents the coordinates of the position in which the magnetic field generator 208 is located on the LCD panel 100.

Next, an operation of the timing circuit 174 will be described. The timing circuit 174 mainly controls the operations of the switch circuits 170, 171 and 172, and generates necessary signals such as the set signal for the T-flip-flop 181 and the clock signal for the counter 184. The timing circuit 174 has a role of controlling the switch circuits 170, 171 and 172, the set signal for the T-flip-flop 181 and the clock signal for the counter 184 so that the data held in the D-flip-flop 185 represents the coordinates of the magnetic field generator 208.

Figure 21:
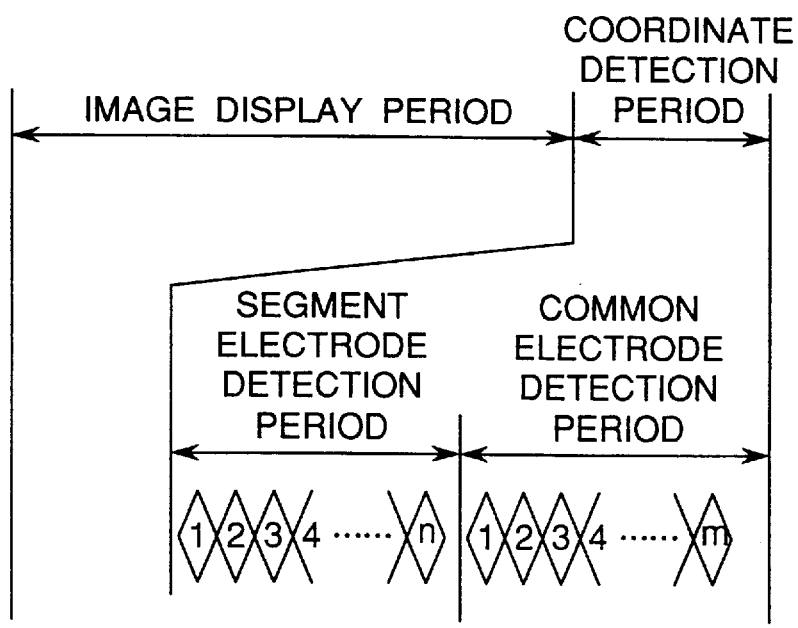
FIG. 21 is a timing chart for explaining an operation of the first embodiment.

First, a control timing chart is shown in FIG. 21.

As described hereinbefore with regard to an experiment, it is acceptable to connect all the common electrodes 201 to the ground and detect a signal from the segment electrodes 202. Conversely, it is acceptable to connect all the segment electrodes to the ground and detect a signal from the common electrodes. In the aforementioned experiment, a voltage having a double-humped waveform (waveform having two peaks) in correspondence with the position of the magnetic field generator was detected, and the bottom portion of the double-humped waveform was the position in which the serial resonance circuit 204 was located. Therefore, by performing two times a detection operation similar to that of the aforementioned experiment from the segment electrode side and the common electrode side, the coordinates of the serial resonance circuit 204 can be specified. Therefore, in a manner as shown in FIG. 21, a coordinate detection operation is preferably performed time-sharingly two times from the segment electrode side and the common electrode side in a coordinate detection period.

According to the experiment shown in FIG. 7, it is required to connect all the common electrodes 178 to the ground when the detection operation is performed from the segment electrodes 177. The converse can also hold. Taking the above-mentioned fact into account, the timing circuit 174 switches the switch circuits 170, 171 and 172.

In detail, when the coordinate detection is performed from the segment electrode side, under the control of the timing circuit 174, the first switch circuits 170a through d connected to the segment electrodes 177 are switched so as to transmit a signal to the second switch circuit 171a in the next stage, while the first switch circuits 170e through h connected to the common electrodes 178 are switched so as to be connected to the ground. Further, under the control of the timing control circuit 174, the third switch circuit 172 is connected to the segment electrode side (denoted by S in FIG. 19), and the signal from the segment electrodes is transmitted via the second switch circuit 171a to the amplifier 179.

Conversely, when the coordinate detection is performed from the common electrode side, under the control of the timing control circuit 174, the first switch circuits 170e through h connected to the common electrodes 178 are switched so as to transmit a signal to the second switch circuit 171b in the next stage, and the first switch circuits 170a through d connected to the segment electrodes 177 are switched so as to be connected to the ground. Further, under the control of the timing control circuit 174, the third switch circuit 172 is connected to the common electrode side (denoted by C in FIG. 19), and the signal from the common electrodes is transmitted via the second switch circuit 171b to the amplifier 179.

Further, under the control of the timing control circuit 174, the second switch circuits 171a and b are switched so as to timely sequentially scan the segment electrodes and the common electrodes. With the above-mentioned operation, it can be detected how much degree of voltage is outputted from the segment electrodes 177 and the common electrodes 178 through amplification in the amplifier 179 or the like.

As shown in FIG. 19, the second switch circuits 171a and b are to scan the electrodes sequentially from the electrodes located near the origin of the x-coordinate axis and the y-coordinate axis shown in FIG. 19.

In the present case, a timing of starting scanning of the electrodes in each of the coordinate axes is a timing at which the counter 184 is loaded and the T-flip-flop 181 is set. Meanwhile, as the clock for scanning the electrodes, a clock similar to the clock for the counting of the counter 184 is used.

Thus by scanning the electrodes through switching control of the first, second and third switch circuits by means of the timing circuit 174, the experiment result shown in FIG. 8 is reproduced at the input terminal of the amplifier 179 with the axis of abscissas replaced by a time base. Thus, in this stage, the condition of the experiment shown in FIG. 7 is reproduced.

Although the electrodes are scanned one by one in terms of faithfully reproducing the experiment of FIG. 7 in the present case, it is acceptable to scan the electrodes with two or more of them grouped.

In the present case, a timing at which the second switch circuit 171 is switched to sequentially scan the electrodes of the LCD panel 176 and a timing at which the counter 184 increments its count value one count by one count are made to coincide with each other. For the above-mentioned scheme, the timing control circuit 174 generates a switching control signal for the second switch circuit 171. Therefore, it can be known which electrode is currently being scanned by means of the count value of the counter 184. In other words, the count value of the counter 184 held in the D-flip-flop 185 in accordance with the output pulse of the NAND gate 183 represents the coordinates of the magnetic field generator 208 in units of the amount of electrodes.

Reference numerals 1 through n and 1 through m in FIG. 21 represent the count value of the counter 184 and an ordinal number of a contact point connected to the second switch circuit 171 in correspondence with the count value (the number representing the ordinal number from the origin of the coordinates of the electrode connected to the second switch circuit 171).

In order to achieve the above-mentioned operation with the switch circuits 170 through 172 and the timing circuit 174, control lines extending from the timing control circuit 174 are connected to the switch circuits 170 through 172. The switch circuits which operate in accordance with signals obtained from the control lines in a manner as shown in FIG. 21 can be easily implemented by, for example, an appropriate multiplexer device. Furthermore, the timing circuit 174 which generates the above-mentioned control signals can be easily implemented by combining a counter element, a gate element, and the like availed on the market.

Further, a timing of setting the T-flip-flop 181 and a timing of loading the counter 184 are made to be timings at which detection is started from the segment electrode side and the common electrode side, respectively. When the switch circuit 170 and the like are thus controlled, consequently the D-flip-flop 185 can obtain a count value corresponding to the scanning of each of the segment electrodes and the common electrodes. The count value corresponds to a count value obtained by the counter 184 which starts counting from when the electrode scanning is started (i.e., when the counter 184 is reset), counts pulses one count by one count in synchronization with the timing of the scanning until a timing at which a negative pulse is generated from the NAND element 183.

The above-mentioned count value can be interpreted as a value which is obtained, as the result of searching a position at which a bottom portion of the double-humped output voltage is detected by switching one by one the electrodes connected to the second switch circuit, by representing the position by the amount of electrodes, and then held in the D-flip-flop 185. In other words, the result of detecting an x-coordinate value or a y-coordinate value of the position of the magnetic field generator 208 is represented by the amount of electrodes.

As described above, the x-coordinate value and the y-coordinate value of the above-mentioned position are held in the D-flip-flop 185 in accordance with a timing at which the negative pulse is outputted from the NAND element 183 in respective detection periods shown in FIG. 21. Then, the coordinate data is to be separately utilized as detected coordinate data. There is no specific limitation on application methods of the data. However, by repetitively lighting the previously detected coordinates in a period in which the function changeover control circuit 108 shown in FIG. 1 orders image display, an image can be written on the LCD panel 100 by means of the magnetic field generator 208 with a tough of writing an image on a paper sheet by means of a writing pen. Furthermore, by taking the simultaneously detected coordinate data in a CPU, a desired processing operation such as character recognition can be performed. There can be considered another structure for the switch circuit. Since the switch circuit can be easily changed in a variety of ways, no special description is provided therefor herein. What is essential is the provision of a switch circuit which can assure the timing shown in FIG. 21. For instance, since the first switch circuit 170 and the third switch circuit 172 have synchronized switching timings, they can be interlocked. Therefore, an identical switch can be used. Furthermore, there is no special reason for using a switch circuit, and therefore a three-state buffer circuit and other devices can be utilized in an effective combinatorial style.

Although the above description has been based on an LCD panel having 16 pixels, the same structure can be also achieved in an LCD panel having more pixels.

In the description made hereinbefore, the function changeover control circuit 108 shown in FIG. 1 performs a control of time-sharingly alternately performing image display and coordinate detection. In contrast to the above, the timing circuit 174 shown in FIG. 19 performs the above-mentioned operation according to a signal from the function changeover control circuit 108 only in the coordinate detection period, and operates to disconnect the first switch circuit 170 and so forth so that they do not hinder the image display in the image display period. In more detail, in the image display period, the first switch circuit 170 is connected to the contact points for electrically connecting all the electrodes to the second switch circuit, while the second switch circuit 171 is connected to a fifth contact point 5 which is connected to nothing so as to disconnect the subsequent third switch circuit 172 and so forth from the LCD panel 176. As a result, the image display is performed utterly in accordance with the conventional technique without being influenced by the coordinate detection circuit 105 shown in FIG. 1.

Meanwhile, an output circuit (not shown) of the image display drive circuit 101 shown in FIG. 1 normally has a three-state buffer, and therefore an output terminal is allowed to have a high impedance. Therefore, by making the function changeover control circuit 108 perform a control in a manner that the above-mentioned output circuit operates only in the image display period and making the output terminal of the image display drive circuit 101 shown in FIG. 1 have a high impedance in the coordinate input period, the image display drive circuit 101 exerts no influence on the coordinate detection circuit 105.

Thus, the coordinate input circuit and the image display drive circuit can be easily separated from each other.

Second embodiment

Next, a second embodiment of the present invention will be described in detail below. Since the image display function is not different from that of the conventional liquid crystal display technique in the present embodiment, a coordinate input function will be particularly described in detail.

A basic structure of the second embodiment is as shown in FIG. 1, and is relates to all the embodiments as the first embodiment. It is to be noted that the present embodiment can be applied to an LCD panel having an electrode structure of an STN panel with an improved display capacity as in a third embodiment described hereinafter, and also applied to an LCD panel having an electrode structure of a TFT panel as in a fourth embodiment described hereinafter.

Figure 22:
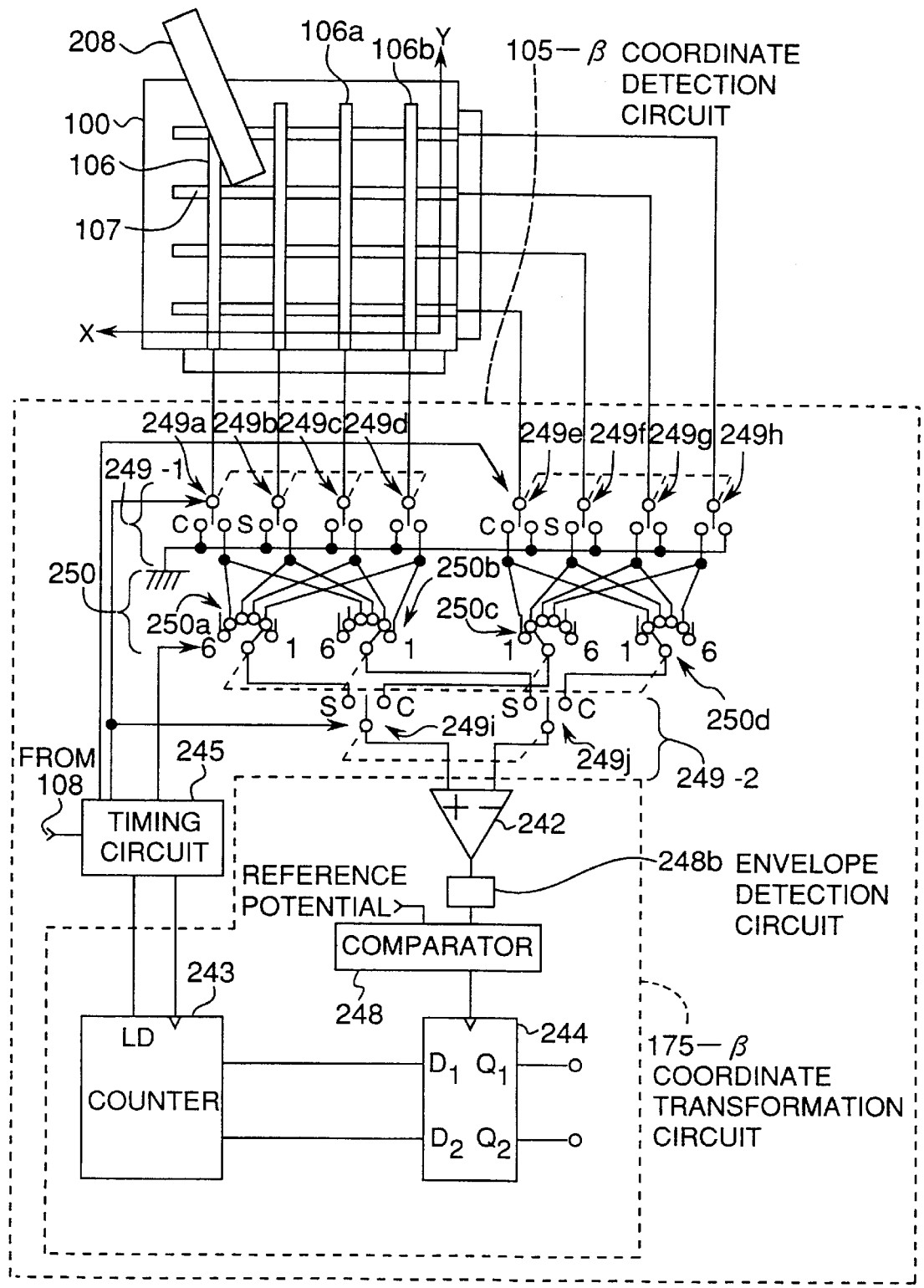
FIG. 22 is a view of a structure of a second embodiment of the present invention.

FIG. 22 shows in greater detail a structure of a coordinate detection circuit 105-β provided in the second embodiment. It is to be noted that the image display drive circuit 101 and the function changeover control circuit 108 shown in FIG. 1 are not shown in FIG. 22. The image display drive circuit 101 and the function changeover control circuit 108 will be described hereinafter.

Furthermore, the magnetic field generator 102 shown in FIG. 1 is denoted as a magnetic field generator 208 in FIG. 22. The magnetic field generator 208 is has the structure shown in FIG. 14 and so forth as described hereinbefore.

As shown in FIG. 22, a reference numeral 100 denotes an LCD panel, and the LCD panel 100 has common electrodes 107 and segment electrodes 106. In particular, in the state shown in FIG. 22, segment electrodes 106*a* and 106*b* constitute a segment electrode pair comprised of two adjoining electrodes of which one end is opened and the other end is electrically connected to a differential amplifier 242 via a first switch circuit group 249-1 and a second switch circuit group 250. FIG. 22 shows the basic structure of the second embodiment.

As shown in FIG. 22, the coordinate detection circuit 105-β includes the first switch circuit group 249-1, the second switch circuit group 250, a third switch circuit group 249-2, a coordinate transformation circuit 175-β and a timing control circuit 245. The first switch circuit group 249-1 includes switch circuits 249*a*, 249*b*, 249*c*, 249*d*, 249*e*, 249*f*, 249*g* and 249*h*. The second switch circuit group 250 includes switch circuits 250*a*, 250*b*, 250*c* and 250*d*. The third switch circuit group 249-2 includes switch circuits 249*i* and 249*j*.

The first, second and third switch circuit groups 249-1, 250, and 249-2 transmit a signal detected from each of the segment electrodes 106 and the common electrodes 107 of the LCD panel 100 to the differential amplifier 242 in the first stage provided in the coordinate transformation circuit 175-β by properly switching in a manner as described hereinafter. In the present case, among a plurality of segment electrodes 106 and common electrodes 107 owned by the LCD panel 100, the electrode to which the magnetic field generator 208 is put close and electrodes around it yield the maximum detection signal. The principle of the signal detection is as described hereinbefore based on an experiment result. In more detail, the experiment on which the second embodiment is based is shown in FIG. 13, and therefore the experiment result shown in FIG. 17 can be obtained when the magnetic field generator 208 is put close to the electrodes. According to the experiment result shown in FIG. 7, it was confirmed that the magnetic field generator 208 was located near the segment electrode placed in an x-coordinate position where a peak of a detected single-humped output signal takes place.

Meanwhile, the first switch circuit group 249-1, the second switch circuit group 250 and the third switch circuit group 249-2 are controlled to be switched by the timing circuit 245. Then, the first, second and third switch circuit groups 249-1, 250 and 249-2 are controlled by the timing control circuit 245 so as to connect to the differential amplifier 242 a pair of adjoining segment electrodes 106 and a pair of adjoining common electrodes 107, and a combination of the electrode pair to be connected to the differential amplifier 242 is shifted one by one in a direction in which the electrodes are arranged.

Therefore, according to the second embodiment, an output of the differential amplifier 242 becomes a signal in which the axis of abscissas (x-coordinate axis) of the experiment result shown in FIG. 17 is replaced by a time base. A substitution rate of the x-coordinate axis to the time base depends on the speed of switching the first, second and third switch circuit groups by means of the timing control circuit 245. Therefore, by detecting a timing (time) of the peak of the single-humped output signal as shown in FIG. 17 by means of the coordinate transformation circuit 175-β, the coordinates of the position of the magnetic field generator 208 placed on the LCD panel 100 can be detected. What is essential in the second embodiment is to detect the coordinates of the position of the magnetic field generator 208.

An operation of the second embodiment will be described below with reference to FIG. 22. A sequence of signal flow is shown in FIG. 23.

Figure 23A:
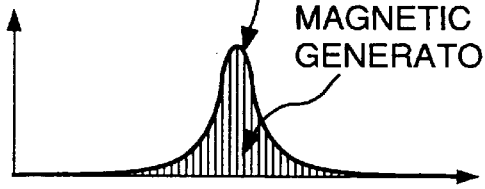
FIGS. 23A, 23B and 23C are charts of signal waveforms at several points of a coordinate transformation circuit of the second embodiment.
Figure 23B:
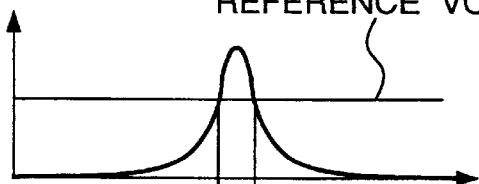
Figure 23C:
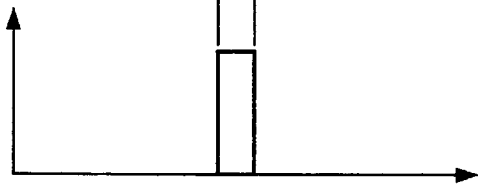

As shown in FIG. 23A, there is obtained an output similar to that shown in FIG. 17 from the differential amplifier 242 according to the position of the magnetic field generator 208. It is postulated that the switch circuits are properly controlled to yield a signal in which the axis of abscissas is replaced by a time base. Therefore, the signal is detected by an envelope detector 248b to detect an envelope as shown in FIG. 23B. Subsequently, when the envelope output is binarized by a binarizing circuit (comparator) 248, a pulse signal as shown in FIG. 23C is obtained. Since the pulse position coincides with the peak position of the signal shown in FIG. 17, the pulse represents the position of the magnetic field generator 208.

Then, a set signal representing a timing is transmitted to a load terminal of a counter 243 so as to make the counter 243 start counting according to a clock with the set signal used as a time reference. By inputting a count value of the counter 243 to a D terminal of a D-flip-flop 244 and inputting an output pulse of the binarizing circuit 248 to a clock terminal of the D-flip-flop 244, data given from the counter 243 is held in a Q terminal of the D-flip-flop 244 in accordance with a timing at which the pulse is outputted from the binarizing circuit 248.

When a timing control by the timing control circuit 245 is properly performed in a manner as described hereinafter, the data held in the D-flip-flop 244 represents the coordinates of the position of the magnetic field generator 208.

Next, operations of the first and second switch circuits 249-1 and 250, the third switch circuit 249-2 and the timing circuit 245 will be described. As shown in FIG. 22, the switch circuit 249 and so forth used in the second embodiment of the present invention have structures slightly complicated in comparison with the structure shown in FIG. 19 which is an explanatory view of the first embodiment of the present invention. The reason for the above is that a differential amplifier which requires two inputs thereto is used as an amplifier, and therefore two electrodes for signal detection must be switched simultaneously.

Next, operations of the first switch circuit group 249-1, the second switch circuit group 250, the third switch circuit group 249-2 and the timing circuit 245 will be described in greater detail below. First, an operation of the timing circuit 245 will be described. The timing circuit 245 controls the operations of the first, second and third switch circuit groups 249-1, 250 and 249-2. The timing circuit 245 outputs a clock signal to the counter 243.

As described hereinbefore with regard to an experiment, it is acceptable to connect all the common electrodes 107 to the ground and detect a signal from the segment electrodes 106. Conversely, it is acceptable to connect all the segment electrodes 106 to the ground and detect a signal from the common electrodes 107. In the aforementioned experiment, a voltage having a single-humped waveform was able to be detected at and around the coordinates of the position in which the magnetic field generator 208 was located. The coordinates at which the peak of the single-humped voltage waveform was located were the coordinates of the position in which the magnetic field generator 208 was located. Then, the x-coordinate of the magnetic field generator 208 can be specified by scanning the segment electrodes 106, while the y-coordinate of the magnetic field generator 208 can be specified by scanning the common electrodes 107. Therefore, by performing the scanning time-sharingly two times, the xy-coordinates of the magnetic field generator 208 can be specified.

FIG. 21 shows a sequence that the first switch circuit group 249-1, the second switch circuit group 250 and the third switch circuit group 249-2 are controlled by the timing circuit 245 so as to scan the segment electrodes 106 sequentially from a first one to an "n"th one and thereafter scan the common electrodes 107 sequentially from a first one to an "m"th one. It is to be noted that "n" and "m" represent the ordinal number of each of the segment electrodes and the common electrodes.

According to the experiment shown in FIG. 13 described hereinbefore, it is required to connect all the common electrodes 107 to the ground when the detection is performed from the segment electrodes 106. The converse can also hold. Taking the above-mentioned fact into account, when the segment electrode 106 are scanned to detect the coordinates of the magnetic field generator 208 from the segment electrode side, the timing circuit 245 controls the switch circuits 249a, 249b, 249c and 249d connected to the segment electrodes 106 so as to connect the switch circuits 249a through 249d to switch circuits 250a and 250b constituting the second switch circuit group 250 in the next stage. Meanwhile, the timing circuit 245 controls the switch circuits 249e, 249f, 249g and 249h connected to the common electrodes 107 so as to connect the switch circuits 249e through 249h to the ground. Then, the timing circuit 245 controls switch circuits 249i and 249j of the third switch circuit group 249-2 so as to switch the switch circuits 249i and 249j to the segment electrode side S. With the above-mentioned operation, a signal from the segment electrodes 106 is transmitted to the differential amplifier 242. Meanwhile, the common electrodes 107 are connected to the ground.

Conversely, when the coordinate of the magnetic field generator 208 is detected from the common electrodes 107, the timing circuit 245 connects the switch circuits 249e, 249f, 249g and 249h connected to the common electrodes 107 to switch circuits 250c and 250d in the next stage. Then, the timing circuit 245 connects to the ground the switch circuits 249a through 249d connected to the segment electrodes 106. Then, the timing circuit 245 connects the third switch circuits 249f and 249g to the common electrode side C. With the above-mentioned operation, a signal from the common electrodes 107 is transmitted to the differential amplifier 242, while the segment electrodes 106 are connected to the ground.

It is to be noted that the second switch circuits 250a, 250b, 250c and 250d are controlled by the timing circuit 245 to be properly switched so as to sequentially scan the segment electrodes and the common electrodes. Therefore, the differential amplifier 242 can sequentially detect a voltage outputted from the segment electrodes 106 or the common electrodes 107.

The second switch circuits 250a and b and 250c and d's are switched so as to timely sequentially scan the segment electrodes 106 and the common electrodes 107. With the above-mentioned scanning of the electrodes through switching, it can be detected how much degree of voltage is outputted from the segment electrodes 106 and the common electrodes 107 by means of the differential amplifier 242 or the like.

In the second embodiment, the scanning is performed sequentially from the origin of the xy-coordinate axes shown in FIG. 22. A positive input terminal + of the differential amplifier 242 shown in FIG. 22 is connected to a first segment electrode 106b from the origin of the xy-coordinate axes via the second switch circuit 250a, while a negative input terminal − of the differential amplifier 242 is connected to a second segment electrode 106a from the origin, thereby allowing the experiment shown in FIG. 13 to be partially reproduced. Subsequently, when scanning in one step is completed, the positive input terminal + of the differential amplifier 242 is connected to the second segment electrode 106a from the origin of the xy-coordinate axes, while the negative input terminal − is connected to a third segment electrode from the origin. As described above, in the second embodiment, the electrodes are scanned one by one while changing a combination of the electrode pair comprised of two electrodes.

In FIG. 21, numerals 1, 2, 3, . . . , n and numerals 1, 2, 3, . . . , m each enclosed in a mark ◊ illustrated respectively in the segment electrode detection period and the common electrode detection period of the coordinate detection period represent count values of the counter 243, and concurrently represent the ordinal numbers of contact points to which the second switch circuit group 250 is connected as well as the ordinal numbers of electrodes assigned in order from the origin of the xy-axes.

With the above-mentioned arrangement, the single-humped waveform shown in FIG. 17 as the result of the experiment of FIG. 13 is reproduced at the input terminals of the differential amplifier 242 with the axis of abscissas replaced by a time base. That is, in the above place, the condition of the experiment of FIG. 17 is reproduced.

Two adjoining electrodes are scanned as a pair in order to faithfully reproduce the experiment of FIG. 13 in the present case. However, for instance, it is acceptable to group adjoining or adjacent two or more electrodes in a group and perform the above-mentioned electrode scanning operation with two groups of the electrodes set as a pair.

The electrode scanning operation is performed by outputting a control signal to the switch circuits from the timing control circuit 245 via control lines connected between the timing control circuit 245 and the switch circuits.

FIG. 21 shows the fact that a changeover operation of the switch circuits is performed in a period in which the coordinates of the segment electrodes are detected and in a period in which the coordinates of the common electrodes are detected, the periods included in the coordinate detection period. By means of a control signal transmitted via the control lines, the switch circuit which operates in accordance with the timing shown in FIG. 21 can be easily implemented by an appropriate multiplexer device. Furthermore, the timing circuit 245 for generating the control signal on the control lines can be also easily implemented by combining a counter device, a gate device, and so forth availed on the market.

It is to be noted that the timing at which the second switch circuits 250 sequentially switch to scan the electrodes 106 and 107 and the timing at which the counter 243 is incremented one count by one count are required to coincide with each other. In order to achieve such coincidence, it is proper to generate a switching control signal of the second switch circuits 250 by means of the timing circuit 245 with a clock for the counter 243. It is also easy to implement the timing circuit 245 for generating such a control signal. With the above-mentioned arrangement, the electrode that is connected to the differential amplifier 242 in the scanning time can be known by the count value of the counter 243.

Further, the counter 243 is loaded in accordance with a timing at which the segment electrodes start to be scanned and a timing at which the common electrodes start to be scanned. The above-mentioned arrangement is adopted for the purpose of defining a time reference for electrode scanning. Thus, it is also easy to make the timing circuit 245 generate a load signal for loading the counter 243.

When the switch circuits 249-1, 249-2 and 250 and the coordinate transformation circuit 175-β are thus controlled, consequently the D-flip-flop 244 can obtain a count value in scanning each of the segment electrodes and the common electrodes (i.e., the ordinal number of the electrode connected to the differential amplifier 242 in the electrode scanning operation). The count value obtained by the D-flip-flop 244 corresponds to a count value of the counter 243 from when the counter 243 itself is reset, and thereafter counts one count by one count in synchronization with the sequential electrode scanning until a positive pulse is generated from the binarizing circuit 248.

In other words, the count value held in the D-flip-flop 244 can be interpreted as a value which is obtained, as the result of searching the coordinates of a position where the peak of the single-humped output voltage is detected by scanning the electrodes one by one, by representing the coordinates of the position by the amount of electrodes. The above-mentioned operation can be otherwise interpreted as detection of an x-coordinate value or a y-coordinate value which represents the position of the magnetic field generator 208 in the forms of the amount of electrodes.

As described above, data representing the x-coordinate value and the y-coordinate value of the above-mentioned position is held in the D-flip-flop 244 in accordance with a timing at which the positive pulse is outputted from the binarizing circuit 248 in the segment electrode detection period and the common electrode detection period shown in FIG. 21. Then, the data is utilized as detected coordinate data. There is no specific limitation on application methods of the coordinate data. For instance, there is an application method of illustrating an image by the pen similarly to that explained in the first embodiment of the present invention.

There can be considered another structure other than the aforementioned structure of the switch circuits of the present embodiment. Since the switch circuits can be easily changed in a variety of ways, no description therefor is provided herein. What is essential is the provision of a structure which can assure the timing shown in FIG. 21. Furthermore, there is no special reason for using a switch circuit, and therefore a three-state buffer circuit and other devices can be utilized in an effective combinatorial style.

Although the above description has been based on an LCD panel having 16 pixels in the present embodiment, the same structure can be also achieved in an LCD panel having more pixels.

As described above, the function changeover control circuit 108 shown in FIG. 1 performs a control operation for time-sharingly alternately performing image display and coordinate detection. Then, in accordance with the signal from the function changeover control circuit 108, the timing circuit 245 shown in FIG. 22 performs the aforementioned operation only in the coordinate detection period. In the image display period, the timing control circuit 245 disconnects the first switch circuit 249-1 and so forth from the coordinate transformation circuit 175-β so that the coordinate transformation circuit 175-β does not hinder the image display operation. In more detail, in the image display period, the timing control circuit 245 switches the switch circuits 249a through h to the contact point side S so as to electrically connect the electrodes of the LCD panel to the second switch circuits 250. At the same time, the second switch circuits 250 switch to a sixth contact point 6 connected to nothing so as to disconnect the third switch circuits 249i and j from the LCD panel. Consequently, the image display operation is not influenced by the coordinate transformation circuit 175-β shown in FIG. 22, and therefore the image display operation can be performed utterly in the same manner as in the conventional techniques.

Other than the aforementioned features, there is a structure similar to that of the conventional technique. For instance, the function changeover control circuit 108 and the image display drive circuit 101 shown in FIG. 1 have the same operations as those of the prior arts.

The aforementioned operation of the second embodiment will be described again in regard to a timing of the control signal with reference to timing charts shown in FIGS. 24A through 24J. The timing charts show an enlargement of the coordinate detection period of the timing chart shown in FIG. 21.

Figure 24A:
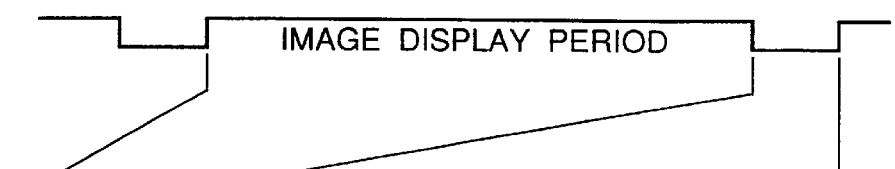
FIGS. 24A, 24B, 24C, . . . , 24J are timing charts for explaining an operation of a coordinate detection circuit of the second embodiment according to signals at several points.
Figure 24B:

Among signals transmitted from the timing circuit 245 to the counter 243 shown in FIG. 22, a clock signal is continuously supplied to the counter 243 in a manner as shown in FIG. 24B.

Figure 24C:
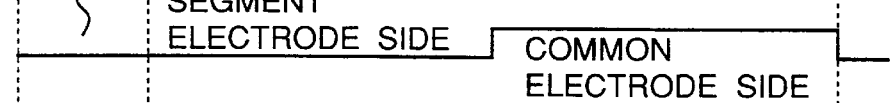
Figure 24D:
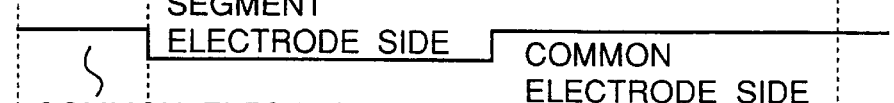
Figure 24E:

The timing circuit 245 generates a switching control signal to be supplied to the first switch circuit group 249-1 based on a timing signal supplied from the function changeover control circuit 108 as shown in FIG. 24A. A switching control signal supplied to the switch circuits 249a through d is shown in FIG. 24C, while a switching control signal supplied to the switch circuits 249e through j is shown in FIG. 24D. The control signals are used for switching the switch circuits according to FIG. 21. There are two signals shown in FIGS. 24C and 24D supplied from the timing circuit 245 to the switch circuits 249. In the coordinate detection period, both the signals switch the contact points of the switch circuits to the segment electrode side S and to the common electrode side C. In the image display period, the switching control signal shown in FIG. 24C switches the switch circuits 249a through d to the segment electrode side, while the switching control signal shown in FIG. 24D switches the switch circuits 249e through j to the common electrode side. Further, a switching control signal as shown in FIG. 24E connects the switch circuit 250 always to the contact point 6 in the image display period, and sequentially scans the contact points 1 through 5 in the coordinate input period.

Figure 24F:
Figure 24G:

Furthermore, the timing circuit 245 generates a load signal as shown in FIG. 24F based on a timing signal supplied from the function changeover control circuit 108. The load signal is outputted once at a detection start time on the segment electrode side and a detection start time on the common electrode side. Subsequently, the counter 243 starts counting, and increments it count value in accordance with a clock.

Figure 24:
Figure 24J:

When the magnetic field generator 208 is located around the third segment electrode and the fourth common electrode, i.e., around the coordinates (x,y)=(3,4), a waveform as shown in FIG. 24I is outputted from the comparator 248 as explained with reference to the waveform shown in FIG. 23C. In more detail, when the second switch circuit group 250 scans a position around the third segment electrode and the fourth common electrode, a pulse having a positive polarity is outputted from the comparator 248. Then, an instantaneous count value (3,4) of the counter 243 is latched in the D-flip-flop 244 as shown in FIG. 24J. The count value (3,4) represents the coordinates at which the magnetic field generator 208 is located. Thus the coordinates of the magnetic field generator 208 can be detected.

As described above, in accordance with the timing at which the positive pulse is outputted from the comparator 248 in each of the detection periods shown in FIG. 21, the D-flip-flop 244 holds the x-coordinate value and the y-coordinate value of the position in which the magnetic field generator 208 is located. Data representing the coordinates of the position of the magnetic field generator 208 can be separately utilized as detected coordinate data. There is no specific limitation on application methods of the data. For instance, by repetitively lighting previously detected coordinates in a period in which the function changeover control circuit 108 shown in FIG. 1 orders image display, an image can be written on the LCD panel 100 by means of the magnetic field generator 208 with a tough of writing an image on a paper sheet by means of a writing pen. Furthermore, by taking the simultaneously detected coordinate data in a CPU, a desired processing operation such as character recognition can be performed.

There can be considered another structure for each of the switch circuits of the second embodiment. Since each switch circuit can be easily constructed in a variety of ways, no description therefor is provided herein. What is essential is the provision of a structure which can assure the timing shown in FIGS. 21 and 24. Furthermore, there is no special reason for using a switch circuit, and therefore a circuit having a function similar to that of the switch circuits can be constructed by combining a three-state buffer circuit and other devices in an effective combinatorial style.

Although the above description has been based on an LCD panel having 16 pixels for simplicity in the second embodiment, the LCD panel 100 of course includes a greater amount of pixels in a practical case as described hereinbefore. Furthermore, in a case where an LCD panel having more pixels, utterly the same basic structure and basic operation as those of the second embodiment can be also achieved.

As described hereinbefore, the function changeover control circuit 108 shown in FIG. 1 controls the image display drive circuit 101 and the coordinate detection circuit 105-β so as to time-sharingly alternately perform image display and coordinate detection on the LCD panel 100. The function changeover control circuit 108 shown in FIG. 1 outputs a control signal to a timing circuit 254 as shown in FIG. 22. Then, the coordinate detection circuit 105-β performs the aforementioned coordinate detection operation only in the coordinate detection period, and operates to disconnect the first switch circuit group 249 and so forth from the LCD panel 100 so that they do not hinder the image display operation in the image display period. In more detail, in the image display period, the switch circuits 249a through h constituting the first switch circuit group 249-1 are connected to the contact points for connecting all the electrodes to the second switch circuit group 250. Consequently, the switch circuits 249a through d are connected to the contact points on the side S in FIG. 22, while the switch circuits 249e through h are connected to the contact points on the side C. On the other hand, switch circuits 250a through d constituting the second switch circuit group 250 are connected to the sixth contact point 6 connected to nothing. Further, the switch circuits 249i and 249j constituting the third switch circuit group 249-2 in the next stage are connected to no contact point. With the above-mentioned arrangement, the image display operation on the LCD panel 100 is not influenced by the coordinate detection circuit 105-β, and therefore the image display operation is performed utterly in the same manner as in the prior arts. Meanwhile, an output circuit (not shown) of the image display drive circuit 101 shown in FIG. 1 normally has a three-state buffer, and therefore an output terminal thereof is allowed to have a high impedance. Therefore, it is proper to make the function changeover control circuit 108 control the image display drive circuit 101 so as to operate the output circuit of the image display drive circuit 101 only in the image display period, and make the output terminal of the image display drive circuit 101 have a high impedance in the coordinate input period. With the above-mentioned arrangement, the image display drive circuit 101 exerts no influence on the coordinate detection circuit 105-β, and therefore the coordinate input circuit and the image display drive circuit can be easily separated from each other.

Figure 25A:
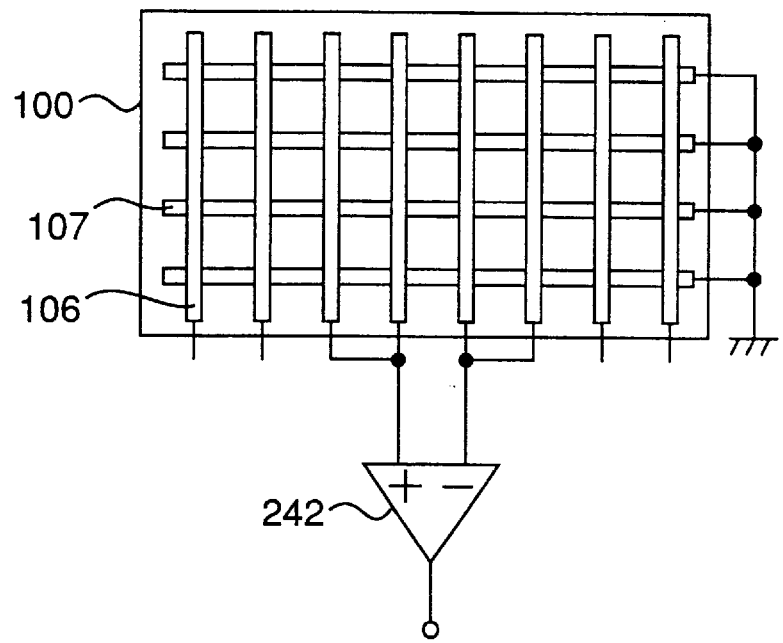
FIGS. 25A and 25B are schematic views for explaining a modification of the second embodiment wherein a pair of electrode groups each being comprised of two or three electrodes are connected to a differential amplifier.
Figure 25B:
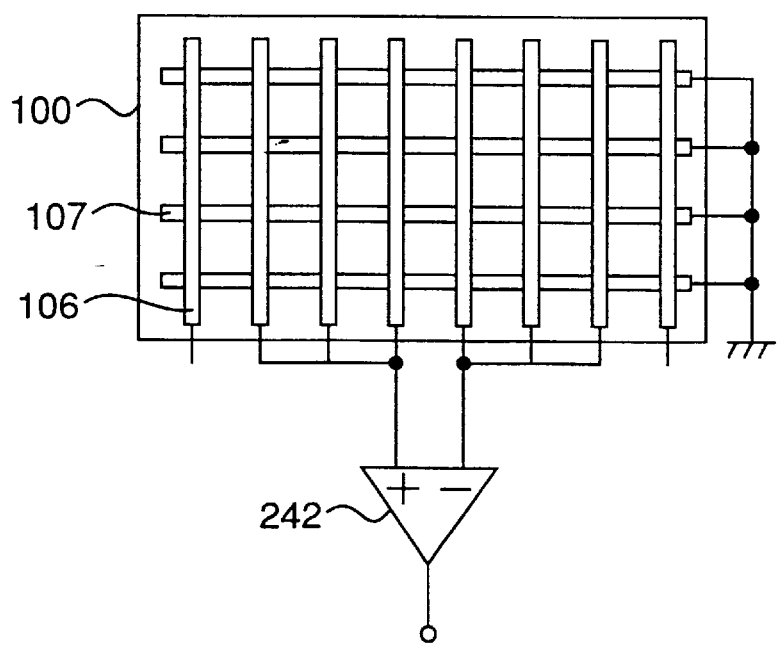

In the second embodiment, as shown in FIG. 22, one segment electrode 106 or one common electrode 107 is connected to each of the two input terminals of the differential amplifier 242. However, as shown in FIG. 25A, two electrodes of the LCD panel may be connected to each of the input terminals of the differential amplifier 242. Furthermore, as shown in FIG. 25B, three electrodes of the LCD panel may be connected to each of the two input terminals of the differential amplifier 242. Thus, by connecting several electrodes to each of the two input terminals of the differential amplifier, a signal-to-noise ratio of the detection signal can be improved. It is to be noted that the switch circuit and the timing circuit shown in FIG. 22 are not illustrated in FIG. 25 to be simplified.

Figure 26A:
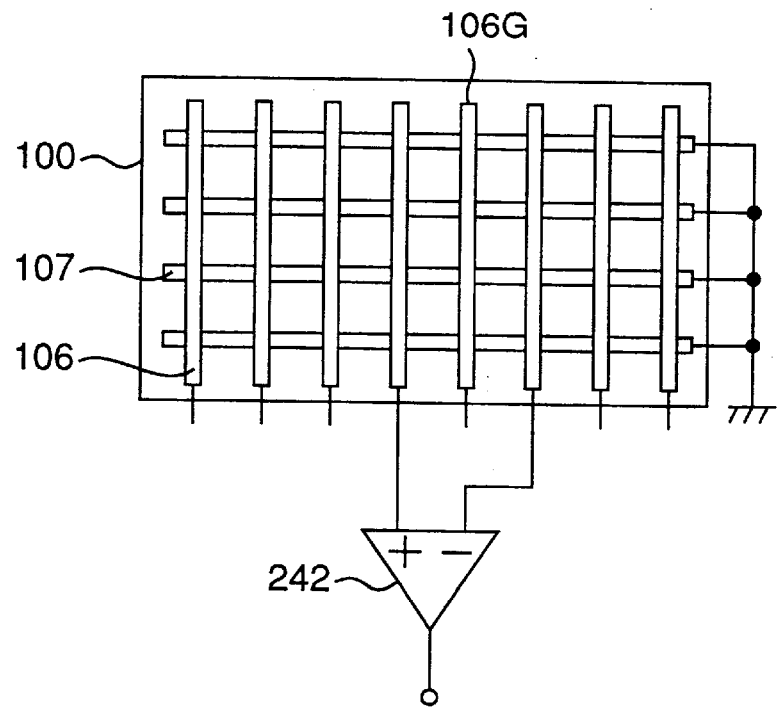
FIGS. 26A and 26B are schematic views for explaining a modification of the second embodiment wherein one or two electrodes are existing between a pair of electrodes connected to the differential amplifier.
Figure 26B:
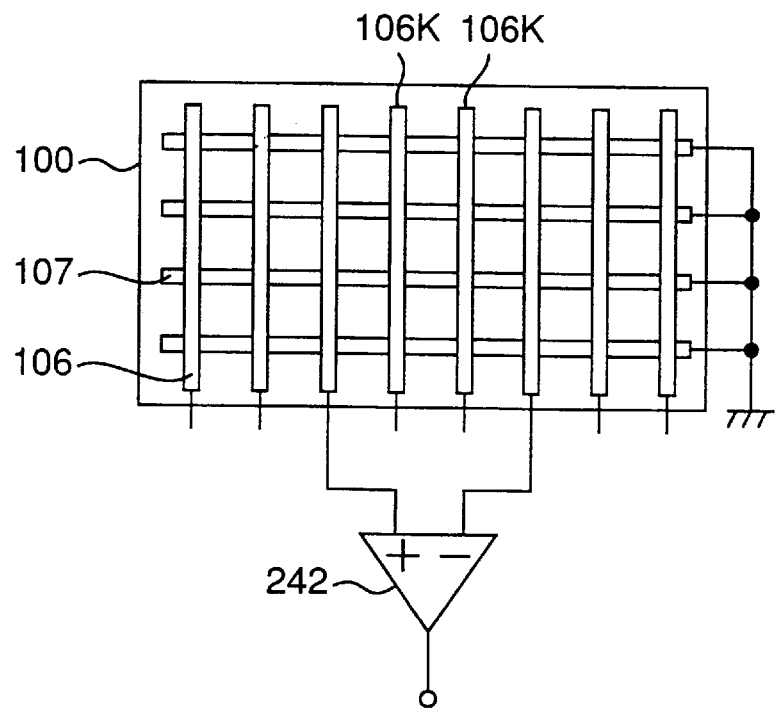
Figure 27A:
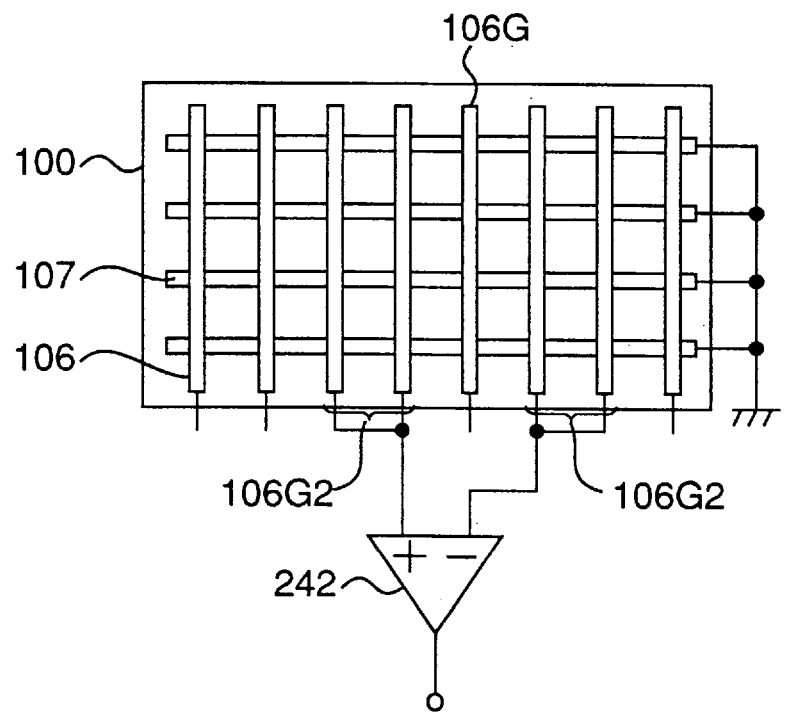
FIGS. 27A and 27B are schematic views for explaining a modification of the second embodiment wherein a pair of electrode groups arranged with interposition of one or two electrodes are connected to a differential amplifier.
Figure 27B:
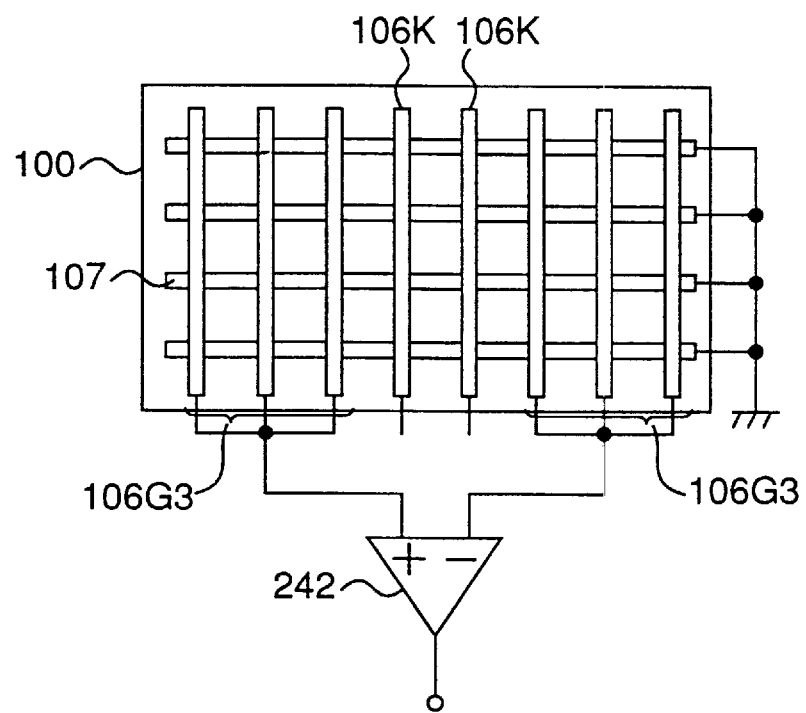

In the second embodiment, a pair of electrodes 106 connected to the input terminals of the differential amplifier 242 are adjoining to each other. However, as shown in FIG. 26A, a pair of segment electrodes 106 arranged with interposition of one electrode 106G may be connected to the input terminals of the differential amplifier 242. Furthermore, as shown in FIG. 26B, a pair of segment electrodes 106 arranged with interposition of two electrodes 106K may be connected to the input terminals of the differential amplifier 242. Furthermore, as shown in FIG. 27A, a pair of electrode groups 106G2 and 106G2 arranged with interposition of one electrode 106G may be connected to the differential amplifier 242. The electrode groups 106G2 are each comprised of two electrodes 106. Furthermore, as shown in FIG. 27B, a pair of electrode groups 106G3 and 106G3 arranged with interposition of two electrodes 106K may be connected to the differential amplifier 242. The electrode groups 106G3 are each comprised of three electrodes 106.

As shown in FIGS. 25A through 27B, there are a number of methods for connecting the electrodes to the differential amplifier 242. What is essential is to connect the electrodes so as to achieve a most improved signal-to-noise ratio. For instance, when a pair of electrode groups arranged with interposition of three electrodes are connected to the differential amplifier, the electrode groups are each required to include four electrodes. Furthermore, in any of the connections shown in FIGS. 25A through 27B, the point that the scanning of the electrodes is performed one by one is the same as in the second embodiment, and therefore a resolution in position detection does not deteriorate.

Third embodiment

Figure 28:
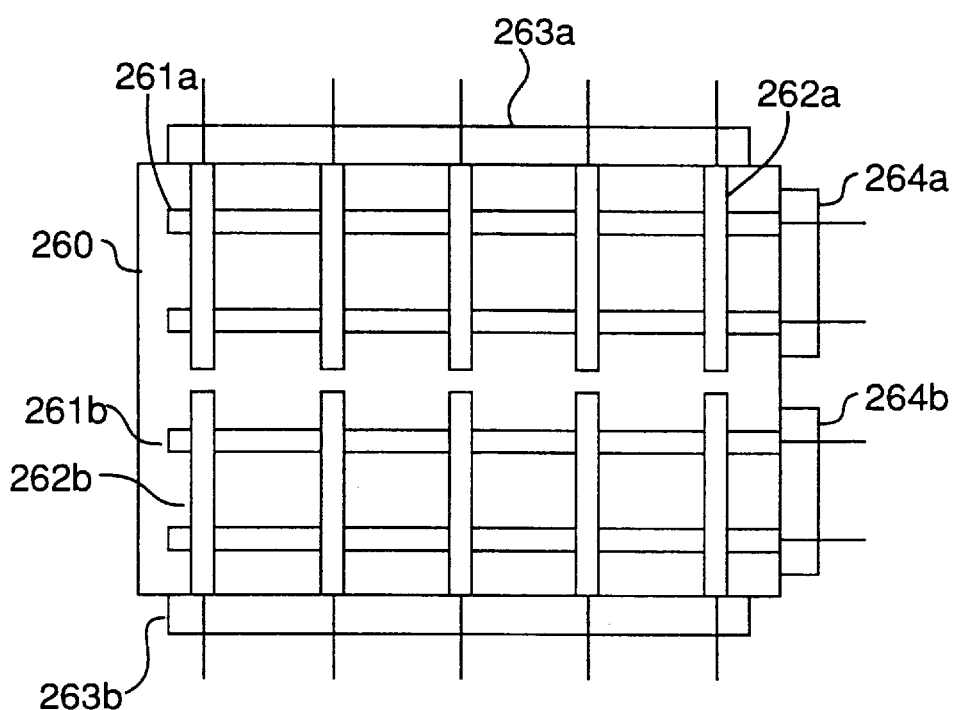
FIG. 28 is a view of an electrode structure of a high-density LCD panel according to a third embodiment of the present invention.

Next, FIG. 28 shows a third embodiment of the present invention. The third embodiment includes an LCD panel 260 of which display capacity is increased. In FIG. 28, the LCD panel 260 includes a common electrode 261a in an upper row and a common electrode 261b in a lower row. The common electrodes 261a and 261b are connected to common electrode connectors 264a and 264b, respectively.

In FIG. 28, the LCD panel 260 further includes a segment electrode 262a in an upper row and a segment electrode 262b in a lower row. The segment electrodes 262a and 262b are connected to segment electrode connectors 263a and 263b, respectively.

As shown in FIG. 28, a pair of segment electrode 262a and segment electrode 262b has a configuration where an approximately center portion of one segment electrode is removed.

The LCD panel 260 shown in FIG. 28 is referred to as a "multiple electrode simultaneous scanning type panel". The LCD panel 260 adopts a duty ratio drive system, and has a configuration where a center portion of each segment electrode comprised of a pair of segment electrode 262a and segment electrode 262b is separated into two parts at its center portion. In other words, the segment electrode comprised of a pair of segment electrodes 262a and 262b has a structural feature that it does not continuously extend from one end to the other end of the LCD panel 260. Therefore, the LCD panel 260 has, so to speak, a structure in which two upper and lower LCD panels are connected with each other at the center position. In regard to structure, the multiple electrode simultaneous scanning type LCD panel 260 has a pair of terminals wired from the common electrodes 261a and 261b and two pairs of terminals wired from the segment electrodes 262a and 262b. The common electrodes 261a and 261b are usually directed rightward or leftward, while the segment electrodes 262a and 262b are usually directed both upward and downward.

The present invention is capable of completely separating the coordinate input function from the image display function. Therefore, whatever display panel is used, a coordinate input function can be incorporated into the panel by means of the technique of the present invention. Therefore, the present invention can be applied to the multiple electrode simultaneous scanning type LCD panel 260. The third embodiment is an embodiment wherein the present invention is applied to the LCD panel 260.

Figure 29:
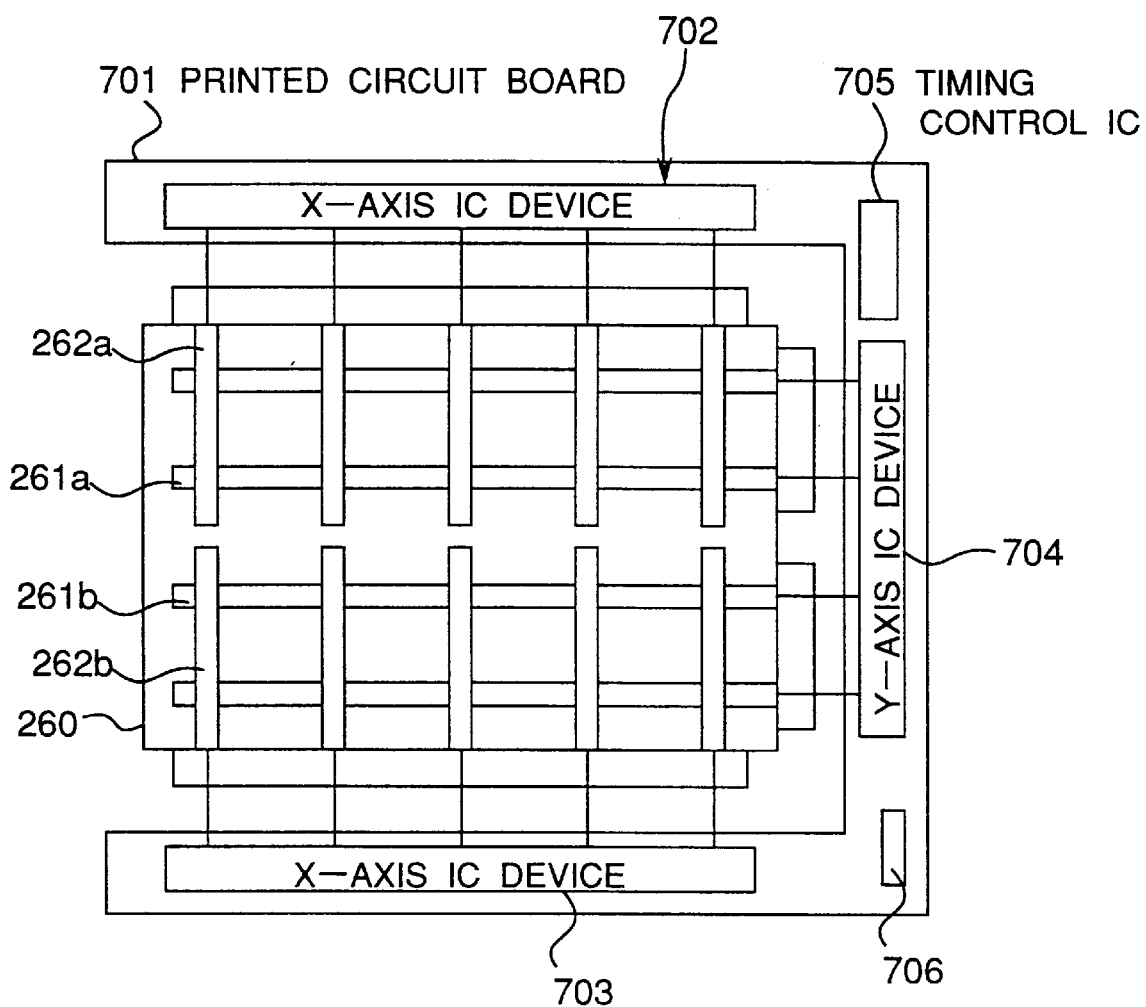
FIG. 29 is a view of a printed circuit board arranged in a bracket-like form beside the LCD panel of the third embodiment.

FIG. 29 shows a module structure of the third embodiment. As shown in FIG. 29, the third embodiment includes a printed circuit board 701 which is provided in a bracket-like form alongside the LCD panel 260. The printed circuit board 701 is provided with an x-axis IC device 702, an x-axis IC device 703, a y-axis IC device 704, a timing control IC 705, and a signal I/O terminal 706. The x-axis IC device 702 is connected to the segment electrode 262a, the x-axis IC device 703 is connected to the segment electrode 262b, and the y-axis IC device 704 is connected to the common electrodes 261a and 261b.

The x-axis IC devices 702 and 703 and the y-axis IC device 704 are designed to have the function of the coordinate detection circuit 105-β concurrently with the function of the image display drive circuit 101 shown in FIG. 1. The timing control IC 705 corresponds to the function changeover control circuit 108 shown in FIG. 1.

The module structure of the third embodiment differs from the conventional liquid crystal display module provided specially for image display in that the timing control IC 705 and the signal I/O terminal 706 are incorporated.

As shown in FIG. 29, the third embodiment is the same as the conventional display module provided specially for image display in terms of the point that the bracket-shaped printed circuit board 701 is attached to the LCD panel 260 as arranged opposite to only three sides of the panel. Therefore, the printed circuit board 701 of the third embodiment can be assembled into a space having an area identical to that of the space in which the conventional module provided specially for image display. The above-mentioned arrangement not only satisfies a requirement for compacting the product but also prevents possible complication of the manufacturing process, thereby producing an effect of remarkably reducing the manufacturing cost.

In contrast to the above, in the conventional coordinate input function-integrated display device as described hereinbefore, it is required to connect a printed circuit board to all the four sides of the LCD panel, which has been resulted in a drawback that a device to which a module (printed circuit board) is incorporated dimensionally increases.

Figure 30:
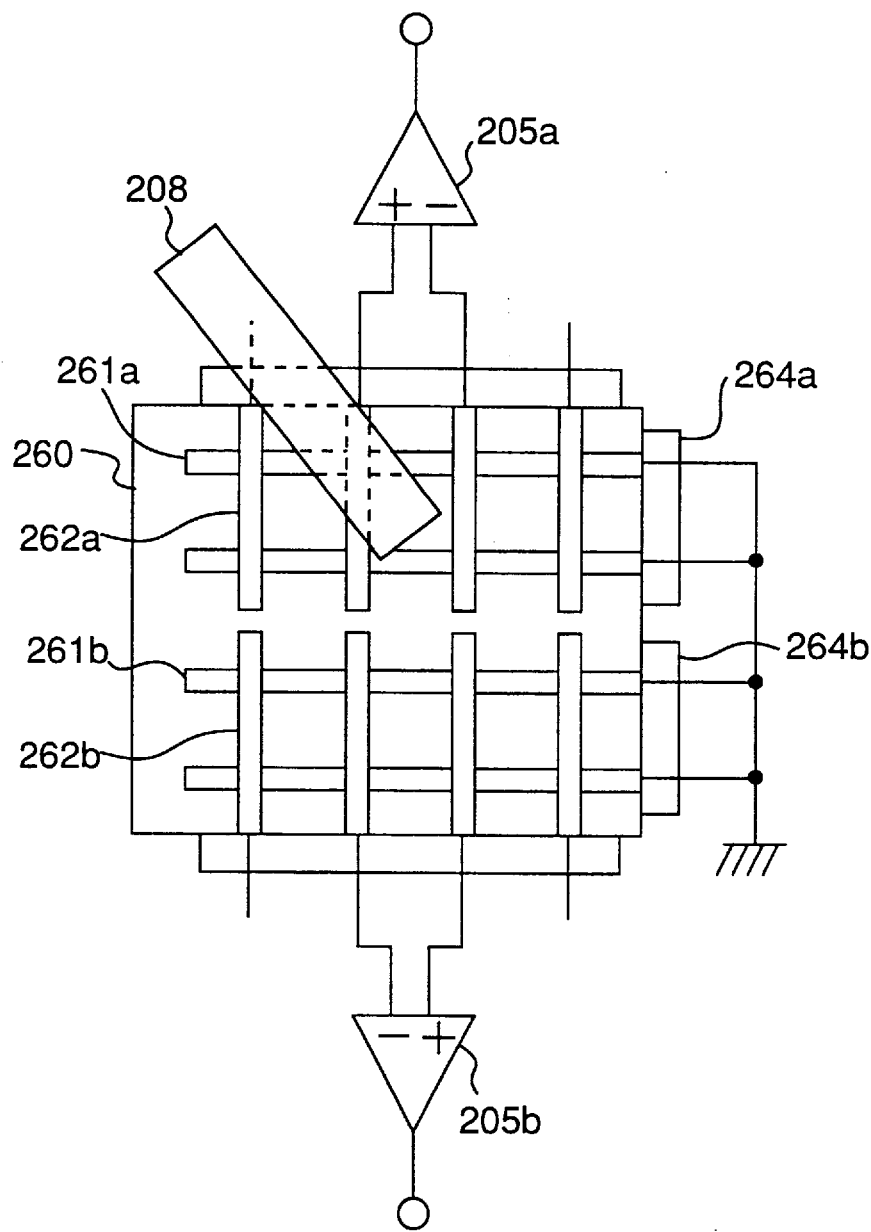
FIG. 30 is a view of two differential amplifiers connected to the LCD panel of the third embodiment.

As shown in FIG. 30, the third embodiment has at least two sets of the basic structure of the second embodiment of the present invention described hereinbefore. In regard to the segment electrodes 262a and 262b, signals are taken out both from the upper side and lower side by means of differential amplifiers 205a and 205b. In FIG. 30, the common electrodes 261a and 261b are connected to the ground. Conversely, it is required to provide a switch circuit (not shown) for changing over between connections so as to connect the segment electrodes 262a and b to the ground and take out signals from the common electrodes 261a and b. It is to be noted that a reference numeral 208 denotes a magnetic field generator.

Since the LCD panel 260 is widely used in a word processor or the like, a number of reference documents can be obtained. For instance, it is appropriate to refer to page 99 of "Liquid crystals=Applications, compiled by Okano and kobayashi, published by Tofuukan, 7th issue, 1992" as a reference document. Needless to say, the LCD panel 260 has been conventionally used specially for image display, and therefore peripheral circuits and so forth for an image display operation are well known.

Figure 31:
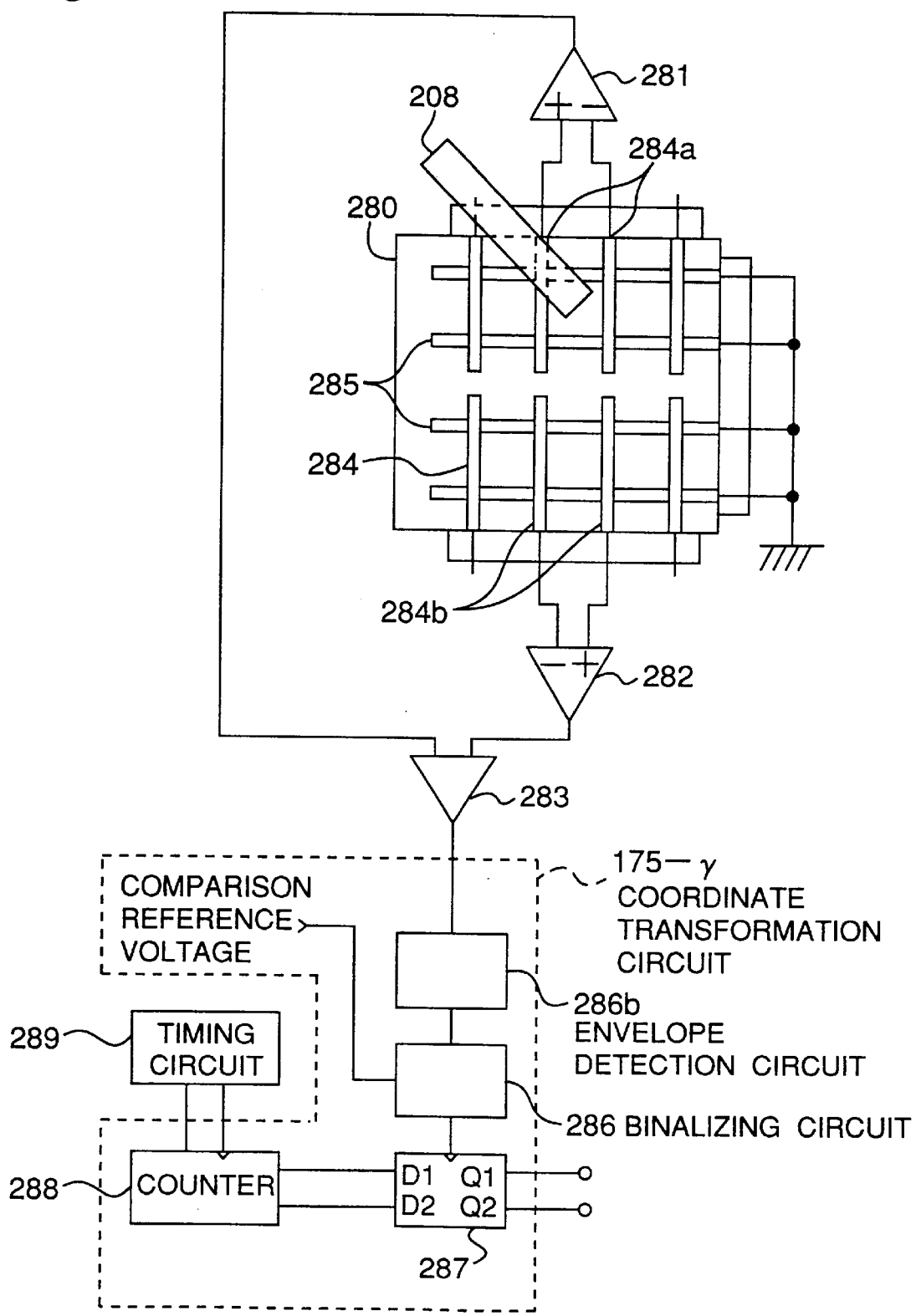
FIG. 31 is a view of a state wherein the two differential amplifiers are connected to a coordinate transformation circuit.

Next, a structure and an operation of the third embodiment will be described with reference to FIG. 31. FIG. 31 for explaining the third embodiment corresponds to FIG. 22 for explaining the second embodiment. An LCD panel 280 as shown in FIG. 31 is an LCD panel substantially similar to that of the multiple electrode simultaneous scanning type LCD panel 260 shown in FIG. 30. The LCD panel 280 includes a segment electrode 284 of which approximate center portion is removed similarly to the LCD panel 260 shown in FIG. 30. Therefore, the segment electrode 284 has a segment electrode 284a in an upper row in FIG. 31 and a segment electrode 284b in a lower row in FIG. 31. The LCD panel 280 further includes a common electrode 285 similarly to the LCD panel 260 shown in FIG. 30.

As shown in FIG. 31, a pair of two segment electrodes 284a and b have their one end opened and the other end connected to a differential amplifier 281 and a differential amplifier 282. Then, outputs of the differential amplifier 281 and the differential amplifier 282 are connected to an adder 283. A reference numeral 208 denotes a magnetic field generator.

A coordinate transformation circuit 175-γ as shown in FIG. 31 has a structure substantially similar to that of the coordinate transformation circuit 175-β shown in FIG. 22. The coordinate transformation circuit 175-γ has an envelope detection circuit 286b, a binarizing circuit 286, a counter 288, a D-flip-flop 287, and a timing circuit 289. As described hereinafter, there are required several switch circuits similar to those shown in FIG. 22 other than the structure shown in FIG. 31.

In the state shown in FIG. 31, the common electrode 285 is connected to the ground, while the segment electrode 284 is connected to two differential amplifiers 281 and 282. Some of the above-mentioned switch circuits have a role of changing over between connections of the segment electrode 284 and the common electrode 285 and a role of scanning the electrodes.

As described hereinbefore, an experiment on which the present invention is based is shown in FIG. 13. An output as shown in FIG. 17 was able to be obtained from the electrode to which the magnetic field generator 208 was put close. According to the experiment result shown in FIG. 17, it was confirmed that the magnetic field generator 208 is located at or around the coordinates indicated by the peak of the detected single-humped output signal. Therefore, also in the third embodiment, it can be considered that the differential amplifier 281 or 282 outputs a signal in which the axis of abscissas of the experiment result of FIG. 17 is replaced by a time base similarly to the second embodiment. Then, by detecting a timing (time) at which the peak of the output signal takes place, the coordinates of the position in which the magnetic field generator 208 is located can be detected.

In the third embodiment, the LCD panel 280 can be regarded as a panel separated into two upper and lower parts in FIG. 31. Therefore, when the magnetic field generator 208 is located at the upper half part of the LCD panel 280, a signal from the electrodes 284 and 285 of the LCD panel 280 can be detected only by the differential amplifier 281. When the magnetic field generator 208 is located at the lower half part of the LCD panel 280, the signal from the electrodes 284 and 285 can be detected only by the differential amplifier 282. Therefore, by adding together the outputs from the two differential amplifiers 281 and 282 in the adder 283, the position of the magnetic field generator 208 can be detected on the entire surface of the LCD panel 280. The above-mentioned arrangement is the main feature of the third embodiment.

Next, an operation of the third embodiment will be described according to a signal flow with reference to FIG. 31.

First, when the magnetic field generator 208 is located at the upper half part of the LCD panel 280, a signal from the LCD panel 280 is detected only by the differential amplifier 281. When the magnetic field generator 208 is located at the lower half part of the LCD panel 280, the signal from the LCD panel 280 is detected only by the differential amplifier 282. Therefore, the differential amplifiers 281 and 282 output signals similar to the output signal shown in FIG. 17 according to the position of the magnetic field generator 208. Therefore, by adding together the outputs of the differential amplifiers 281 and 282, an output similar to the output shown in FIG. 17 can be obtained when the magnetic field generator 208 is located in whichever position of the entire surface of the LCD panel 280.

A signal flow subsequent to the adder 283 is approximately equal to that of the second embodiment. That is, the signal is detected by the envelope detection circuit 286b to detect an envelope, and then the envelope output is binarized by the binarizing circuit 286 to obtain a pulse signal. The output pulse is generated in correspondence with the peak of the single-humped signal shown in FIG. 17 similarly to the second embodiment. Therefore, by detecting the output pulse, the position of the magnetic field generator 208 can be detected.

The timing circuit 289 inputs a set signal representing a specified timing to a load terminal of the counter 288. The counter 288 starts counting according to a specified clock used as a time reference. Then, by inputting a count value of the counter 288 to a D terminal of the D-flip-flop 287 and inputting the output pulse from the binarizing circuit 286 to a clock terminal of the D-flip-flop 287, the D-flip-flop 287 holds data supplied from the counter 288 to the D-flip-flop 287 in accordance with a timing at which the output pulse from the binarizing circuit 286 is outputted.

When the timing circuit 289 performs an operation timing control as described below, the data to be held in the D-flip-flop 287 can represent the coordinates of the magnetic field generator 208.

The operation of detecting the coordinates of the position of the magnetic field generator 208 is performed similarly to the second embodiment, just as explained with reference to FIG. 22. That is, though not shown in FIG. 31, by providing a specific switch circuit and controlling the switch circuit similarly to the second embodiment so as to scan the segment electrodes and the common electrodes, a signal can be detected to allow the coordinates of the magnetic field generator 208 to be specified.

Figure 32:
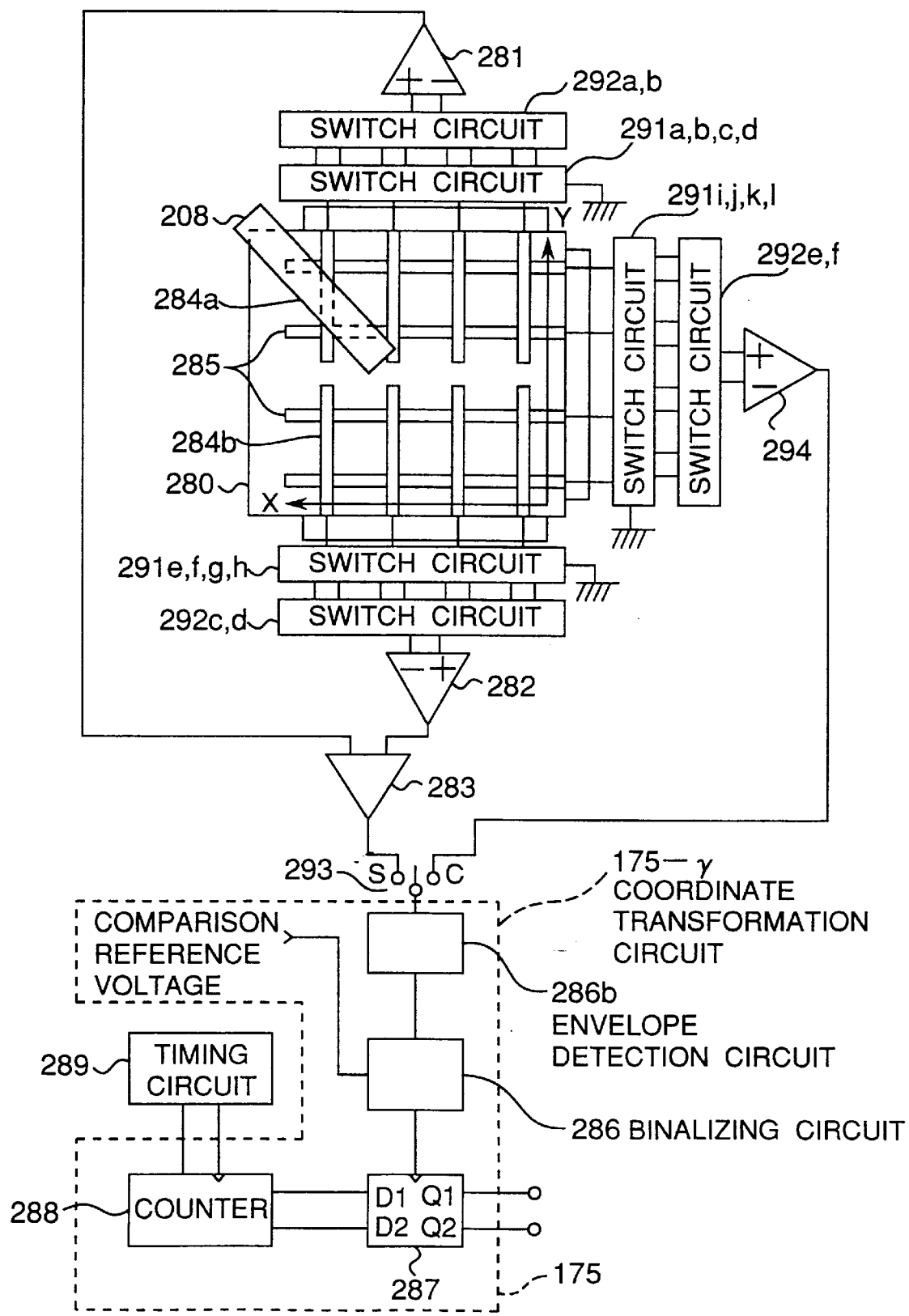
FIG. 32 is a view of a state wherein differential amplifiers are connected to the LCD panel of the third embodiment via switch circuits.

Next, necessary switch circuits which are not illustrated in FIG. 31 will be described with reference to FIG. 32. FIG. 32 shows a first switch circuit 291, a second switch circuit 292 and a third switch circuit 293 which are necessary. The first switch circuit 291 is comprised of first switch circuits 291a through d, 291e through h and 291i through l. The second switch circuit 292 is comprised of second switch circuits 292a and b, second switch circuits 292c and d and second switch circuits 292e and f. Operations of the first, second and third switch circuits 291, 292 and 293 and the timing circuit 289 will be described.

As shown in FIG. 32, in the third embodiment, the first switch circuits 291a, b, c and d are provided for the segment electrode 284a, while the first switch circuits 291e, f, g and h are provided for the segment electrode 284b. In other words, in the third embodiment, the first switch circuits 291a through d and 291e through h are provided along two sides of the LCD panel 280. Since the third embodiment has the switch circuits for detecting a signal from the segment electrodes along the two sides of the LCD panel 280, the switch circuit structure is more complicated than that of the second embodiment.

Though no detailed structure is shown in FIG. 32, the first and second switch circuits 291 and 292 have the same structures as those of the first switch circuit group 249-1 and the second switch circuit group 250 shown in FIG. 22. For instance, the switch circuits 291a, b, c and d and 291e, f, g and h shown in FIG. 32 have the same structures as those of the switch circuits 249a, b, c and d shown in FIG. 22. Similarly, the switch circuits 291i, j, k and l shown in FIG. 32 have the same structures as those of the switch circuits 249e, f, g and h shown in FIG. 22.

The switch circuits 292a and b and switch circuits 291c and d shown in FIG. 32 have the same structures as those of the switch circuits 250a and b shown in FIG. 22, while the first switch circuits 292e and f shown in FIG. 32 have the same structures as those of the switch circuits 250c and d shown in FIG. 22.

Thus, since the first and second switch circuits 291 and 292 of the third embodiment correspond to the first and second switch circuits of the second embodiment, it is easy to understand the structure shown in FIG. 32 with reference to FIG. 22.

Next, an operation of the timing circuit 289 will be described. The timing circuit 289 mainly controls the operations of the first, second and third switch circuits 291, 292 and 293, and further generates a clock signal to be inputted to the counter 288. The timing circuit 289 controls the switch circuits 291, 292 and 293, and makes the data held in the D-flip-flop 287 indicate the coordinates of the magnetic field generator 208 by inputting the clock signal to the counter 288. The control is performed by the timing circuit 289 in the same manner as in the second embodiment shown in FIGS. 21 and 24.

In the third embodiment, a signal can be detected from the segment electrodes 284 by means of the differential amplifiers 281 and 282 with the common electrodes 285 all connected to the ground in the same manner as described in the aforementioned experiment. Also, a signal can be detected from the common electrodes 285 by means of a differential amplifier 294 with the segment electrodes 284 all connected to the ground. In the aforementioned experiment, a voltage waveform having a single-humped form was able to be detected in correspondence with the position of the magnetic field generator. Then, the peak portion of the single-humped voltage waveform represented the coordinates of the position in which the magnetic field generator 208 was located. Therefore, by performing two times coordinate detection from the segment electrode side and coordinate detection from the common electrode side, the xy-coordinates of the magnetic field generator 208 was able to be specified. Therefore, also in the third embodiment, it is proper to time-sharingly perform two times coordinate detection of the position of the magnetic field generator 208 from the segment electrode 284 side to the common electrode 285 side. In a manner similar to that confirmed in the experiment of FIG. 13, when the segment electrodes 284 are scanned to detect the coordinates of the position, it is required to connect all the common electrodes 285 to the ground. The converse can also hold. Therefore, the timing circuit 289 switchingly controls the switch circuits 291 and 292 so as to satisfy the aforementioned requirements. In detail, when the segment electrodes 284 are scanned to detect the x-coordinate value of the magnetic field generator 208, the first switch circuits 291a through d and 291e through h connected to the segment electrodes 284 are connected to the second switch circuits 292a and b and 292c and d in the next stage so as to transmit signals. Then, the first switch circuits 291i through l connected to the common electrodes 285 are connected to the ground. Consequently, signals from the segment electrodes 284 are transmitted to the differential amplifiers 281 and 282 via the second switch circuits 292a and b and 292c and d, respectively. Then, signals amplified in the differential amplifiers 281 and 282 are further added together in the adder 283. Then, an output outputted from the adder 283 is inputted to the coordinate transformation circuit 175-γ via the third switch circuit 293 switched to the segment electrode side s, and then transmitted to the envelope detection circuit 286b and the binarizing circuit 286. A subsequent signal flow and an operation of the coordinate transformation circuit 175-γ are the same as explained in the second embodiment.

Conversely, when the coordinate detection is performed from the common electrodes 285 side, the first switch circuits 291i through l connected to the common electrodes 285 are connected to the second switch circuits 292e and f in the next stage to transmit a signal. Meanwhile, the switch circuits 291a through d and 291e through h connected to the segment electrodes 284 are connected to the ground. A signal outputted from the second switch circuits 292e and 292f is transmitted via the differential amplifier 294 to the third switch circuit 293 which is switched to the common electrode side c. Since the third switch circuit 293 is switched to the common electrode side c, the signal is transmitted to the binarizing circuit 286 of the coordinate transformation circuit 175-γ. A subsequent signal flow and an operation of the coordinate transformation circuit 175-γ are the same as those of the second embodiment described hereinbefore.

The second switch circuits 292a and b and e and f are switched so as to sequentially scan the segment electrodes 284 and the common electrodes 285, with which it can be detected how great value of voltage is outputted from each of the segment electrodes 284 and the common electrodes 285 by means of the differential amplifiers 281, 282 and 294. The second switch circuit 292 sequentially scans each of the electrodes from the electrode adjacent to the origin of xy-coordinate axes shown in FIG. 32. In FIG. 32, there is set xy-coordinate axes of which origin is located at a lower right position of the LCD panel 280 similarly to FIG. 22. Then, the electrodes are sequentially scanned from the one adjacent to the origin of the xy-coordinate axes.

When the states of the contact points of the switch circuits 291 and 292 are in the same contact point connection states as those of the first and second switch circuits shown in FIG. 22, the first segment electrode 284 from the origin of the x-axis is connected to a negative input terminal of the differential amplifier 281, and the second segment electrode from the origin of the x-axis is connected to a positive input terminal of the differential amplifier 281. When the scanning proceeds by one step, the second segment electrode from the origin of the x-axis and the third segment electrode from the origin of the x-axis are connected to the negative input terminal and the positive input terminal of the differential amplifier 281, respectively.

Meanwhile, the first segment electrode from the origin of the x-axis is connected to a positive input terminal of the differential amplifier 282, and the second segment electrode from the origin of the x-axis is connected to a negative input terminal of the differential amplifier 282. When the scanning proceeds by one step, the second segment electrode from the origin of the x-axis and the third segment electrode from the origin of the x-axis are connected to the negative input terminal and the positive input terminal of the differential amplifier 282, respectively.

Thus a combination of the pair composed of four segment electrodes 284a and 284b which are arranged in the upper and lower rows and connected to the two differential amplifiers 281 and 282 is shifted sequentially one electrode by one electrode in a direction in which x-axis position coordinates extend in the x-axis. Thus, each combination of the segment electrodes to be connected to the differential amplifiers 281 and 282 are sequentially scanned. Therefore, a waveform obtained by replacing the axis of abscissas of the single-humped waveform shown in FIG. 17 with a time base is outputted from the output terminal of the adder 283. In other words, the condition shown in FIG. 13 is achieved.

In the third embodiment, the scanning is performed by pairing adjoining two electrodes in order to faithfully reproduce the experiment shown in FIG. 13. However, the above-mentioned scanning may be performed by combining adjoining or adjacent two or more electrodes as an electrode group and pairing adjoining two electrode groups.

The scanning operation is performed by outputting a switching control signal from the timing circuit 289 to control lines (not shown) which are wired from the timing circuit 289 to the switch circuits 291 through 293. A switching operation of the switch circuits is similar to that of FIGS. 21 and 24.

The switch circuit for performing the switching operation by a signal inputted from the control lines wired from the timing circuit 289 can be easily implemented by a proper multiplexer device. Furthermore, the timing circuit 289 for outputting a control signal as described above to the control lines can be easily implemented by combining a counter device, a gate device, and so forth availed on the market.

By controlling the timing circuit 289, the second switch circuits 292 are sequentially switched, when a timing at which the electrodes 284 and 285 are scanned and a timing at which the counter 288 counts one count by one count are made to coincide with each other. Therefore, the count value of the counter 288 represents the ordinal number of one of the electrodes 284 and 285 connected to the differential amplifiers 281, 282 and 294 in the scanning time. The timing circuit 289 of course generates a switching control signal to be inputted to the second switch circuits 292 in synchronization with the clock signal inputted from the timing circuit 289 to the counter 288. It is easy for the timing circuit 289 to have a structure for generating such a control signal.

If the switch circuits 292 are thus controlled, consequently a value representing the ordinal numbers from the origin of the electrodes connected to the differential amplifiers in the electrode scanning time, i.e., the count value of the counter 288 is held in the D-flip-flop 287. The value held in the D-flip-flop 287 is a count value that the counter 288 has counted sequentially one count by one count in synchronization with the electrode scanning from a time when the counter 288 is reset to a time when a negative pulse is generated from the binarizing circuit 286.

In other words, the count value is a value which is obtained, as the result of searching by means of the switch circuits a position at which a peak of a single-humped output voltage corresponding to the coordinates of the position of the magnetic field generator 208 is located by shifting one by one the electrodes of the LCD panel 280 connected to the differential amplifiers in the scanning direction, by representing the position of the peak with the amount of electrodes counted by the coordinate transformation circuit 175-γ, and then held in the D-flip-flop 287. In other words, the result of detecting an x-coordinate value or a y-coordinate value of the position in which the magnetic field generator 208 is located is represented by the counted amount of electrodes.

As described above, the x-coordinate value and the y-coordinate value of the position in which the magnetic field generator 208 is located are held in the D-flip-flop 287 when the positive pulse is outputted from the binarizing circuit 286 in each detection period shown in FIG. 21. The data representing the coordinates of the position of the magnetic field generator 208 can be separately utilized as detected coordinate data. Though there is no specific limitation on application methods of the data, for example, an application similar to that described in the first embodiment can be achieved.

It is to be noted that each switch circuit may have a structure other than that of the third embodiment. Since the switch circuit can be easily constructed in a variety of ways, no particular description is provided therefor herein. What is essential is the assurance of the timing shown in FIG. 21 and so forth. Furthermore, there is no special reason for using a switch circuit, and therefore a circuit obtained by effectively combining three-state buffer circuit and other devices can be utilized.

Although the third embodiment has been described based on only 16 pixels shown concretely for simplicity, the LCD panel 280 of course practically includes a greater number of pixels. Furthermore, the same basic structure and basic operation as those of the third embodiment can be also achieved in an LCD panel having more pixels.

The third embodiment includes the function changeover control circuit 108 shown in FIG. 1. The function changeover control circuit 108 controls the image display drive circuit 101 and the coordinate detection circuit 105 to make the LCD panel 280 perform time-sharingly alternately image display and coordinate detection. The function changeover control circuit 108 shown in FIG. 1 outputs a control signal to the timing circuit 289 shown in FIG. 32. Then, the coordinate detection circuit 105 performs the aforementioned coordinate detection operation only in the coordinate detection period, and operates to disconnect the first switch circuits 291 and so forth from the LCD panel 280 so that the switch circuits and so forth do not hinder the image display operation in the image display period. In more detail, in the image display period, the first switch circuits 291a through l connect their contact points so as to electrically connect all the electrodes of the LCD panel 280 to the second switch circuits 292a through f. Then, the second switch circuits 292 are connected to contact points connected to nothing. Therefore, the differential amplifiers 281, 282 and 294 subsequent to the second switch circuits 292 are disconnected from the LCD panel 280. Consequently, the image display operation is not influenced by the coordinate detection circuit similar to the coordinate detection circuit 105 shown in FIG. 1 including the coordinate transformation circuit 175-γ. In other words, an operation similar to that of the conventional liquid crystal display device provided specially for image display can be performed in the image display period. The third embodiment includes the function changeover control circuit 108 and the image display drive circuit 101 shown in FIG. 1, and the operations of the circuits are the same as those of the first embodiment.

Fourth embodiment

Next, a fourth embodiment of the present invention will be described. The fourth embodiment is an embodiment in which a coordinate detection device of the present invention is applied to a TFT (thin film transistor) LCD panel. As described hereinbefore in the first and second embodiments, the coordinate input function and the image display function can be completely separated from each other when the present invention is applied to an LCD panel provided for image display. Then, as is apparent from the following description of the fourth embodiment, a coordinate input function can be incorporated to a TFT LCD panel by means of the technique of the present invention.

Figure 33:
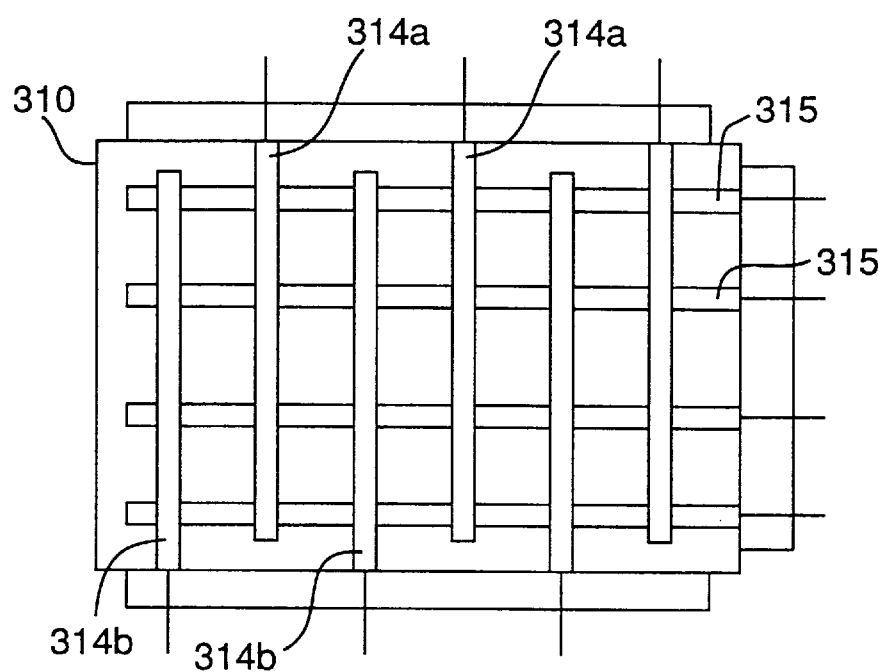
FIG. 33 is a view of a structure of a TFT LCD panel according to a fourth embodiment of the present invention.

FIG. 33 shows a structure of a TFT LCD panel 310. As shown in FIG. 33, the TFT LCD panel 310 normally has a structural feature that segment electrodes 314a and 314b are extending in a comb-like form alternately from the upper and lower ends of the TFT LCD panel 310. It is to be noted that the segment electrode and the common electrode are sometimes referred to as a source electrode and a gate electrode, respectively.

Figure 34:
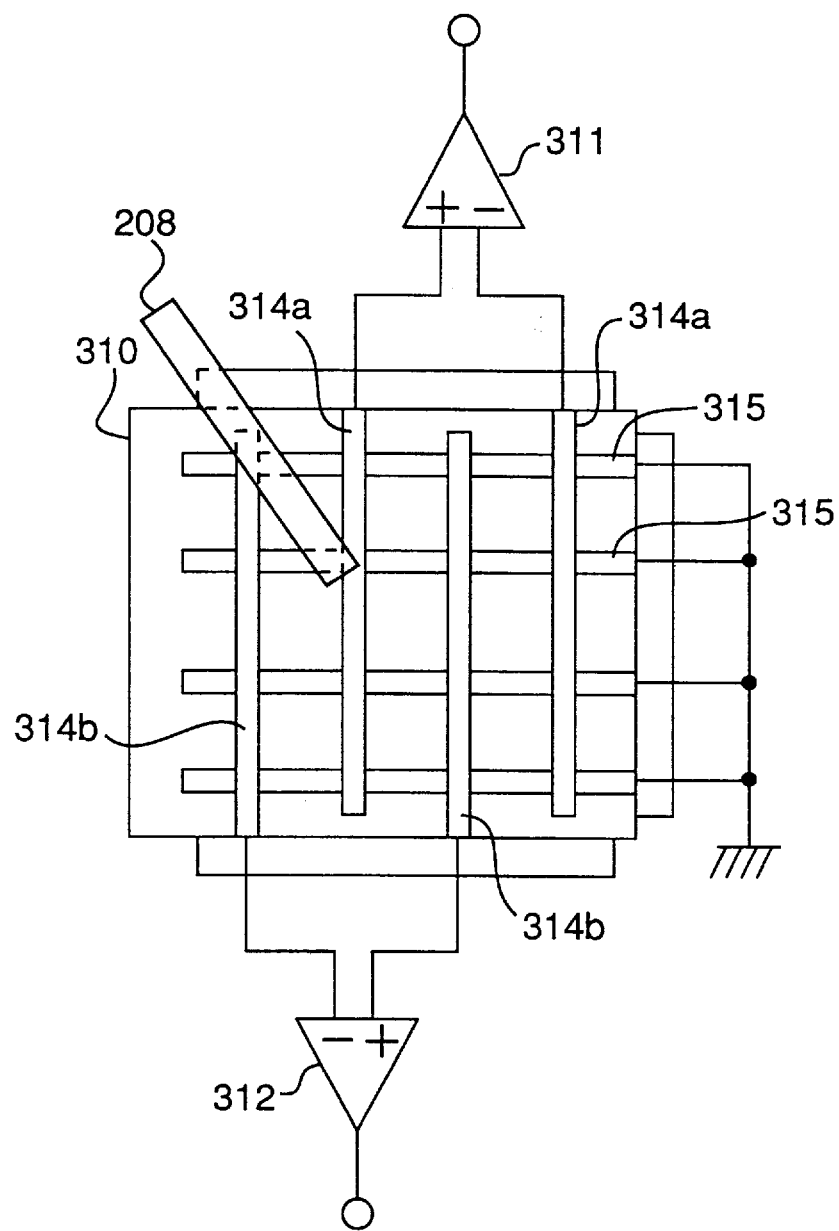
FIG. 34 is a view of a state wherein two differential amplifiers are connected to the LCD panel of the fourth embodiment.

As shown in FIG. 34, the fourth embodiment includes two pairs of the basic structure of the second embodiment shown in FIG. 22. That is, a signal can be taken out of the segment electrodes 314a and 314b owned by the TFT LCD panel 310 alternately from the upper and lower ends in a direction in which the electrodes are arranged. FIG. 34 shows a state in which common electrodes 315 of the TFT LCD panel 310 are connected to the ground. The fourth embodiment includes switch circuits similarly to the third embodiment shown in FIG. 32. The switch circuits switch an electrode connection state as shown in FIG. 34 so that it can connect the segment electrodes 314 to the ground and take out a signal from the common electrodes 315 to a differential amplifier (not shown).

Since the above-mentioned TFT LCD panel is already used widely, a number of reference documents can be easily obtained. For instance, it is appropriate to refer to page 104 of "Liquid crystals=Applications, compiled by Okano and kobayashi, published by Tofuukan, 7th issue, 1992" as a reference document. Since the TFT LCD panel has been conventionally used specially for image display, and therefore peripheral circuits for image display are well known.

In the TFT LCD panel 310, a display panel has a dimension of 17 cm (laterally)×14.3 cm (longitudinally), a pixel structure of 640 (for each of R, G, and B colors) pixels (laterally)×480 pixels (longitudinally) and a pixel dimension of 255 μm (laterally)×300 μm (longitudinally). Further, the TFT LCD panel 310 has two glass plates each having a thickness of 1 mm, a gap of about 7 μm between the glass plates, an electrode width of about 35 μm, and an electrode thickness of about 1 μm.

Figure 35:
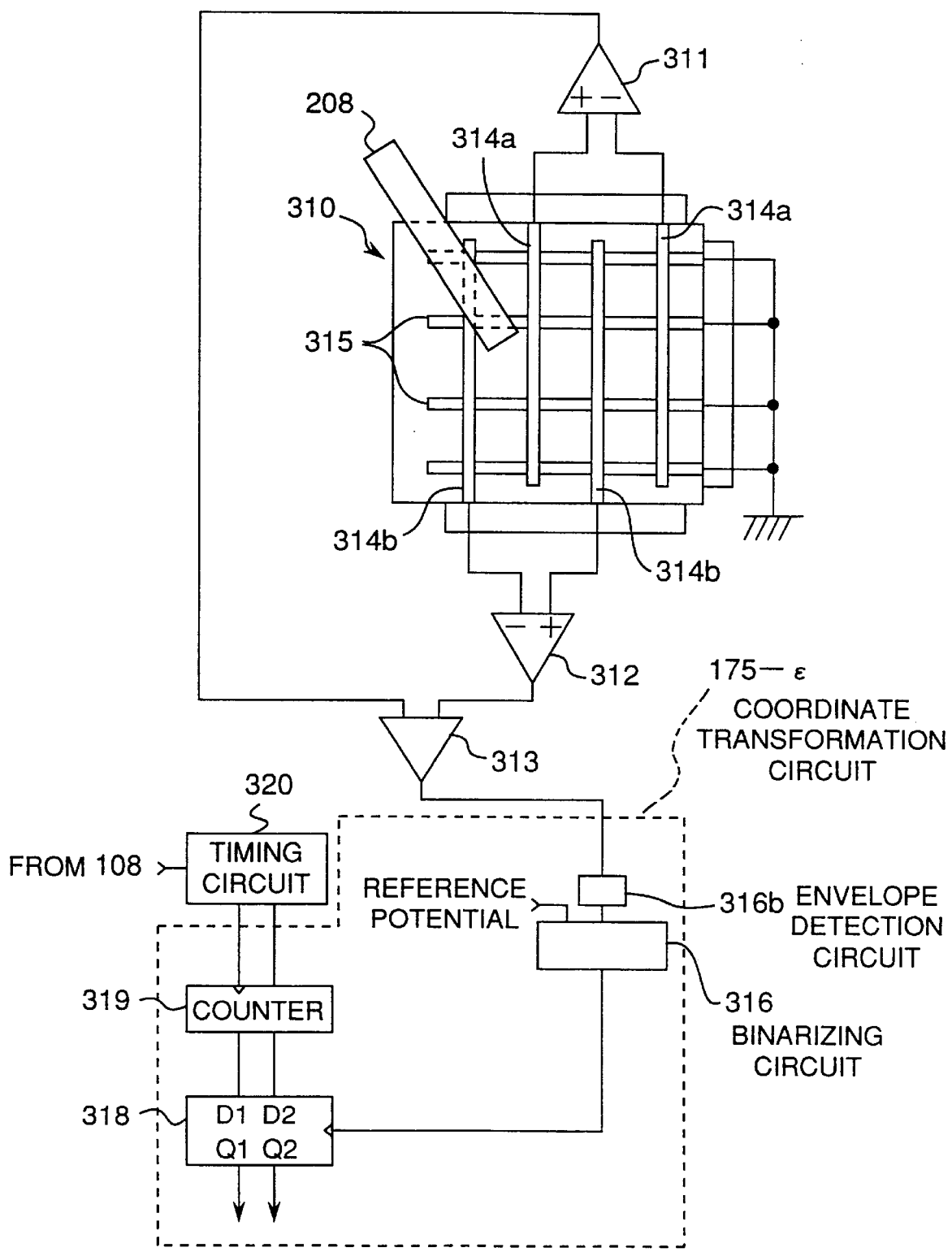
FIG. 35 is a view of a state wherein a coordinate transformation circuit is connected to the two differential amplifiers of the fourth embodiment.

FIG. 35 shows in detail the structure of the fourth embodiment. FIG. 35 corresponds to FIG. 32 used for the description of the third embodiment. In FIG. 35, a reference numeral 310 denotes a TFT LCD panel, and the TFT LCD panel 310 includes segment electrodes 314 and common electrodes 315. A pair of two segment electrodes 314a and 314a are arranged with interposition of one segment electrode 314b, and one end of the segment electrodes 314a is electrically opened in a position before a peripheral edge of the TFT LCD panel 310. Then the other end of the pair of the segment electrodes 314a is connected to an input terminal of a differential amplifier 311. On the other hand, a pair of two segment electrodes 314b and 314b are arranged with interposition of one segment electrode 314a, and the other end of the segment electrodes 314b is electrically opened in a position before a peripheral edge of the TFT LCD panel 310. Then the other end of the pair of the segment electrodes 314b is connected to an input terminal of a differential amplifier 312.

An output terminal of the differential amplifier 311 and an output terminal of the differential amplifier 312 are connected to input terminals of an adder 313. A reference numeral 208 denotes a magnetic field generator.

The fourth embodiment has a coordinate transformation circuit 175-∈ connected to an output terminal of the adder 313. The coordinate transformation circuit 175-∈ has the same structure as that of the coordinate transformation circuit of the third embodiment shown in FIG. 32, and includes an envelope detection circuit 316b, a binarizing circuit 316, a counter 319 and a D-flip-flop 318. The fourth embodiment further includes a timing circuit 320 similar to that of the third embodiment.

As described hereinafter, the fourth embodiment requires several switch circuits similarly to the third embodiment. The switch circuits have a function of switching a connection state of the common electrodes 315 and the segment electrodes 314 and a function of shifting the connection state of the electrodes one by one in a direction in which the electrodes are arranged as described in the third embodiment.

The fourth embodiment is based on the experiment shown in FIG. 13 similarly to the second embodiment and the third embodiment. By putting the magnetic field generator 208 close to the electrodes shown in FIG. 13, the experiment result shown in FIG. 17 was able to be obtained. It was confirmed that the magnetic field generator 208 was located near the electrodes of the LCD panel at which the peak of the output signal waveform is detected.

Therefore, the differential amplifier 311 or 312 outputs a signal in which the axis of abscissas of the experiment result of FIG. 17 is replaced by a time base similarly to the second embodiment. Therefore, similarly to the second embodiment, a timing (time) at which the peak of the output signal is located can be used as a signal representing the coordinates of the position in which the magnetic field generator 208 is located.

When the magnetic field generator 208 is located near the segment electrodes 314a, signals are outputted from both the differential amplifier 311 and the differential amplifier 312. Therefore, by adding together the outputs from the differential amplifiers 311 and 312, the position of the magnetic field generator 208 can be detected when the magnetic field generator 208 is located in whichever position of the entire surface of the LCD panel 310.

Figure 36:
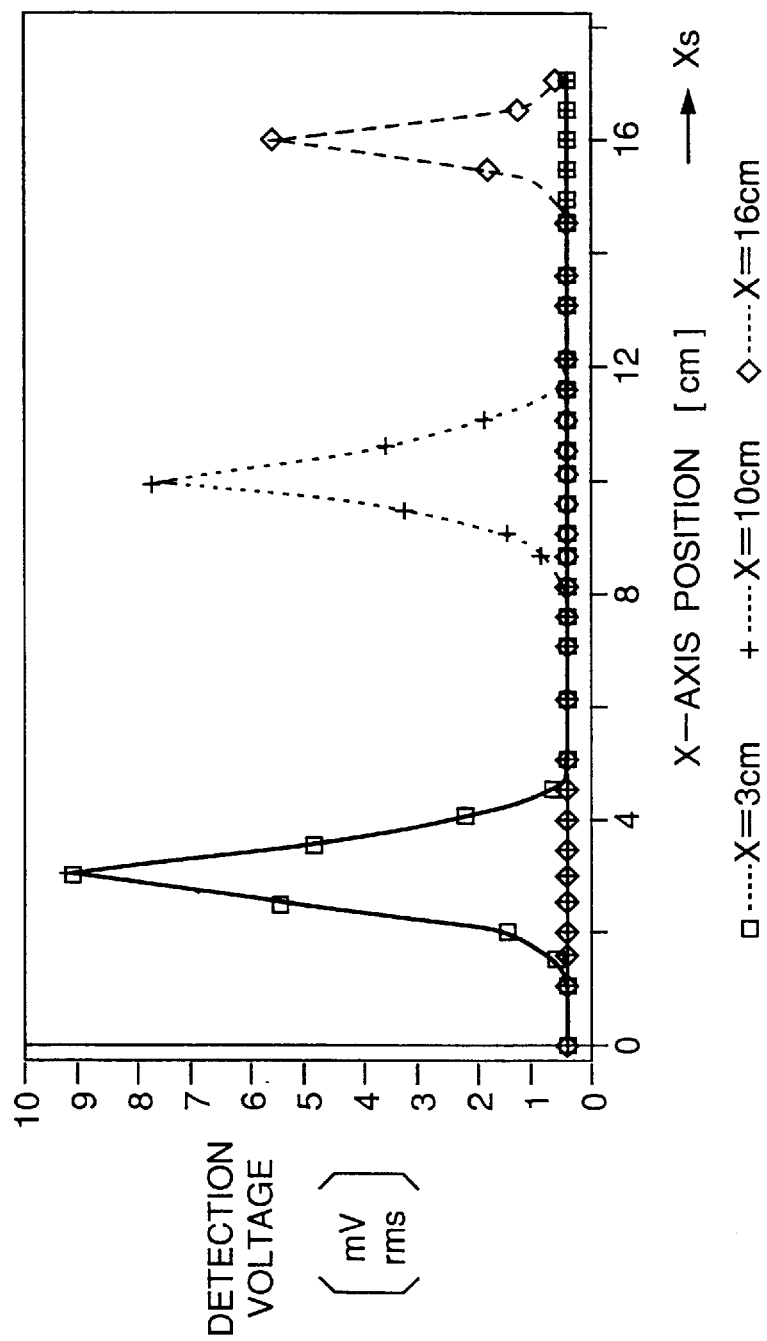
FIG. 36 is a graph showing a result of a coordinate detection experiment for the fourth embodiment.

FIG. 36 shows a result obtained by performing an experiment similar to that shown in FIG. 13 on the TFT LCD panel 310. The experiment result shown in FIG. 36 shows a tendency similar to that of the experiment result shown in FIG. 17. That is, as shown in FIG. 36, an AC output voltage of which envelope is a single-humped shape can be obtained from the differential amplifiers. Then, a maximum (peak) output voltage can be obtained from the segment electrodes 314a to which the magnetic field generator 208 is put close. In other words, the output voltage shown in FIG. 36 is related to the position of the magnetic field generator 208.

Next, an operation of the fourth embodiment will be described with reference to FIG. 37.

First, the differential amplifiers 311 and 312 output a detection voltage shown in FIG. 36 in correspondence with the position of the magnetic field generator 208. Then, the adder 313 adds together the outputs of the differential amplifiers 311 and 312, and outputs a single-humped output voltage waveform similar to that shown in FIG. 23A. Then, the envelope detection circuit 316b detects and extracts the envelope (refer to FIG. 23B) of the single-humped output voltage waveform. Then, the binarizing circuit 316 compares the detected envelope waveform with a specified reference voltage to binarize the same, and outputs a pulse signal similar to that shown in FIG. 23C. The position of the pulse signal corresponds to the peak of the signal of the experiment result shown in FIG. 36. That is, the position of the pulse signal represents the position of the magnetic field generator 208. An output signal of the binarizing circuit 316 is inputted to a clock terminal of the D-flip-flop 318 similarly to the second embodiment.

On the other hand, the timing circuit 320 outputs a signal representing a specified timing as a set signal to a load terminal of the counter 319, and the counter 319 starts counting according to a specified clock used as a time reference. A count value of the counter 319 is inputted to a D terminal of the D-flip-flop 318.

An output signal of the binarizing circuit 316 is inputted to a clock terminal of the D-flip-flop 318. Therefore, data supplied from the D-flip-flop 318 is held in the D-flip-flop 318 in accordance with the timing at which the pulse is outputted from the binarizing circuit 316.

Therefore, by making the timing circuit 320 perform a proper timing control as follows, the data held in the D-flip-flop 318 can represent the coordinates of the position of the magnetic field generator 208.

As to an operation of the timing circuit 320, there is required an operation of scanning the segment electrodes and the common electrodes by controlling the switch circuits similarly to the timing circuit 289 shown in FIGS. 31 and 32 of the third embodiment. The above-mentioned operation will be described below.

Figure 37:
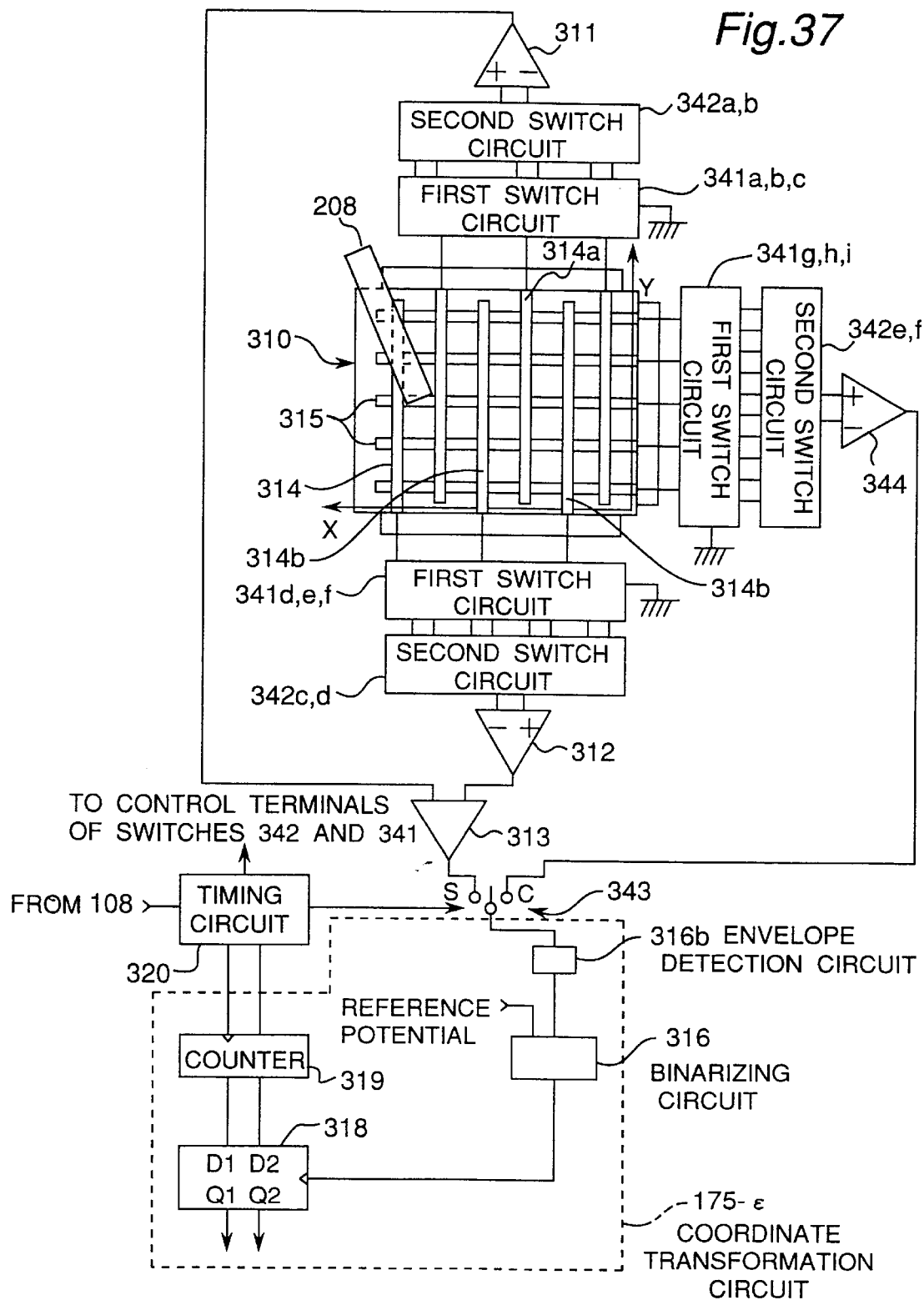
FIG. 37 is a view of a state wherein switch circuits are provided between the LCD panel and the differential amplifiers in the fourth embodiment.

As shown in FIG. 37, in the fourth embodiment, first switch circuits 341a, b and c and second switch circuits 342a and b are provided for the segment electrodes 314a, while first switch circuits 341d, e and f and second switch circuits 342c and d are provided for the segment electrode 314b. Further, first switch circuits 341g, h and i and second switch circuits 342e and f are provided for the common electrodes 315.

Though FIG. 37 does not show a detailed structure of the switch circuits provided in the fourth embodiment, the switch circuits have utterly the same structures as those of the switch circuits shown in FIG. 22 of the second embodiment except for a difference in amount of circuits.

In detail, the first switch circuits 341a, b and c and 341d, e and f shown in FIG. 37 have the same structures as those of the switch circuits 249a, b and c shown in FIG. 22. The first switch circuits 341g, h and i shown in FIG. 37 have the same structures as those of the switch circuits 249e, f and g shown in FIG. 22. The second switch circuits 342a and b and the second switch circuits 342c and d shown in FIG. 37 have the same structures as those of the switch circuits 250a and b shown in FIG. 22 except for a difference in amount of circuits. Further, the second switch circuits 342e and f shown in FIG. 37 have the same structures as those of the switch circuits 250c and d shown in FIG. 22 except for a difference in amount of circuits. Therefore, the operation of the switch circuits of the fourth embodiment can be easily understood with reference to FIG. 22 together with FIG. 37 while taking the above-mentioned correspondence into account.

Then, an operation of the timing circuit 320 will be described. The timing circuit 320 controls the operations of the first, second and third switch circuits 341, 342 and 343. Further, the timing circuit 320 generates a clock signal to be inputted to the counter 319. The timing circuit 320 controls the switch circuits 341, 342 and 343, and inputs the clock signal to the counter 319 so as to make the data held in the D-flip-flop 318 represent the coordinates of the magnetic field generator 208. The above-mentioned control operation is performed by the timing circuit 320 in a manner as shown in FIGS. 21 and 24 in the second embodiment.

In the fourth embodiment, with the common electrodes 315 all connected to the ground, a signal from the segment electrodes 314 can be detected by the differential amplifiers 311 and 312 in a manner as described in the aforementioned experiment. Also, with the segment electrodes 314 all connected to the ground, a signal can be detected from the common electrodes 315 by a differential amplifier 344. In the aforementioned experiment, a single-humped voltage waveform was able to be obtained in correspondence with the position of the magnetic field generator. The peak portion of the single-humped voltage waveform represented the coordinates of the position in which the magnetic field generator 208 is located. Therefore, by performing two times position coordinate detection from the segment electrode side and position coordinate detection from the common electrode side, the xy-coordinates of the magnetic field generator was able to be specified. Therefore, also in the fourth embodiment, it is proper to time-sharingly perform two times the coordinate detection of the position of the magnetic field generator 208 from the segment electrode 314 side and from the common electrode 315 side. Similarly to the experiment shown in FIG. 13, it is required to connect all the common electrodes 315 to the ground when the coordinates of the position are detected by scanning the segment electrodes 314. The converse can also hold. Therefore, the timing circuit 320 switchingly controls the switch circuits 341 and 342 so as to satisfy the aforementioned requirements. In detail, when the segment electrodes 314 are scanned to detect the x-coordinate value of the magnetic field generator 208, the first switch circuits 341a, b and c and 341d, e and f connected to the segment electrodes 314 are connected to the second switch circuits 342a and b and 342c and d in the next stage to transmit signals. Then, the first switch circuits 341g through i connected to the common electrodes 315 are connected to the ground. Consequently, the signals from the segment electrodes 314a and b are transmitted to the differential amplifiers 311 and 312 via the second switch circuits 342a and b and c and d. Then, signals amplified in the differential amplifiers 311 and 312 are further added together in the adder 313. Then, an output signal from the adder 313 is inputted to the coordinate transformation circuit 175-∈ via the third switch circuit 343 switched to the segment electrode side s, and then transmitted to the binarizing circuit 316 via the envelope detection circuit 316b. A subsequent signal flow and an operation of the coordinate transformation circuit 175-∈ are the same as explained in the second embodiment.

Conversely, when the coordinate detection operation is performed from the common electrode 315 side, the first switch circuits 341g through 341i connected to the common electrodes 315 are connected to the second switch circuits 342e and f in the next stage to transmit the signal. Meanwhile, the switch circuits 341a through f connected to the segment electrodes 314 are connected to the ground. The signal outputted from the second switch circuits 342e and 342f is transmitted via the differential amplifier 344 to the third switch circuit 343 which is switched to the common electrode side c. Then, the above-mentioned signal is transmitted to the envelope detection circuit 316b and the binarizing circuit 316 of the coordinate transformation circuit 175-∈. A subsequent signal flow and an operation of the coordinate transformation circuit 175-∈ are the same as those of the second embodiment described hereinbefore.

The second switch circuits 342a through 342f are switched so as to scan the segment electrodes 314 and the common electrodes 315, with which it can be detected how great value of voltage is outputted from each of the segment electrodes 314 and the common electrodes 315 by means of the differential amplifiers 311, 312 and 344. The second switch circuit 342 sequentially scans the electrodes from the one adjacent to the origin of the xy-coordinate axes shown in FIG. 37. In FIG. 37, the origin is located in a lower right position of the LCD panel 310.

When the states of the contact points of the switch circuits 341 and 342 shown in FIG. 37 are in the same connection states as those of the contact points of the first and second switch circuits shown in FIG. 22, a negative input terminal of the differential amplifier 311 is connected to the first segment electrode 314a from the origin, and a positive input terminal thereof is connected to the second segment electrode 314a from the origin. When the scanning proceeds by one step, the negative input terminal of the differential amplifier 311 is connected to the second segment electrode 314a from the origin, and the positive input terminal thereof is connected to the third segment electrode 314a from the origin.

Meanwhile, a positive input terminal of the differential amplifier 312 is connected to the first segment electrode 314b from the origin, and a negative input terminal thereof is connected to the second segment electrode 314b from the origin. When the scanning proceeds by one step, the positive input terminal of the differential amplifier 312 is connected to the second segment electrode 314b from the origin, and the negative input terminal thereof is connected to the third segment electrode 314b from the origin.

Thus a total of four electrodes comprised of a pair of two electrodes connected to the two differential amplifiers 311 and 312 constitute a pair, and a combination of the pair is shifted sequentially one electrode by one electrode in a direction in which the x-axis extends. Thus, combinations of the segment electrodes to be connected to the differential amplifiers 311 and 312 are sequentially scanned. Therefore, a waveform obtained by replacing the axis of abscissas of the single-humped waveform shown in FIG. 36 with a time base is outputted from the output terminal of the adder 313. In other words, the state of the experiment shown in FIG. 36 is reproduced.

In the fourth embodiment, the scanning operation is performed by pairing adjoining two segment electrodes 314 of the upper side and those of the lower side of the TFT LCD panel 310 in order to faithfully reproduce the experiment shown in FIG. 13. However, the aforementioned scanning may be performed by grouping, for example, adjoining or adjacent two or more electrodes as an electrode group and pairing adjoining two electrode groups.

The scanning operation is performed by outputting a switching control signal from the timing circuit 320 to control lines which are wired from the timing circuit 320 to the switch circuits 341, 342 and 343. The switching operation of the switch circuits is performed according to FIGS. 21 and 24.

The switch circuits for performing the switching operation by a signal inputted from the control lines wired from the timing circuit 320 can be easily implemented by, for example, a proper multiplexer device. Furthermore, the timing circuit 320 for outputting a control signal as described above to the control lines can be easily implemented by combining a counter device, a gate device, and so forth availed on the market.

Under the control of the timing circuit 320, a timing at which the second switch circuits 342 are sequentially switched to scan the electrodes 314 and 315 and a timing at which the counter 319 counts one count by one count are made to coincide with each other. Therefore, the count value of the counter 319 represents the ordinal number from the origin of each of the electrodes 314 and 315 connected to the differential amplifiers 311, 312 and 344 in the scanning time. The timing circuit 320 generates a switching control signal to be inputted to the second switch circuits 342 in synchronization with the clock signal inputted from the timing circuit 320 to the counter 319. It is easy for the timing circuit 320 to have a structure for generating such a control signal.

If the switch circuits 341, 342 and 343 are thus controlled, consequently a value representing the ordinal number from the origin of the electrode connected to the differential amplifiers in the electrode scanning time, i.e., the count value of the counter 319 is held. The value held in the D-flip-flop 318 is a count value that the counter 319 has counted sequentially one count by one count in synchronization with the electrode scanning from a time when the counter 319 is reset to a time when a negative pulse is generated from the binarizing circuit 316.

In other words, the count value is a value which is obtained, as the result of searching the peak of the single-humped output voltage corresponding to the coordinates of the position of the magnetic field generator 208 by shifting in a scanning direction one by one the electrodes of the LCD panel 310 which are connected to the differential amplifiers by the switch circuits, by representing the position of the peak with the amount of electrodes counted by the coordinate transformation circuit 175-∈, and then held in the D-flip-flop 318. In other words, the x-coordinate value or the y-coordinate value at the position in which the magnetic field generator 208 is located is represented by the counted amount of electrodes.

As described above, the x-coordinate value and the y-coordinate value of the position in which the magnetic field generator 208 is located are held in the D-flip-flop 318 when the positive pulse is outputted from the binarizing circuit 316 in each detection period shown in FIG. 21. Data representing the coordinates of the position of the magnetic field generator 208 can be separately utilized as detected coordinate data. Though there is no specific limitation on application methods of the data, for example, an application similar to that described in the first embodiment can be achieved.

It is to be noted that each switch circuit may have a structure other than that of the fourth embodiment. Since each switch circuit can be easily constructed in a variety of ways, no particular description is provided therefor herein. What is essential is the assurance of the timing shown in FIGS. 21 and 24 by means of the switch circuits. Furthermore, there is no special reason for using a switch circuit, and therefore a circuit provided by effectively combining a three-state buffer circuit and other devices can be utilized.

Although the fourth embodiment has been described based on an LCD panel having 30 pixels shown concretely for simplicity, the same basic structure and basic operation as those of the fourth embodiment can be also achieved in an LCD panel having more pixels.

When the TFT LCD panel 310 is used as in the fourth embodiment, connections of the segment electrodes and the common electrodes to the switch circuits are not limited to the connections shown in FIGS. 35 and 37. That is, the electrodes may be connected in a manner as shown in FIG. 22 where a duty ratio drive LCD panel is used. In the above-mentioned case, either one of the two differential amplifiers provided at the upper and lower sides shown in FIG. 35 is required to be provided. That is, in the present case, there is no need to provide two differential amplifiers at the upper and lower sides, and either one of the electrodes is required to be provided. Then, the segment electrodes are to be used every other one for coordinate detection.

The fourth embodiment includes the function changeover control circuit 108 shown in FIG. 1. The function changeover control circuit 108 controls the image display drive circuit 101 and the coordinate detection circuit 105 to make the LCD panel 310 perform time-sharingly alternately image display and coordinate detection. The function changeover control circuit 108 shown in FIG. 1 outputs a control signal to the timing circuit 320 shown in FIG. 37. Then, the coordinate detection circuit 105 performs the aforementioned coordinate detection operation only in the coordinate detection period, and operates to disconnect the first switch circuits 341 and so forth from the LCD panel 310 so that the switch circuits and so forth do not hinder the image display operation in the image display period. In more detail, in the image display period, the first switch circuits 341a through i connect contact points so that all the electrodes of the LCD panel 310 are connected to the second switch circuits 342. The second switch circuits 342 are connected to contact points connected to nothing. Therefore, the differential amplifiers 311, 312 and 344 subsequent to the second switch circuits 342 are electrically disconnected from the LCD panel 310. As a result, the image display operation is not influenced by the coordinate detection circuit similar to the coordinate detection circuit 105 shown in FIG. 1 including the coordinate transformation circuit 175-∈. In other words, an operation similar to that of the conventional liquid crystal display device provided specially for image display can be performed in the image display period. The operations of the function changeover control circuit 108 and the image display drive circuit 101 are the same as those of the first embodiment.

As described hereinbefore, the aforementioned second through fourth embodiments are designed to make respective LCD panels have a coordinate detection function by applying the experiment of FIG. 13 of the present invention to the LCD panels which operate according to different principles of image display operations.

Figure 38:
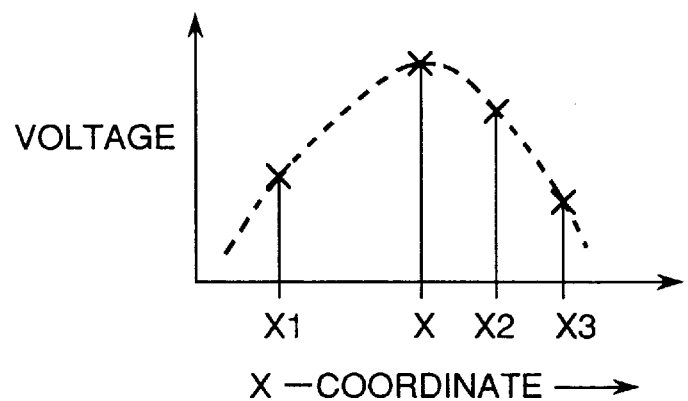
FIG. 38 is a graph for explaining an exemplified coordinate detection method which can be used commonly to the second through fourth embodiments of the present invention.

Furthermore, in the descriptions of the second through fourth embodiments, the position of the magnetic field detector is determined by means of a binarized pulse as shown in FIG. 23C. However, instead of using the binarized pulse signal, it is acceptable to detect three points which represent x-coordinate values of x1, x2 and x3 and voltages corresponding to the coordinate values in a manner as shown in FIG. 38, perform regression analysis or the like based on the three points to apply a polynomial, and detect the coordinates of an objective point x corresponding to the position in which the magnetic field generator is located. There can be considered a variety of other ways to derive the coordinates of the position of the magnetic field generator by detecting a voltage induced at the electrodes of the LCD panel by means of a magnetic field exerted from the magnetic field generator.

One of the segment electrode and the common electrode, being not used for coordinate detection, is connected to the ground in the second through fourth embodiments, however, the electrode may be opened as connected to nothing. In the above-mentioned case, the electrode tends to be influenced by external noises, and therefore it is required to separately take some countermeasure such as shield. Therefore, when the electrode is not connected to the ground, the electrode is preferably connected to a specified reference potential. It is of course acceptable to superimpose a sort of AC voltage or DC voltage via, for example, a capacitor on the electrode which is not used for coordinate detection.

Figure 39:
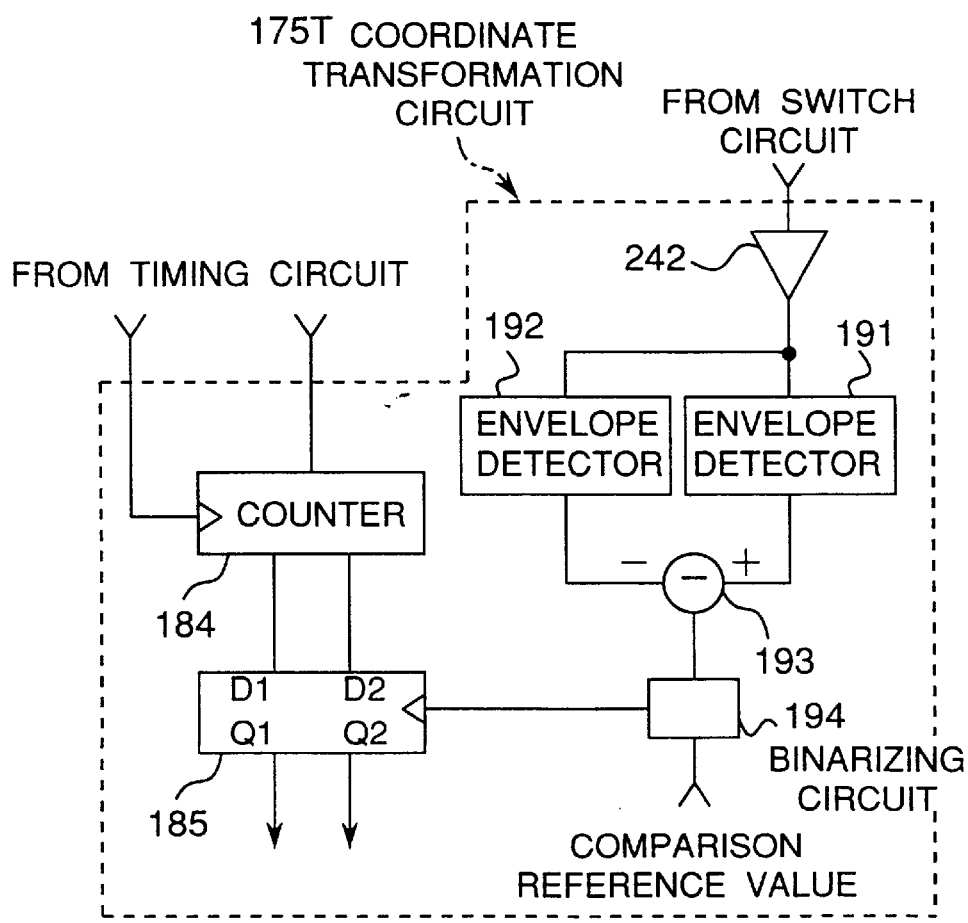
FIG. 39 is a circuit diagram of a modification of the coordinate transformation circuit of the first embodiment.

Although the coordinate transformation circuit 175-α shown in FIG. 19 is used in the first embodiment described at the beginning, a coordinate transformation circuit 175T as shown in FIG. 39 may be used instead of the coordinate transformation circuit 175-α shown in FIG. 19. The coordinate transformation circuit 175T includes a parallel connection composed of an envelope detector 191 having a great time constant and an envelope detector 192 having a time constant smaller than that of the envelope detector 191. The envelope detectors 191 and 192 connected in parallel with each other are connected between an output of the differential amplifier 242 and a differential circuit 193. An output of the differential circuit 193 is connected to a binarizing circuit 194. Further, the output of the binarizing circuit 194 is connected to a clock terminal of the D-flip-flop 185. The D-flip-flop 185 is connected to the counter 184, and the counter 184 is connected to the timing circuit 174. The connection of the D-flip-flop 185, the counter 184, and the timing control circuit 174 is the same as that of the coordinate transformation circuit 175-α shown in FIG. 19.

Figure 40A:
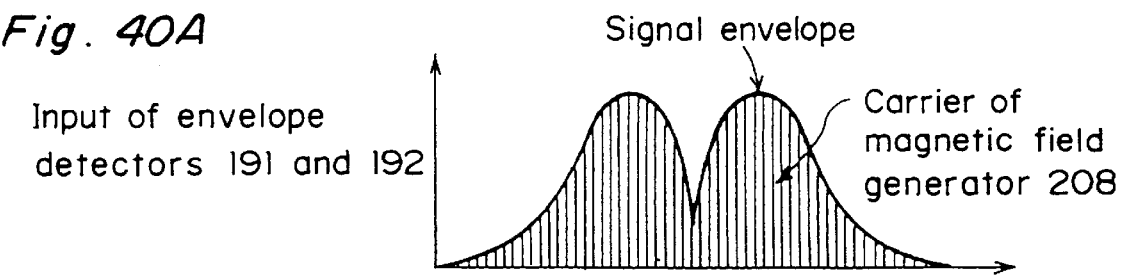
FIGS. 40A, 40B, 40C, 40D and 40E are charts of signal waveforms at several points of a coordinate transformation circuit of the modification.
Figure 40B:
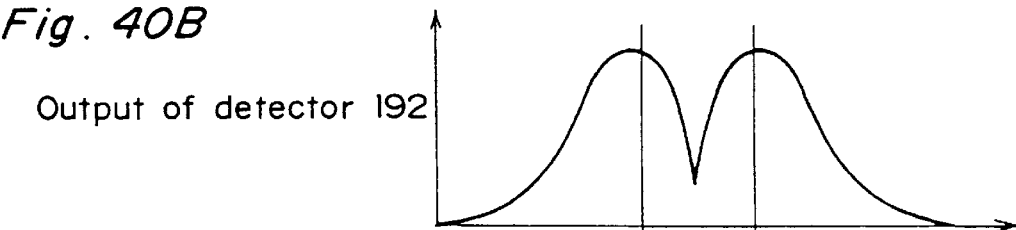
Figure 40C:

In the coordinate transformation circuit 175T, a signal which has passed through the switch circuits 170, 171 and 172 shown in FIG. 19 is inputted to the differential amplifier 242 and amplified to a specified level. Then, the amplified signal is inputted to the envelope detector 191 having a great time constant and the envelope detector 192 having a small time constant. A signal waveform inputted to the envelope detectors 191 and 192 is shown in FIG. 40A. Further, the envelope detector 191 having a great time constant outputs a signal wherein the bottom of the double-humped output is shallowed as shown in FIG. 40C. On the other hand, as shown in FIG. 40B, the envelope detector 192 having a small time constant outputs a signal having the envelope of the signal shown in FIG. 40A.

Figure 40D:
Figure 40E:
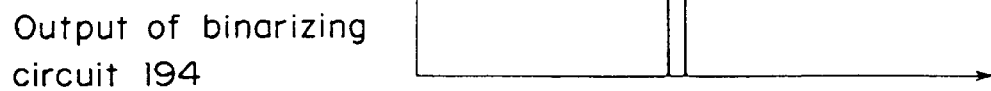

Then, the differential circuit 193 takes a difference between the outputs of the two detectors 191 and 192. An output waveform of the differential circuit 193 is shown in FIG. 40D. The output signal shown in FIG. 40D is inputted to the binarizing circuit 194, and compared with a specified reference voltage in the binarizing circuit so as to be binarized. An output waveform of the binarizing circuit 194 is shown in FIG. 40E. An output signal of the binarizing circuit 194 is a pulse signal.

By shaping the pulse signal by means of the T-flip-flop 181, the delay circuit 182, and the NAND gate 183 in the same manner as described hereinbefore, a pulse signal which is synchronized with the position of the bottom of the signal waveform of the experiment result shown in FIG. 17 can be obtained.

Therefore, the coordinates of the position in which the magnetic field generator 208 is located can be obtained by means of the counter 184 and the D-flip-flop 185 in the same manner as described hereinbefore (first embodiment). Although the difference between the envelope detectors 191 and 192 is calculated, the bottom portion where a great difference takes place can be also detected by subjecting the outputs of the detectors 191 and 192 to a product calculation process.

Although the coordinate transformation circuit 175T extracts the envelope of the signal by subjecting the output of the differential amplifier 242 to an envelope detection process by means of an envelope detector, a means for detecting an effective value may be used.

The two structural examples 175 and 175T of the aforementioned coordinate detection circuit are to detect the bottom portion of the signal waveform by paying attention to a change in amplitude. However, there is a variety of structural examples for implementing such a coordinate detection circuit other than the aforementioned two structural examples.

Fifth embodiment

Figure 41:
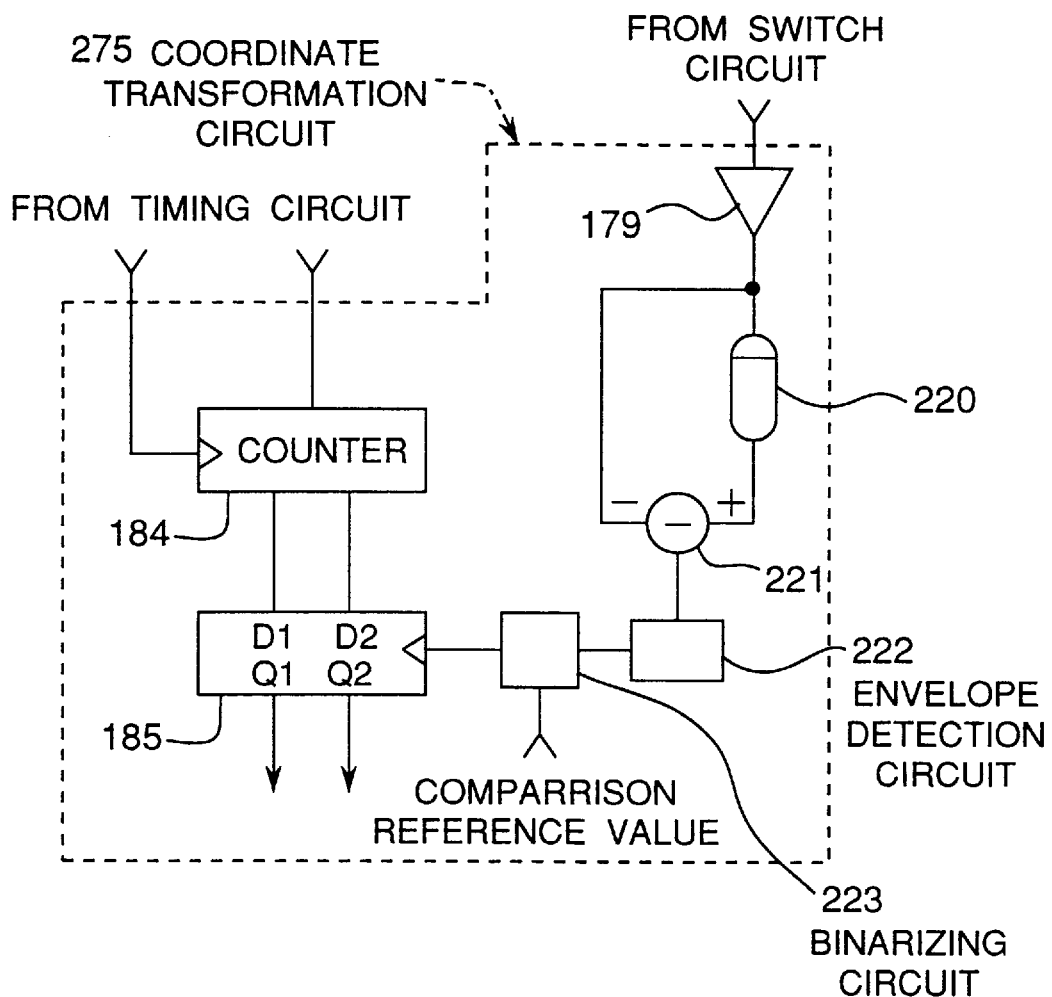
FIG. 41 is a circuit diagram of a coordinate transformation circuit provided for a fifth embodiment of the present invention.

Next, a fifth embodiment of the present invention will be described. The fifth embodiment has a feature that it includes a coordinate transformation circuit 275 as shown in FIG. 41 having a principle of operation of coordinate transformation fundamentally different from that of the coordinate transformation circuit 175-α owned by the first embodiment shown in FIG. 19 in place of the coordinate transformation circuit 175-α. The other components except for the coordinate transformation circuit 275 has the same structure as that of the first embodiment. Therefore, the fifth embodiment includes a function changeover control circuit 108 and an image display drive circuit 101 having the same structures as those of the first embodiment.

The fifth embodiment has a feature common to that of the first embodiment in a point as follows. That is, a double-humped signal waveform in which the axis of abscissas of the experiment result shown in FIG. 8 is replaced by a time base is inputted to the coordinate transformation circuit 275, and the coordinate transformation circuit 275 detects a timing at the bottom of the double-humped output signal so as to detect the coordinates of the position of the magnetic field generator 208.

Furthermore, the fifth embodiment duffers from the first embodiment in a point as follows. That is, the coordinate transformation circuit 275 having a structure different from that of the first embodiment is provided, and the coordinate transformation circuit 275 detects the bottom portion of the double-humped output signal not by the amplitude of the signal but by the phase of the signal. In other words, the coordinate transformation circuit 275 provided in the fifth embodiment detects the bottom portion of the double-humped output signal by taking advantage of a phase inversion characteristic that is characterized by a phase difference of 180° between a portion of the signal before the bottom portion of the double-humped output and a portion of the signal behind the bottom portion. As described above, the point of the fifth embodiment is to detect the timing of the bottom portion by phase paying attention to the fact that the phase of the signal is inverted between the portions before and behind the bottom portion.

FIG. 41 shows the structure of the coordinate transformation circuit 275 provided in the fifth embodiment. The coordinate transformation circuit 275 includes an amplifier 179 of which input terminal is connected to the switch circuits as the switch circuits of the first embodiment, a delay circuit 220 connected to an output terminal of the amplifier 179, and a subtracter 221 of which positive input terminal + is connected to the output terminal of the delay circuit 220. A negative input terminal − of the subtracter 221 is connected to the output terminal of the amplifier 179. An output terminal of the subtracter 221 is connected to an envelope detector 222. An output terminal of the envelope detector 222 is connected to a binarizing circuit 223. An output terminal of the binarizing circuit 223 is connected to a clock terminal of the D-flip-flop 185. To an input terminal of the D-flip-flop 185 is connected an output terminal of the counter 184. Though not shown, the counter 184 is connected to a timing circuit having the same structure as that of the timing control circuit 174 of the first embodiment.

Figure 42A:
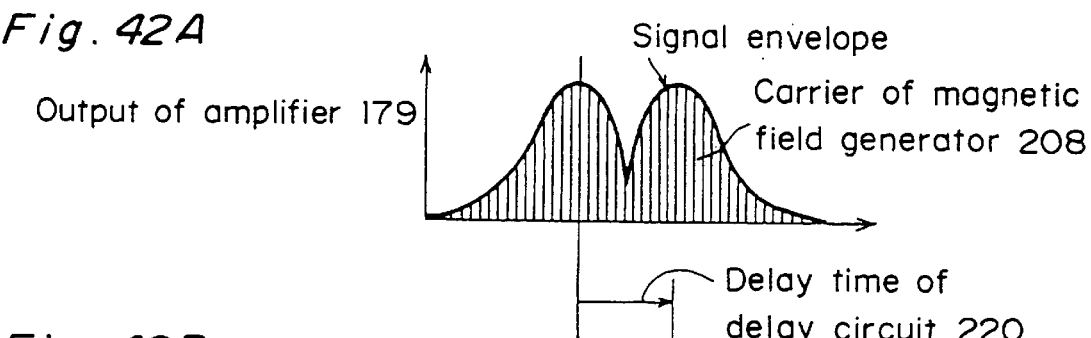
FIGS. 42A, 42B, 42C, 42D and 42E are charts of signal waveforms at several points of the coordinate transformation circuit.
Figure 42B:
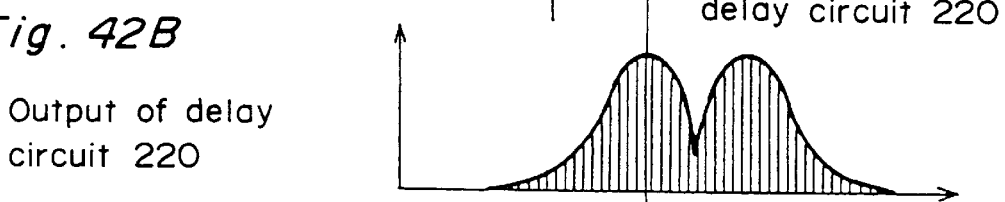

In the fifth embodiment having the above-mentioned structure, a signal which is obtained by scanning the segment electrodes or the common electrodes of the display panel and transmitted to the amplifier 179 similarly to the first embodiment is amplified in the amplifier 179 and then inputted to the delay circuit 220. An output signal waveform of the amplifier 179 is shown in FIG. 42A. In FIGS. 42A through 42E, the axis of abscissas represents time, while the axis of ordinates represents amplitude. As shown in FIG. 42A, the output signal of the amplifier 179 has a double-humped signal waveform similarly to the first embodiment. Further, as shown in FIG. 42B, the output waveform of the delay circuit 220 is a waveform obtained by delaying the waveform shown in FIG. 42A by a specified time. The delay time is related to the switching speed of the switch circuits. The delay time is preferably equal to or shorter than a time interval between the two peaks shown in FIG. 42A. Therefore, the slower the switching speed of the switch circuits is, the longer the delay time is to be set. Therefore, the switching speed must be determined taking the practicability of the delay circuit 220 into account. FIGS. 42A through 42E show an example wherein the delay time of the delay circuit 220 is equal to the time interval between the two peaks.

Figure 42C:
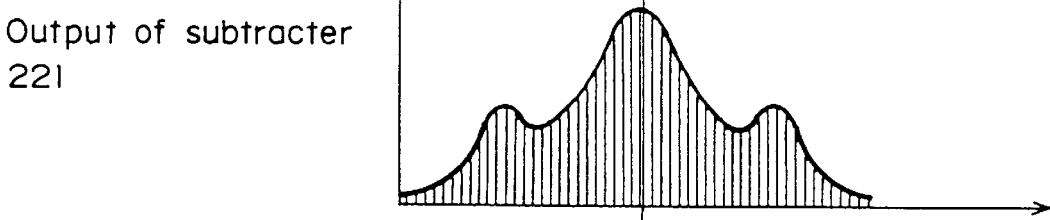

Then, the output signal of the amplifier 179 having the double-humped waveform shown in FIG. 42A and the output signal of the delay circuit 220 having the double-humped waveform shown in FIG. 42B are inputted to the subtracter 221 to be subjected to subtraction process therein. The phase of the signal is inverted by 180° between the portions before and behind the bottom of the double-humped input signal. Therefore, when signals are simultaneously inputted to the two input terminals of the subtracter 221, the signals themselves are indeed subjected to the subtraction process, however, the signal waveform, i.e., the amplitudes of the signals are added together in a manner as shown in FIG. 42C. Therefore, an output waveform of the subtracter 221 becomes a waveform having a highest peak and two low peaks arranged with interposition of the highest peaks as shown in FIG. 42C.

Figure 42D:
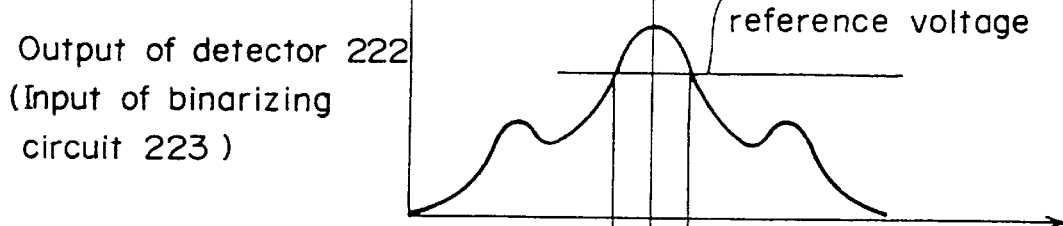
Figure 42E:
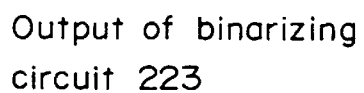
Figure 43:
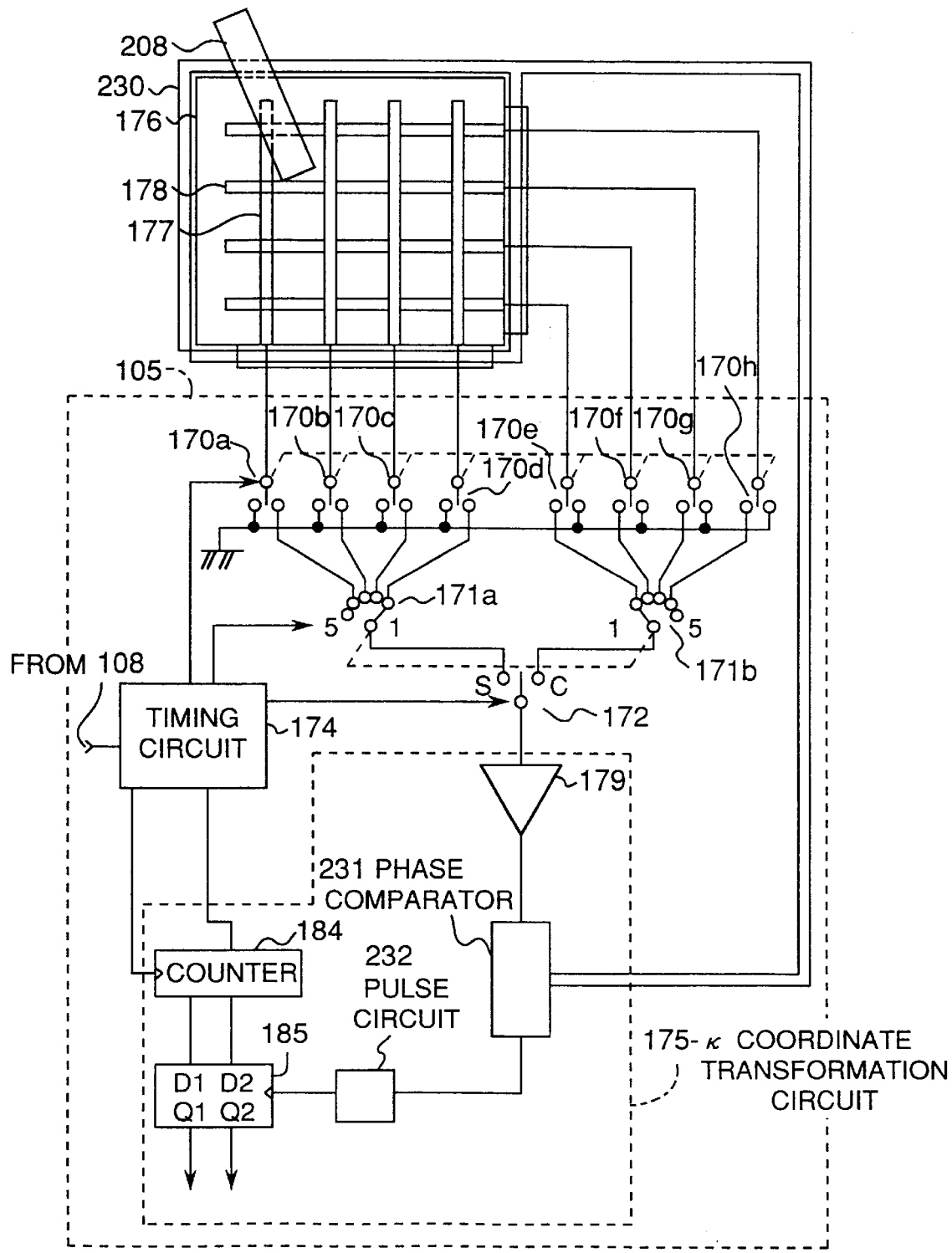
FIG. 43 is a view of a modification of the coordinate transformation circuit of the fifth embodiment.

Then, the output signal of the subtracter 221 is inputted to the envelope detector 222 in which the envelope of the signal is extracted. The envelope is shown in FIG. 42D. Further, the signal having the above-mentioned envelope is inputted to the binarizing circuit 223 which compares the signal with a reference voltage for comparison to make the portion having an amplitude greater than the reference voltage have an amplitude of zero and make the portion having an amplitude smaller than the reference voltage have a specified amplitude, thereby binarizing the signal in a manner as shown in FIG. 42E. The binarized signal is a pulse signal having a negative polarity, or a pulse signal having a negative polarity which substantially falls at the time when the bottom of the double-humped signal exists.

When there is a delay time longer than the delay time shown in FIGS. 42A and 42B and the output waveform of the amplifier 179 and the output waveform of the delay circuit 220 do not timely overlap each other, the signal inputted to the subtracter 221 is outputted from the subtracter 221 while satisfying the aforementioned phase relationship. Exchange of inputs of the subtracter 221 can be of course properly performed based on a logic.

It is to be noted that, as shown in FIG. 42E, the output pulse of the binarizing circuit 223 has a time delay approximately corresponding to the delay time of the delay circuit 220 relative to the bottom portion of the output signal of the amplifier 179. The above-mentioned phenomenon possibly causes an error in coordinate detection. However, since the delay time of the delay circuit 220 is always constant. Therefore, by preparatorily measuring a value of deviation of the aforementioned delay time in coordinates and subtracting the value of deviation from the coordinate data held in the D-flip-flop (latch circuit) 185, the possible generation of an error in coordinate detection can be prevented.

The fifth embodiment, which performs a coordinate detection operation with regard to the change in phase of the signal, has an inherent feature that it is less influenced by noises which enter into the detected signal and cause a change in amplitude of the signal.

Operations of the fifth embodiment other than that described above are utterly the same as those of the first embodiment of the present invention, and therefore no description is provided therefor.

Although the delay device is used in the fifth embodiment, a phase detector comprised of a phase comparator 231 having a reference phase extraction coil 230 may be used instead. The reference phase extraction coil 230 is arranged so that the coil surrounds the LCD panel 176 in the vicinity of the LCD panel 176 and is always coupled with an AC magnetic field generated by the magnetic field generator 208. The phase comparator 231 picks up the above-mentioned magnetic field by putting the reference phase extraction coil 230 into inductive coupling with the magnetic field generated from the magnetic field generator 208. The reference phase extraction coil 230 uses the phase of the magnetic field as a reference phase which serves as a reference in phase detection. Then, the phase comparator 231 subjects the signal inputted to the coordinate transformation circuit 175 to a phase detection process by means of the reference phase so as to capture a phase change point. In the present case, the operations of the function changeover control circuit 108 and the image display drive circuit 101 are the same as those of the first embodiment.

Figure 44A:
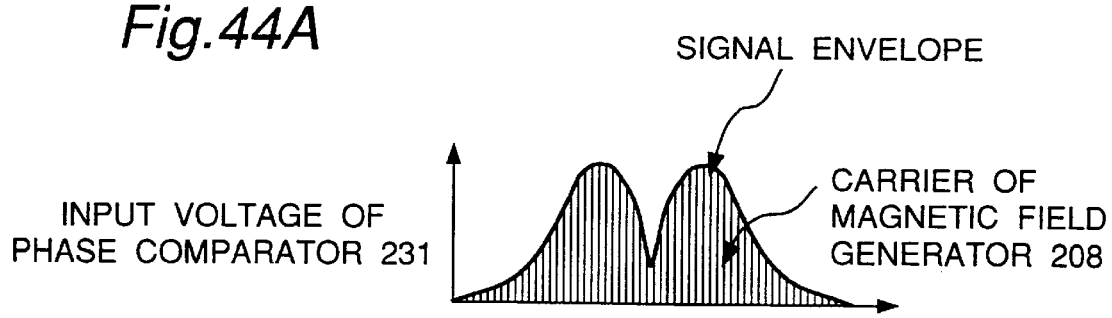
FIGS. 44A, 44B, 44C and 44D are charts of signal waveforms at several points of a coordinate transformation circuit of the modification.
Figure 44B:
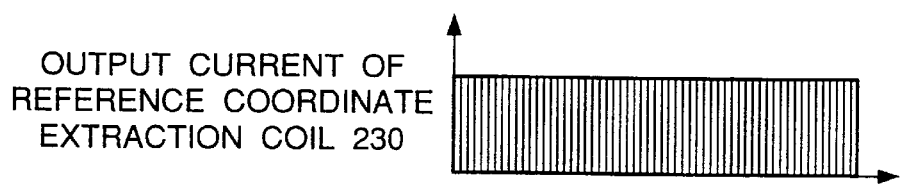
Figure 44C:
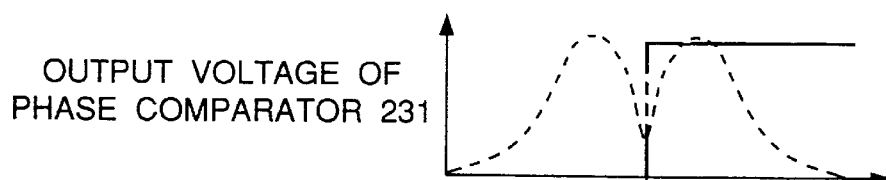
Figure 44D:
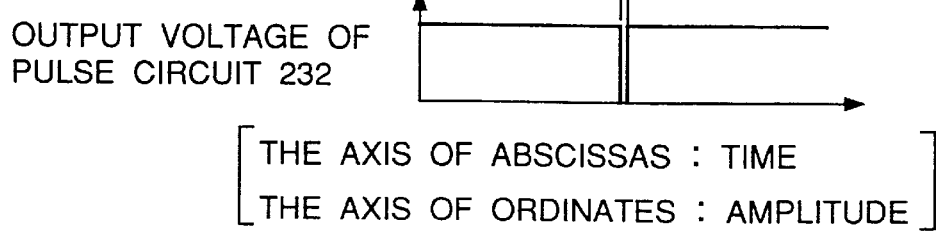

An operation of a coordinate transformation circuit 175-κ of the above-mentioned structure will be described. The reference phase extraction coil 230 for extracting the aforementioned reference phase signal generates a current at a frequency of the AC magnetic field as shown in FIG. 44B when the magnetic field generator 208 is put close to the LCD panel 176. The current at the frequency of the AC magnetic field is inputted to the phase comparator 231. Then, the phase comparator 231 detects the phase change point of the signal properly amplified in the amplifier 179. In more detail, the phase comparator 231 compares the phase (reference phase) of the current from the reference phase extraction coil 230 with the phase of the signal from the amplifier 179, and outputs a voltage (shown in FIG. 44C) proportional to the phase difference between the two. Between the portions before and behind the bottom portion of the double-humped input signal from the amplifier 179, the signal phase is inverted by 180°, and therefore the output voltage changes greatly at the bottom portion. FIGS. 44A through 44D show an example wherein the double-humped signal shown in FIG. 44A is approximately in phase with the signal extracted from the reference phase extraction coil 230 on the left side of the bottom thereof, and has a phase difference of 180° with respect to the latter signal on the right side of the bottom thereof.

Then, the output signal of the phase comparator 231 is inputted to a pulse circuit 232 in which the signal is converted into a pulse. Then, the pulse circuit 232 outputs a negative pulse signal at the bottom portion of the double-humped output similar to that described with reference to FIG. 22. The pulse circuit 232 can be implemented by a delay circuit 182 and a NAND circuit 183 having a structure similar to that shown in FIG. 19. Operations other than the above-mentioned operation are utterly the same as those of the fifth embodiment.

Sixth embodiment

Figure 45:
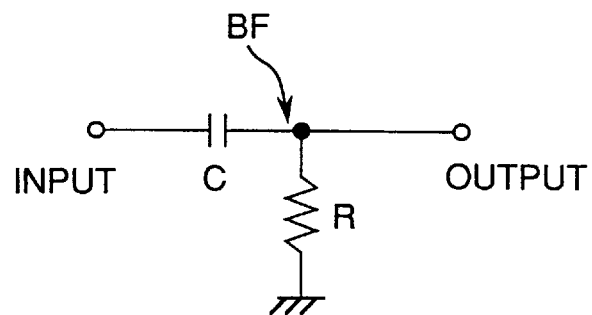
FIG. 45 is a circuit diagram of a band-pass filter characteristic of a sixth embodiment of the present invention.

Next, a sixth embodiment of the present invention will be described. The sixth embodiment differs from the first, second, third and fourth embodiments only in that a band-pass filter BF as shown in FIG. 45 is connected to the input terminal of the coordinate detection circuit 105 shown in FIG. 1.

The band-pass filter BF is practically required to be connected to the input terminal of the differential amplifier 242 and the input side of the switch circuits 249a through 249h in the circuit of the second embodiment shown in FIG. 22. In the circuit of the third embodiment shown in FIG. 32, the band-pass filter BF is required to be connected to the input terminals of the differential amplifiers 281, 282 and 294 and the input side of the switch circuits 291a through 291l. In the circuit of the fourth embodiment shown in FIG. 37, the band-pass filter BF is required to be connected to the input terminals of the differential amplifiers 311, 312 and 344 and the input side of the switch circuits 341a through 341i. The band-pass filter BF is practically required to be connected to the input terminal of the amplifier 179 and the input side of the switch circuits 170, 171 and 172 in the circuit of the first embodiment shown in FIG. 19.

The band-pass filter BF includes a capacitor C and a resistor R connected across an output side terminal of the capacitor C and the ground. The band-pass filter BF selects only a frequency component at and around the frequency of the AC magnetic field generated by the magnetic field generator 208 and allows it to pass. Therefore, by virtue of the existence of the band-pass filter BF, only a signal frequency effective for coordinate detection can be satisfactorily passed and unnecessary noises such as hum noises belonging to a cut-off frequency range of the filter BF can be effectively reduced.

Figure 46:
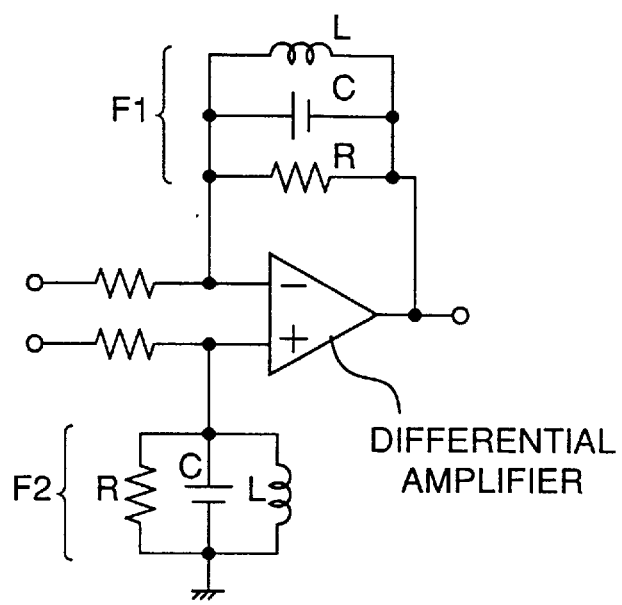
FIG. 46 is a circuit diagram of a state wherein a feedback circuit F1 is connected to a differential amplifier.

In the first through fifth embodiments, the frequency characteristic can be optimized by connecting a feedback circuit F1 as shown in FIG. 46 across the output terminal and the inverted input terminal of each differential amplifier. The feedback circuit F1 is constituted by a parallel circuit comprised of an inductance L, a capacitor C and a resistor R. The feedback device includes an LC resonance circuit which resonates at the frequency of the AC magnetic field. In the parallel resonance circuit, the impedance is maximized at and around the resonance point, and therefore the feedback ratio is minimized. Consequently, a great gain can be obtained only at and around the resonance frequency. In other words, such a device operates as a band-pass filter. It is to be noted that the resistor R is used for adjusting the maximum gain. In the circuit shown in FIG. 46, a parallel resonance circuit F2 comprised of a resistor R, a capacitor C and an inductance L is connected across the non-inverted terminal of each differential amplifier and the ground. The circuit F2 also resonates at the frequency of the AC magnetic field, and consequently the impedance is maximized at and around the resonance frequency.

Although envelope detectors 186, 248b, 246b, . . . are used in the embodiments described hereinbefore, the envelope detectors may be each replaced by a synchronous detector. If the above-mentioned arrangement is adopted, through a slightly complicated circuit configuration results, the envelope of the signal can be extracted more correctly than the envelope detector, which produces an effect of improving the pen coordinate detection accuracy.

Figure 47:
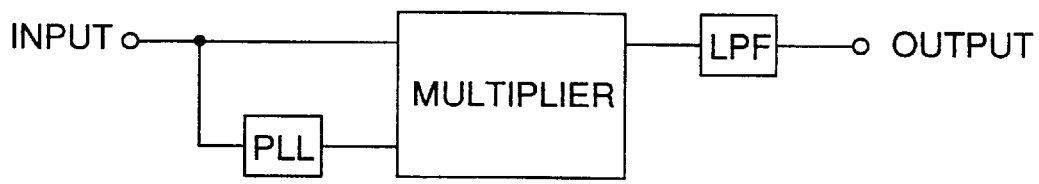
FIG. 47 is a block diagram of a synchronous detector which can substitute for an envelope detector.
Figure 48:
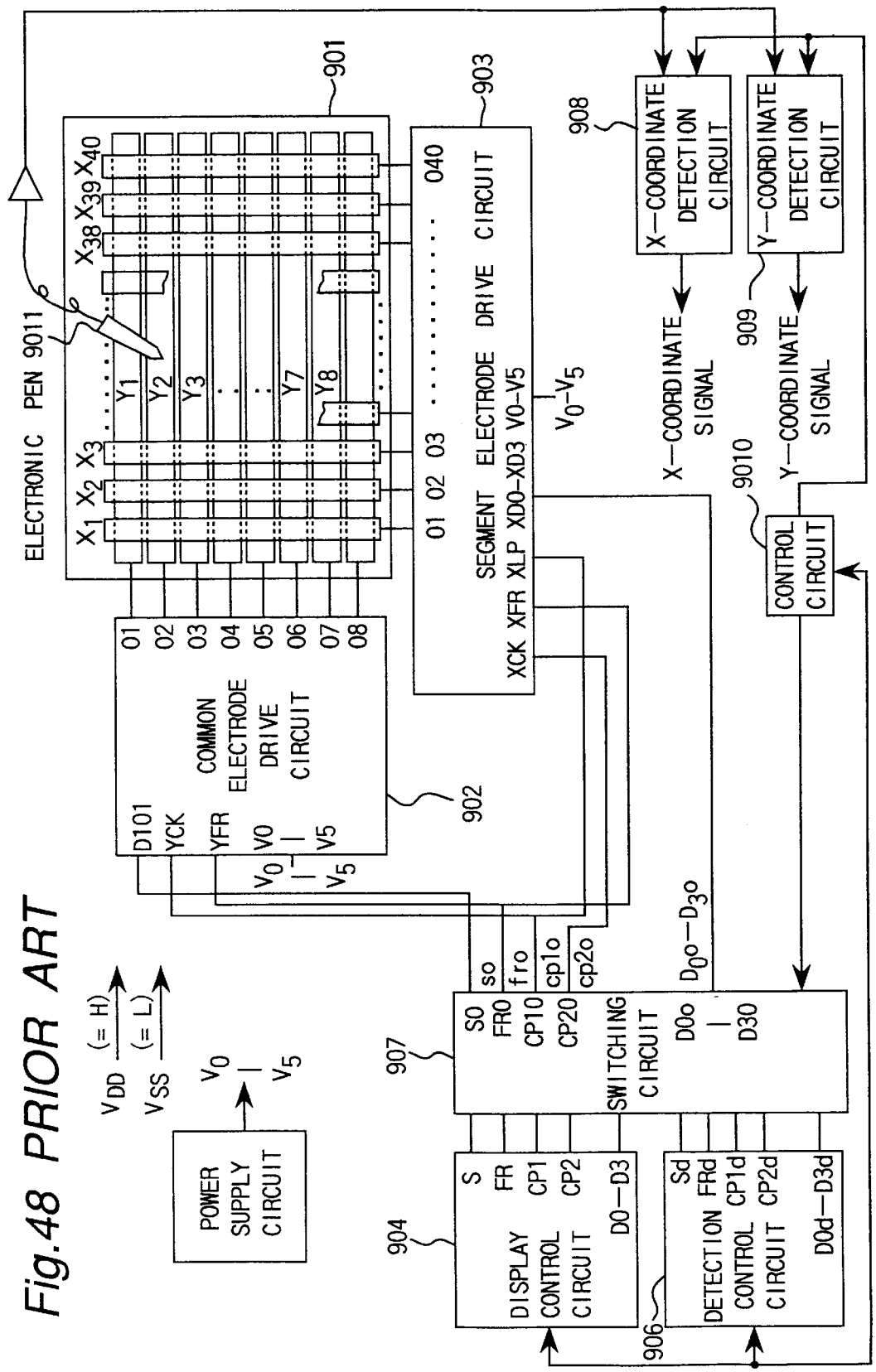
FIG. 48 is a block diagram of a structure of a first prior art.
Figure 49:
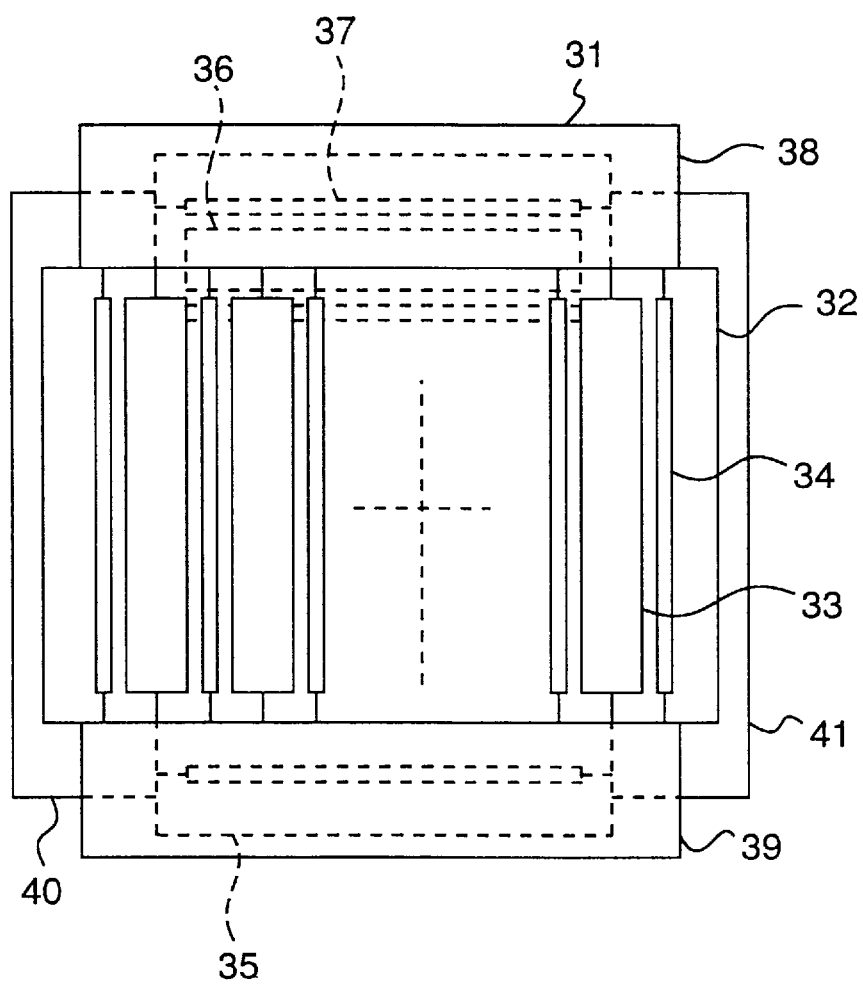
FIG. 49 is an explanatory view of an LCD panel of a second prior art.
Figure 50:
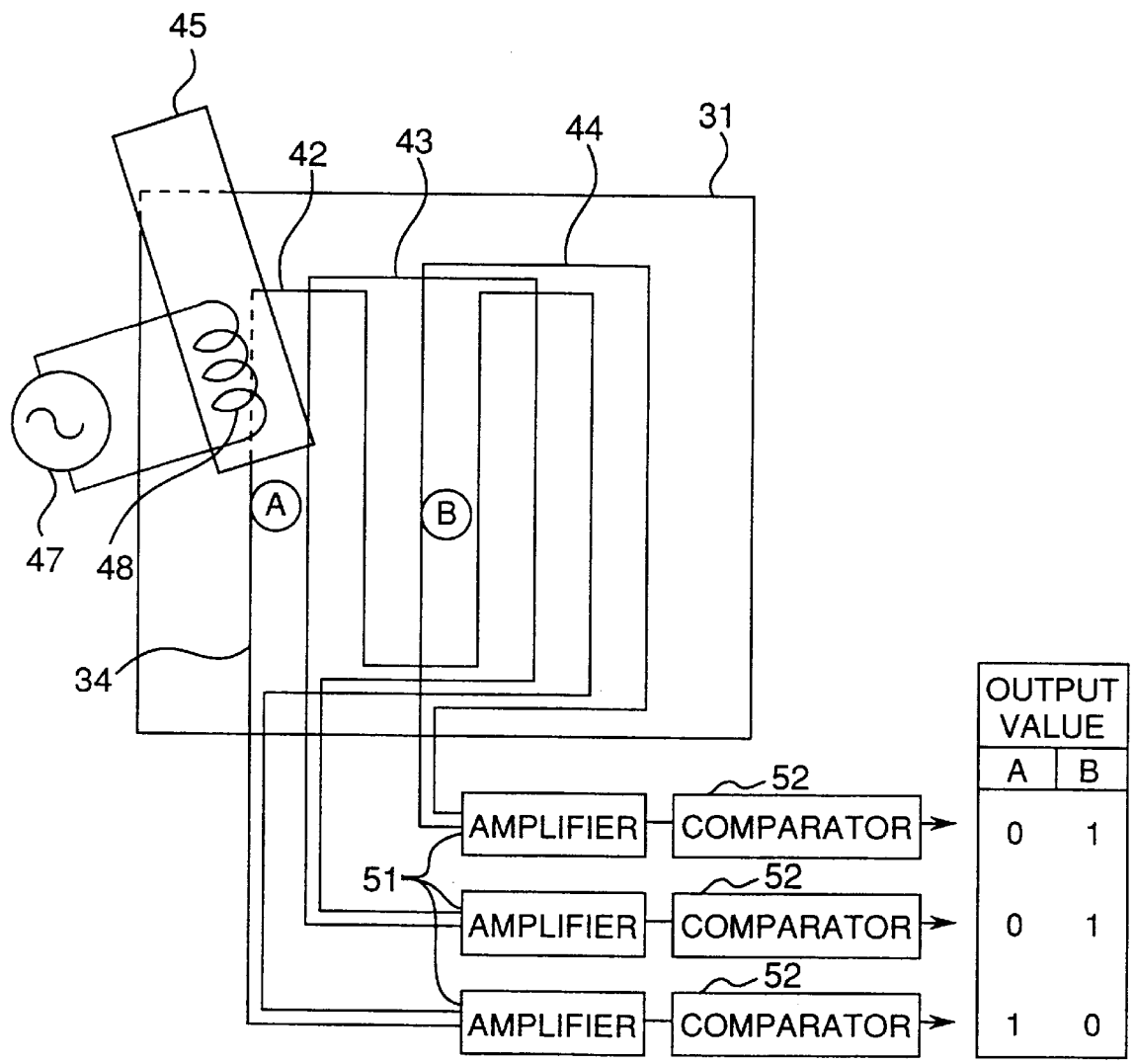
FIG. 50 is an explanatory view of a coordinate detection technique of the second prior art.
Figure 51:
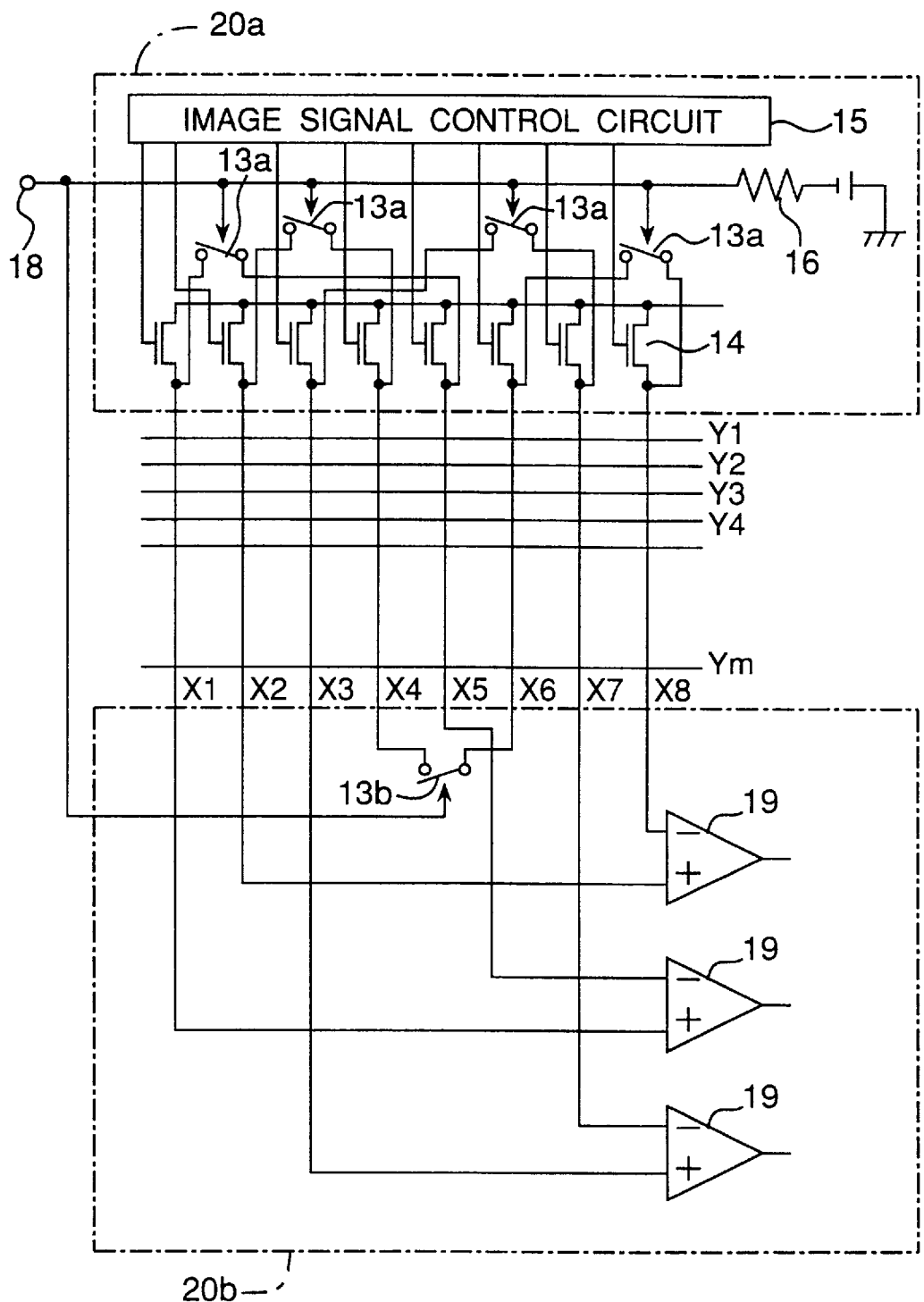
FIG. 51 is a circuit diagram of an essential part of a third prior art.
Figure 52:
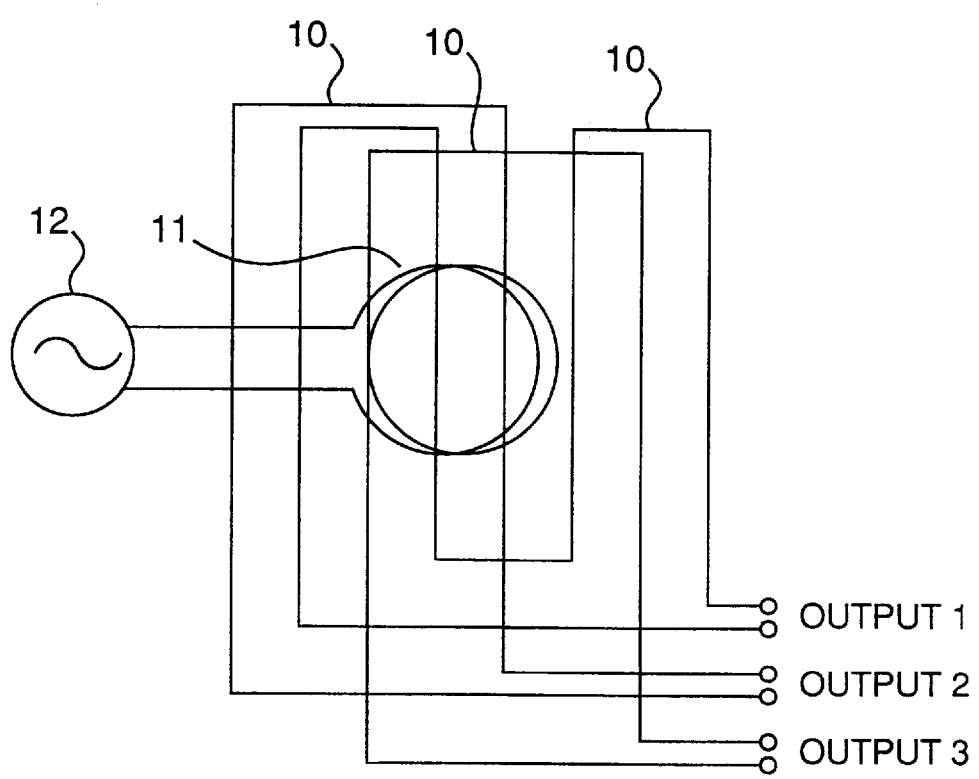
FIG. 52 is an explanatory view of a coordinate detection technique of the third prior art.
Figure 53A:
FIGS. 53A, 53B, 53C, 53D, 53E and 53F are timing charts of the third prior art.
Figure 53B:
Figure 53C:
Figure 53D:
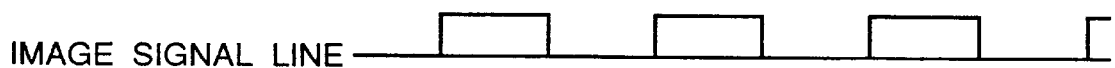
Figure 53E:
Figure 53F:
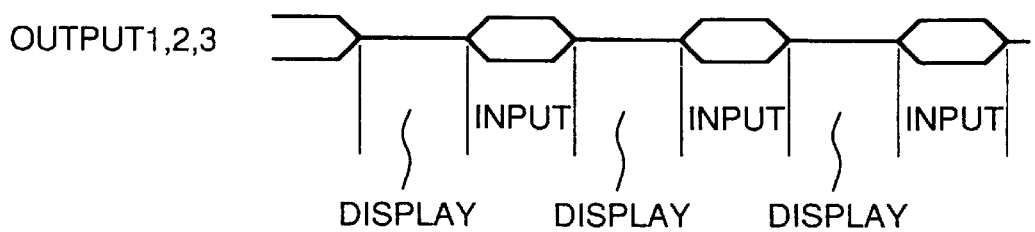

Concretely, the synchronous detector shown in FIG. 47 can directly substitute for the envelope detector provided in each of the aforementioned embodiments. A PLL circuit of the synchronous detector forms a continuous signal synchronized in phase with a carrier component of the input signal, and obtains a product of the input signal and the formed continuous signal in a multiplier circuit. Furthermore, a low-pass filter LPF allows only a low-frequency component to pass so as to extract an envelope of the signal. The operation of such a synchronous detector is well known, and the detector can be easily implemented by combining devices availed on the market.

As is apparent from the above description, in the coordinate detection device of the present invention, the AC generator of the coordinate detection device outputs an AC magnetic field. When the outputted AC magnetic field effects on the first and second electrodes of the panel, a voltage corresponding to the amplitude of the AC magnetic field is generated at the first and second electrodes.

Meanwhile, switching means sequentially switches connections of the first and second electrodes of the panel so as to connect the selected electrode to the amplifier. Therefore, when each of the first and second electrodes at which the voltage is induced is connected to the amplifier, the amplifier amplifies the induction voltage and outputs the resulting signal.

The voltage outputted from the differential amplifier is inputted to coordinate detection means. Then, the coordinate detection means detects the coordinates of the coordinate pointing device on the panel based on the timing at which the first and second electrodes are each selected and the output of the differential amplifier.

Therefore, according to the present invention, the coordinates of the coordinate pointing device can be detected without necessitating any signal line between the coordinate pointing device and the panel. Furthermore, the coordinates of the coordinate pointing device can be detected according to the voltage induced at the first and second electrodes by a magnetic field generated from the coordinate pointing device. Therefore, the first and second electrodes are not required to form a closed loop. Therefore, an LCD panel provided specially for image display can be used as it is as the above-mentioned panel. Furthermore, according to an embodiment of the present invention, the first and second electrodes are not required to form a closed loop. Therefore, a coordinate detection function can be incorporated to the LCD panel provided specially for image display without providing an electric circuit opposite to the four sides of the LCD panel provided specially for image display. The above-mentioned fact means that the coordinate detection function can be is incorporated to the image display device without increasing the size of the image display device having an LCD panel provided specially for image display, and means that an image display device having a coordinate detection function can be manufactured without largely changing the existing manufacturing equipment for the image display device.

Therefore, according to the present invention, there can be provided a coordinate detection device capable of preventing increase of development cost and reduction of yield, and dispensing with investment for equipment which may cause cost increase, thus totally contributing to development of the industry.

Furthermore, according to an embodiment, the above-mentioned panel has a structure in which a material having an electro-optical effect is sealedly filled in a space between two substrates, and the first and second electrodes are arranged on the substrates so that the first and second electrodes are made to serve as electrodes for image display. Therefore, a display panel for coordinate detection use which concurrently has the coordinate detection function and the image display function can be provided.

Furthermore, according to an embodiment, since a coil of the coordinate pointing device is wound around a core made of a material having a specified magnetic permeability, an AC magnetic field output can be concentrated on the core. Therefore, the coordinate pointing ability of the coordinate pointing device can be improved.

Furthermore, according to an embodiment, since the core has its fore end portion protruding in a rod-like form, a magnetic field can be outputted in a direction in which the fore end portion of the core is directed. Therefore, the coordinate pointing ability can be improved.

Furthermore, according to an embodiment, since the coil of the coordinate pointing device can be shielded by an electrostatic shield plate, the influence of the electrostatic coupling is reduced to allow the coordinate pointing ability to be improved.

Furthermore, according to an embodiment, since the coordinate pointing device has a battery storing section for storing therein a battery which serves as a power source for the AC oscillator. Therefore, by storing the battery in the battery storing section, there is no need to supply an electric power to the coordinate pointing device from outside the coordinate pointing device. Therefore, the coordinate pointing device is required to be connected to nothing. The above-mentioned arrangement can achieve a completely codeless coordinate pointing device.

Furthermore, according to an embodiment, when the coordinate pointing device is stored in the storing portion provided in a casing to which the panel is mounted, charging terminals owned by the coordinate pointing device and the power supply terminals in the casing are electrically connected to each other. Therefore, in the above-mentioned time, the secondary battery stored in the battery storing section of the coordinate pointing device is charged. Therefore, the operating life of the battery which is the power source of the coordinate pointing device can be remarkably improved.

Furthermore, according to an embodiment, since the amplifier is a differential amplifier, a signal from the electrodes of the panel is amplified by means of the differential amplifier. The above-mentioned arrangement has an advantage that external noises which have entered evenly into two inputs of the differential amplifier can be effectively removed.

Furthermore, according to an embodiment, a resonance circuit which resonates with an AC magnetic field generated by the AC oscillator is connected across the output terminal and the inverted input terminal of the differential amplifier. Therefore, the differential amplifier can selectively amplify the AC magnetic field with a great gain. Therefore, an improved coordinate detection sensitivity can be achieved.

Furthermore, according to an embodiment, switching means selects at least one pair of adjoining electrodes and connects the selected electrodes to a differential amplifier, and shifts the electrode successively one by one in a direction in which the electrodes are arranged. Therefore, by shifting the selected electrode, the coordinate pointing device is, so to speak, searched to allow the coordinates of the coordinate pointing device located in the area where the electrodes are arranged can be surely detected.

Furthermore, according to an embodiment, switching means selects a pair of adjoining electrodes of the panel, and shifts the selected electrode successively one by one in a direction in which the electrodes are arranged. Therefore, the selection is simpler that of the above-mentioned invention, thereby allowing the structure of the switching means to be simplified.

Furthermore, according to an embodiment, switching means has a first terminal to be connected in parallel with two or more adjoining electrodes and a second terminal to be connected in parallel with two or more electrodes adjacent to the electrodes connected to the first terminal. Therefore, by electrically connecting the first terminal and the second terminal to the differential amplifier, four or more electrodes which are receiving an AC magnetic field outputted from the electrodes of the coordinate pointing device can be connected to the differential amplifier. Therefore, an improved detection sensitivity can be achieved in comparison with the case where only two electrodes are connected to the differential amplifier.

Furthermore, according to an embodiment, an envelope of the output from the differential amplifier is extracted by envelope extraction means, and a peak portion of a single-humped output from the envelope extraction means is detected. Then, based on a time at which the peak portion is detected and a timing at which the switching means selects the electrodes of the panel, the coordinates representing the position of the coordinate pointing device are specified. Thus, according to the present embodiment, by outputting a characteristic single-humped signal from the envelope extraction means and detecting the peak portion of the single-humped envelope waveform, a coordinate detection operation can be achieved. Furthermore, in order to specify the coordinates, a signal from which unnecessary signal component is removed through an envelope detection process is used, and therefore the detection of the peak portion can be easily achieved.

Furthermore, according to an embodiment, a synchronous detector is provided as the envelope extraction means. The synchronous detector can extract the envelope of the signal without distortion more correctly than the envelope detector, and therefore an improved coordinate detection accuracy to be achieved.

Furthermore, according to an embodiment, coordinate detection means includes a first envelope detector which has a relatively great time constant and operates to receive an output from the amplifier and detect an envelope of the output and a second envelope detector which has a relatively small time constant and operates to receive the output from the amplifier and detect the envelope of the output. By subjecting a double-humped output from the first envelope detector and a double-humped output from the second envelope detector to a subtraction process, a bottom portion of the double-humped output outputted from the second envelope detector is detected.

The output of the first envelope detector having a great time constant becomes a double-humped signal where the bottom portion is shallowed, while the output of the second envelope detector having a small time constant becomes a double-humped signal where the bottom portion is not shallowed. Therefore, by subjecting the double-humped output from the first envelope detector and the double-humped output from the second envelope detector to the subtraction process, a signal having a peak at the bottom portion can be obtained. With the above-mentioned signal, the bottom portion can be detected.

Furthermore, according to an embodiment, peak detection means detects a peak portion of the single-humped output by an output obtained by binarizing the single-humped output from the envelope detector. Through the above-mentioned binarizing process, an output in which a difference between the peak portion and non-peak portion of the single-humped output is clear can be obtained. Therefore, the peak portion can be easily detected according to the output, and a coordinate detection operation can be performed by the detection of the peak portion.

Furthermore, according to an embodiment, coordinate detection means includes a delay circuit which receives the double-humped output from the amplifier and delays the output by a specified time, a subtracter which subjects the output of the amplifier and the delayed output to a subtraction process, and bottom detection means which binarizes the signal outputted from the subtracter and detects a bottom portion of the double-humped output according to the binarized signal. According to the present embodiment, a preceding peak of the double-humped signal outputted from the amplifier and a succeeding peak of the delayed double-humped signal are added together. With the above-mentioned operation, a signal having three peaks comprised of a highest peak and two low peaks arranged with interposition of the highest peak formed through the addition process is outputted from the subtracter. Then, by binarizing the signal having the three peaks, a difference between the highest peak portion and the low peak portions is decided. The highest peak portion is delayed from the bottom portion of the double-humped output by the delay time. Therefore, the bottom portion can be easily detected according to the binarized signal of which highest peak portion is decided, and a coordinate detection operation can be performed by the detection of the bottom portion.

Furthermore, according to an embodiment, a material having an electro-optical effect characteristic is sealedly filled in a space between two substrates. A flat display panel including a plurality of x-axis electrodes and a plurality of y-axis electrodes which are intersecting each other on the substrates can be time-sharingly switched to be selectively used for image display or coordinate detection by an image display-coordinate detection changeover circuit. When the flat display panel is used for image display, the x-axis electrodes and the y-axis electrodes are driven by a drive circuit so as to electrically drive the panel to display an image. When a coordinate detection operation is performed, a voltage generated at the x-axis electrodes and the y-axis electrodes by a magnetic field generated from the coordinate pointing device which is provided separately with a function for generating an AC magnetic field is detected by a coordinate detection circuit which utilizes a change in potential of the signal, thereby allowing the coordinates of the coordinate pointing device to be detected.

Furthermore, according to an embodiment, a material having an electro-optical effect characteristic is sealedly filled in a space between two substrates. A flat display panel including a plurality of x-axis electrodes and a plurality of y-axis electrodes which are intersecting each other on the substrates can be time-sharingly switched to be selectively used for image display or coordinate detection by an image display-coordinate detection changeover circuit. When the flat display panel is used for image display, the x-axis electrodes and the y-axis electrodes are driven by a drive circuit so as to electrically drive the panel to display an image. When a coordinate detection operation is performed, a voltage generated in the x-axis electrodes and the y-axis electrodes by a magnetic field generated from the coordinate pointing device which is provided separately with a function for generating an AC magnetic field is detected by a coordinate detection circuit which utilizes a change in phase of the signal, thereby allowing the coordinates of the coordinate pointing device to be detected.

Furthermore, according to an embodiment, in either of the above-mentioned two coordinate detection devices, a band-pass filter or a high-pass filter for selectively allowing only a signal at and around the frequency of the AC magnetic field to pass is connected to an input terminal of the coordinate detection circuit. Therefore, the coordinate detection circuit can consistently detect a stabilized voltage from the x-axis electrodes and the y-axis electrodes without being influenced by noises.

Furthermore, according to an embodiment, in either of the above-mentioned two coordinate detection devices, the coordinate pointing device which is provided with a function for generating an AC magnetic field has at its tip end a coaxial electrode comprised of a center electrode and a peripheral electrode. Therefore, not depending on which circumferential direction the coordinate pointing device is directed in use, a stabilized voltage can be consistently induced at the x-axis electrodes and the y-axis electrodes.

Furthermore, according to an embodiment, in either of the above-mentioned two coordinate detection devices, the x-axis drive circuit and the y-axis drive circuit for image display use, the coordinate detection circuit, and the display-coordinate detection changeover circuit are arranged along two or three sides of the periphery of the display panel.

In detail, according to an embodiment, a coordinate detection function can be incorporated to the display device without increasing the size of the display device having an LCD panel provided specially for image display, and moreover a display device having a coordinate detection function can be manufactured without significantly changing the existing manufacturing equipment for the display device.

Therefore, according to the present embodiment, there can be provided a coordinate detection device capable of preventing increase of development cost and reduction of yield, and dispensing with investment for equipment which may cause cost increase, thereby totally contributing to development of the industry.

The present embodiment can achieve a coordinate detection device resolving the problems of the prior arts. In other words, according to the present embodiment, a connection cable which has been necessitated by the prior arts in achieving a coordinate detection device can be eliminated. Furthermore, there is no need to form a loop circuit on which a magnetic field is to be effected. With the above-mentioned arrangement, there is no need to newly incorporate to an LCD panel a specific bidirectional switching element which short-circuits the end portions of adjoining electrodes of the LCD panel. The above-mentioned arrangement obviates the need of providing a tab connection terminal at the four sides. Therefore, increase of developing cost and reduction of yield can be prevented. Furthermore, unnecessary investment for the manufacturing equipment can be avoided to allow a compact light-weight coordinate detection device to be provided. In other words, the present embodiment can be applied as it is to a panel of a display/coordinate input function integrated device without making alterations in the conventionally used panel provided specially for image display, thereby totally contributing to development of the industry.

In particular, according to an embodiment, one LCD panel can be concurrently used for image display and coordinate input achieved by means of electro-magnetic coupling effect.

The coordinate input function does not depend on the type of the panel, and is able to be operated in any type of panel according to an identical principle of operation and with an identical circuit. Therefore, when whichever type of LCD panel, such as a duty ratio drive LCD panel or an active matrix type TFT LCD panel is selected as a panel, there is exerted no influence on the coordinate detection function of the present invention. The above is because, according to the present invention, a coordinate input function can be incorporated as it is to an LCD panel which has been conventionally used specially for image display without making alterations in the panel. Further, as the result of time-sharingly changing over between the image display function and the coordinate input function, the image display function and the coordinate input function can be made independent in terms of function and in terms of circuit.

Furthermore, according to an embodiment, a flat display panel such as an LCD panel which has been conventionally used specially for image display can be used as it is without making alterations in the panel. The above-mentioned arrangement provides an economical advantage that a coordinate input function can be incorporated to a flat display panel without making alterations in the manufacturing process which requires a huge amount of investment cost.

The present invention can be applied to a panel of a type wherein a signal I/O connector is attached to the panel in at most three directions among the panels which have been conventionally used specially for image display. Therefore, a compact application product can be developed with reduction of, so to speak, a frame area. In contrast to the above, it has been conventionally required to provide a signal I/O connector at all the four sides of the panel if a new panel is produced by altering the manufacturing process.

Furthermore, according to an embodiment, the AC oscillator can be driven by a battery. The above-mentioned arrangement has an advantage that no lead wire for connecting the coordinate pointing device to the coordinate detection circuit is necessary. Furthermore, since no wireless transmitter is required to be provided inside, which is advantageous in terms of the operating life of the battery. Furthermore, the entire coordinate pointing device can be compacted, which leads to an advantage that a light-weight coordinate pointing device which can be easily used can be constructed. Furthermore, there is no need to compulsorily mount a wireless transmitter or the like in a compact coordinate pointing device, which is advantageous in terms of cost.

In particular, an embodiment has a feature that the structure thereof is very simple. Furthermore, since signal detection is performed by means of a differential amplifier, there is an advantage that external noises which enter evenly into two inputs of the differential amplifier can be effectively removed. In addition, since an addition calculation is substantially performed by means of the differential amplifier, improvement of signal-to-noise ratio in signal detection can be expected.

Furthermore, according to an embodiment, there is performed a coordinate detection operation paying attention to a change in phase of the signal. Therefore, the embodiment has an inherent feature that it is not influenced by anything that enters into the detected signal and changes the amplitude of the signal.

Furthermore, according to an embodiment, there is an advantage that hum noise and the like which is induced at the panel from a hand of the operator who touches the panel can be effectively removed, with which an improved coordinate detection accuracy can be expected. Conversely, the circuit structure and the like can be simplified so as to satisfy a required detection accuracy.

Furthermore, according to an embodiment, a magnetic field is radiated from an approximate center portion of the coordinate pointing device. Therefore, depending on neither the direction nor the angle of the pen-shaped coordinate pointing device in which an AC oscillator is provided, it is allowed to achieve a consistent electro-magnetic coupling with respect to the electrodes of the LCD panel and achieve a consistent electrical change given to the panel. Therefore, the AC oscillator can be stored in a pen-shaped casing. As a result, there can be achieved a coordinate pointing device which can be handled very easily in a manner similar to that of the ordinary writing pen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coordinate detection device performing a coordinate detection operation by an electromagnetic induction method, the coordinate detection device comprising:

a flat display panel in which a material having an electro-optical effect characteristic is sealedly filled in a space between two substrates, and a plurality of x-axis electrodes and a plurality of y-axis electrodes which are intersecting each other on the substrates;

x-axis drive circuit and y-axis drive circuit which are provided for image display use and electrically drive the x-axis electrodes and the y-axis electrodes of the flat display panel respectively;

a wireless coordinate pointing device including alternating current magnetic field generating means having therein an alternating current power source and an electrode connected to an output terminal of the alternating current magnetic field generating means;

a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, peak detection means which obtains a signal which is supplied from the wireless coordinate pointing device to the electrodes by shifting the selected electrodes as a single-humped signal from the differential amplifier and detects a peak portion of the single-humped signal, and position coordinate specifying means for specifying coordinates based on a time at which the peak portion detecting means detects the peak portion and a timing at which the electrodes are selected;

wherein one end of each of the plurality of x-axis electrodes and one end of each of the plurality of y-axis electrodes are always open, including during a time when the coordinate detection circuitry is being operated; and a display-coordinate detection changeover circuit which time-sharingly complementarily operates the x-axis drive circuit, the y-axis drive circuit, and the coordinate detection circuit.

2. A coordinate detection device as claimed in claim 1, wherein a band-pass filter or a high-pass filter for allowing selectively a signal having a frequency at and around a frequency of the alternating current magnetic field generated by the coordinate pointing device to pass is connected to an input terminal of the coordinate detection circuit.

3. A coordinate detection device as claimed in claim 1, wherein the electrode of the coordinate pointing device is comprised of:

a center electrode and a peripheral electrode arranged coaxially.

4. A coordinate detection device as claimed in claim 1, wherein the x-axis drive circuit and the y-axis drive circuit for image display use, the coordinate detection circuit, and the display-coordinate detection changeover circuit are arranged along periphery of two or three sides of the display panel.

5. A coordinate detection device as claimed in claim 1, wherein the coordinate detection circuit detects coordinates responsive to alternating current magnetic field outputs from the coordinating pointing device.

6. A coordinate detection device as claimed in claim 5, wherein the coordinate pointing device is electrically isolated from the panel.

7. A coordinate detection device performing a coordinate detection operation by an electromagnetic induction method, the coordinate detection device comprising:

a flat display panel in which a material having an electro-optical effect characteristic is sealedly filled in a space between two substrates, and a plurality of x-axis electrodes and a plurality of y-axis electrodes which are intersecting each other on the substrates;

x-axis drive circuit and y-axis drive circuit which are provided for image display use and electrically drive the x-axis electrodes and the y-axis electrodes of the flat display panel respectively;

a wireless coordinate pointing device including alternating current magnetic field generating means having therein an alternating current power source and an electrode connected to an output terminal of the alternating current magnetic field generating means;

a coordinate detection circuit including an amplifier, a connection switching circuit which selects an x-axis electrode and a y-axis electrode, connects the selected electrodes to the amplifier, and shifts the selected electrodes one by one in a direction in which the selected electrodes are arranged, bottom detection means which obtains a signal which is supplied from the wireless coordinate pointing device to the electrodes by shifting the selected electrodes as a double-humped signal from the amplifier and detects a bottom portion of the double-humped signal by obtaining a phase inversion point of the double-humped signal through calculation of an input signal and an output signal of a delay circuit and detecting the phase inversion point of the double-humped signal, and position coordinate specifying means for specifying coordinates based on a time at which the bottom portion detecting means detects the bottom portion and a timing at which the electrodes are selected;

wherein one end of each of the plurality of x-axis electrodes and one end of each of the plurality of y-axis electrodes are always open, including during a time when the coordinate detection circuitry is being operated; and a display-coordinate detection changeover circuit which time-sharingly complementarily operates the x-axis drive circuit, the y-axis drive circuit, and the coordinate detection circuit.

8. A coordinate detection device as claimed in claim 7, wherein a band-pass filter or a high-pass filter for allowing selectively a signal having a frequency at and around a frequency of the alternating current magnetic field generated by the coordinate pointing device to pass is connected to an input terminal of the coordinate detection circuit.

9. A coordinate detection device as claimed in claim 7, wherein the electrode of the coordinate pointing device is comprised of:
a center electrode and a peripheral electrode arranged coaxially.

10. A coordinate detection device as claimed in claim 7, wherein the x-axis drive circuit and the y-axis drive circuit for image display use, the coordinate detection circuit, and the display-coordinate detection changeover circuit are arranged along periphery of two or three sides of the display panel.

11. A coordinate detection device as claimed in claim 7, wherein the coordinate detection circuit detects coordinates responsive to alternating current magnetic field outputs from the coordinating pointing device.

12. A coordinate detection device as claimed in claim 11, wherein the coordinate pointing device is electrically isolated from the panel.

* * * * *